US010416627B2

(12) United States Patent
Matsuoka et al.

(10) Patent No.: US 10,416,627 B2
(45) Date of Patent: Sep. 17, 2019

(54) HVAC CONTROL SYSTEM PROVIDING USER EFFICIENCY-VERSUS-COMFORT SETTINGS THAT IS ADAPTABLE FOR BOTH DATA-CONNECTED AND DATA-UNCONNECTED SCENARIOS

(71) Applicant: Google LLC, Mountain View, CA (US)

(72) Inventors: Yoky Matsuoka, Palo Alto, CA (US); Joseph A. Ruff, San Jose, CA (US); Mark Malhotra, San Mateo, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/681,045

(22) Filed: Aug. 18, 2017

(65) Prior Publication Data
US 2017/0343229 A1     Nov. 30, 2017

Related U.S. Application Data

(63) Continuation of application No. 14/637,205, filed on Mar. 3, 2015, now Pat. No. 9,746,198, which is a
(Continued)

(51) Int. Cl.
*F24F 11/00*          (2018.01)
*H04L 12/28*          (2006.01)
(Continued)

(52) U.S. Cl.
CPC ............. *G05B 15/02* (2013.01); *F24F 11/30* (2018.01); *F24F 11/62* (2018.01);
(Continued)

(58) Field of Classification Search
CPC ........... G05B 15/02; F24F 11/30; F24F 11/62; G05D 23/1931; G05D 23/1904;
(Continued)

(56) References Cited

U.S. PATENT DOCUMENTS

| 4,223,831 A | 9/1980 | Szarka |
| 4,335,847 A | 6/1982 | Levine |

(Continued)

FOREIGN PATENT DOCUMENTS

| CA | 2 202 008 | 8/2000 |
| CA | 2779415 A1 | 5/2010 |

(Continued)

OTHER PUBLICATIONS

Aprilaire Electronic Thermostats, Model 835, User's Manual Installation and Programming, Dec. 2000, 16 pages.
(Continued)

*Primary Examiner* — Charles R Kasenge
(74) *Attorney, Agent, or Firm* — Kilpatrick Townsend & Stockton LLP

(57) ABSTRACT

The current application is directed to intelligent controllers that continuously, periodically, or intermittently monitor progress towards one or more control goals under one or more constraints in order to achieve control that satisfies potentially conflicting goals. An intelligent controller may alter aspects of control, dynamically, while the control is being carried out, in order to ensure that goals are obtained and a balance is achieved between potentially conflicting goals. The intelligent controller uses various types of information to determine an initial control strategy as well as to dynamically adjust the control strategy as the control is being carried out.

20 Claims, 63 Drawing Sheets

Related U.S. Application Data continuation of application No. 13/970,164, filed on Aug. 19, 2013, now Pat. No. 9,002,526, which is a continuation of application No. 13/632,093, filed on Sep. 30, 2012, now Pat. No. 8,554,376.

(51) Int. Cl.
| | | |
|---|---|---|
| *G05B 15/02* | (2006.01) | |
| *G05D 23/19* | (2006.01) | |
| *F24F 11/30* | (2018.01) | |
| *F24F 11/62* | (2018.01) | |

(52) U.S. Cl.
CPC ..... *G05D 23/1904* (2013.01); *G05D 23/1927* (2013.01); *G05D 23/1931* (2013.01); *H04L 12/2825* (2013.01); *H04L 12/2834* (2013.01); *H04L 2012/285* (2013.01)

(58) Field of Classification Search
CPC ............ G05D 23/1927; H04L 12/2825; H04L 12/2834; H04L 2012/285
See application file for complete search history.

(56) References Cited

U.S. PATENT DOCUMENTS

| | | |
|---|---|---|
| 4,338,791 A | 7/1982 | Stamp et al. |
| 4,685,614 A | 8/1987 | Levine |
| 4,751,961 A | 6/1988 | Levine et al. |
| 5,088,645 A | 2/1992 | Bell |
| 5,115,967 A | 5/1992 | Wedekind |
| 5,197,666 A | 3/1993 | Wedekind |
| 5,211,332 A | 5/1993 | Adams |
| 5,240,178 A | 8/1993 | Dewolf et al. |
| 5,395,042 A | 3/1995 | Riley et al. |
| 5,476,221 A | 12/1995 | Seymour |
| 5,555,927 A | 9/1996 | Shah |
| 5,611,484 A | 3/1997 | Uhrich |
| 5,801,940 A | 9/1998 | Russ et al. |
| 5,902,183 A | 5/1999 | D'Souza |
| 5,909,378 A | 6/1999 | De Milleville |
| 5,977,964 A | 11/1999 | Williams et al. |
| 6,062,482 A | 5/2000 | Gaugthieret et al. |
| 6,098,893 A | 8/2000 | Berglund et al. |
| 6,216,956 B1 | 4/2001 | Ehlers et al. |
| 6,349,883 B1 | 2/2002 | Simmons et al. |
| 6,645,066 B2 | 11/2003 | Gutta et al. |
| 6,769,482 B2 | 8/2004 | Wagner et al. |
| 7,024,336 B2 | 4/2006 | Salsbury et al. |
| 7,216,016 B2 | 5/2007 | Van Ostrand et al. |
| RE40,437 E | 7/2008 | Rosen |
| 7,392,661 B2 | 7/2008 | Alles |
| 7,469,550 B2 | 12/2008 | Chapman, Jr. et al. |
| 7,473,868 B2 | 1/2009 | Bohan et al. |
| 7,526,356 B2 | 4/2009 | Guez et al. |
| 7,644,869 B2 | 1/2010 | Hoglund et al. |
| 7,784,704 B2 | 8/2010 | Harter |
| 7,802,618 B2 | 9/2010 | Simon et al. |
| 7,854,389 B2 | 12/2010 | Ahmed |
| 8,090,477 B1 | 1/2012 | Steinberg |
| 8,172,153 B1 | 5/2012 | Kennedy et al. |
| 8,204,628 B2 | 6/2012 | Schnell et al. |
| 8,452,457 B2 | 5/2013 | Matsuoka et al. |
| 8,511,576 B2 | 8/2013 | Warren et al. |
| 8,511,577 B2 | 8/2013 | Warren et al. |
| 8,544,285 B2 | 10/2013 | Stefanski et al. |
| 8,554,376 B1 | 10/2013 | Matsuoka et al. |
| 8,600,561 B1 | 12/2013 | Modi et al. |
| 8,630,742 B1 | 1/2014 | Stefanski et al. |
| 8,757,507 B2 | 6/2014 | Fadell et al. |
| 8,918,219 B2 | 12/2014 | Sloo et al. |
| 9,002,526 B2 | 8/2015 | Matsuoka et al. |
| 9,746,198 B2 | 8/2017 | Matsuoka et al. |
| 2004/0238653 A1 | 12/2004 | Alles |
| 2004/0249479 A1 | 12/2004 | Shorrock |
| 2005/0128067 A1 | 6/2005 | Zakrewski |
| 2005/0189429 A1 | 9/2005 | Breeden |
| 2005/0194455 A1 | 9/2005 | Alles |
| 2006/0140205 A1 | 6/2006 | Baik et al. |
| 2006/0186214 A1 | 8/2006 | Simon et al. |
| 2006/0196953 A1 | 9/2006 | Simon et al. |
| 2007/0267508 A1 | 11/2007 | Hoglund et al. |
| 2008/0015742 A1 | 1/2008 | Kulyk et al. |
| 2008/0065241 A1 | 3/2008 | Boe et al. |
| 2008/0191045 A1 | 8/2008 | Harter |
| 2008/0317292 A1 | 12/2008 | Baker et al. |
| 2009/0112335 A1 | 4/2009 | Mehta et al. |
| 2009/0140064 A1 | 6/2009 | Schultz et al. |
| 2009/0171862 A1 | 7/2009 | Harrod et al. |
| 2009/0195349 A1 | 8/2009 | Frader-Thompson et al. |
| 2009/0312999 A1 | 12/2009 | Kasztenny et al. |
| 2010/0019051 A1 | 1/2010 | Rosen |
| 2010/0025483 A1 | 2/2010 | Hoeynck et al. |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0084482 A1 | 4/2010 | Kennedy et al. |
| 2010/0211224 A1 | 8/2010 | Keeling et al. |
| 2010/0262298 A1 | 10/2010 | Johnson et al. |
| 2010/0280667 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2010/0324741 A1 | 12/2010 | House et al. |
| 2011/0046792 A1 | 2/2011 | Imes et al. |
| 2011/0046805 A1 | 2/2011 | Bedros et al. |
| 2011/0153089 A1 | 6/2011 | Tiemann et al. |
| 2011/0184565 A1 | 7/2011 | Peterson |
| 2011/0185895 A1 | 8/2011 | Freen |
| 2011/0196539 A1 | 8/2011 | Nair et al. |
| 2011/0238224 A1 | 9/2011 | Schneli et al. |
| 2011/0264286 A1 | 10/2011 | Park |
| 2012/0072033 A1 | 3/2012 | Imes et al. |
| 2012/0085831 A1 | 4/2012 | Kopp |
| 2012/0130679 A1 | 5/2012 | Fadell et al. |
| 2012/0185101 A1 | 7/2012 | Leen et al. |
| 2012/0203379 A1 | 8/2012 | Sloo et al. |
| 2012/0310416 A1 | 12/2012 | Tapper et al. |

FOREIGN PATENT DOCUMENTS

| | | |
|---|---|---|
| CN | 1085646 A | 4/1994 |
| CN | 1922562 A | 2/2007 |
| EP | 0 196 069 A2 | 10/1986 |
| EP | 0 762 060 A1 | 3/1997 |
| JP | S59-106311 | 6/1984 |
| JP | H01-252850 A | 10/1989 |
| JP | H01-310250 A | 12/1989 |
| JP | 2002-195578 A | 7/2002 |
| JP | 2010-236708 A | 10/2010 |
| WO | 2012-068591 A2 | 5/2012 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
California Energy Commission, "Buildings End-Use Energy Efficiency; Alternatives to Compressor Cooling", pp. 1-67, Jan. 2000.
Carrier, "SYSTXCCUI201-V Infinity Control", pp. 1-20, May 2012.
Carrier, "TB-PAC TB-PHP Base Series Programmable Thermostats Installation Instructions and Homeowners Guide", May 2012, 8 pages.
Deleeuw, Scott, "Ecobee WiFi enabled Smart Thermostat Part 2: The Features review", pp. 1-7, Dec. 2, 2011.
Ecobee Smart Si Thermostat User Manual, Ecobee, Apr. 3, 2012, 44 pages.
Ecobee Smart Thermostat Installation Manual, Jun. 29, 2011, 20 pages.

(56) References Cited

OTHER PUBLICATIONS

Ecobee Smart Thermostat User Manual, May 11, 2010, 20 pages.
Introducing the New Smart Si Thermostat, Datasheet [online]. Ecobee, Mar. 2012 [retrieved on Feb. 25, 2013]. Retrieved from the Internet: <URL: https://www.ecobee.com/solutions/home/smart-si/>, Mar. 12, 2012, 4 pages.
Extended European Search Report dated Nov. 13, 2014 for European Patent Application No. 12842225.0 filed on Sep. 30, 2012, all pages.
Gao, Ge et al., "The Self-Programming Thermostat: Optimizing Setback Schedules based on Home Occupancy Patterns", BuildSys '09, Nov. 3, 2009, 6 pages.
Honeywell, "Installation Guide FocusPRO TH 6000 Series"(English, French, Spanish), pp. 1-24, Jan. 2012.
Honeywell Operating Manual FocusPRO TH6000 Series (English, French, Spanish), Honeywell International, Inc., Mar. 25, 2011, 80 pages.
Honeywell, "THX9321 Prestige 2.0 and THX9421 Prestige IAQ 2.0 with EIM", pp. 1-126, Jan. 2012.
Honeywell, "Operating Manual Prestige THX9321/9421", (English, French, Spanish), pp. 1-120, Jul. 2011.
Honeywell, "Perfect Climate Comfort Center Control Systems", pp. 1-44, Apr. 2001.
Honeywell, "T8611G Chronotherm IV Deluxe Programmable Heat Pump Thermostat", pp. 1-24, Oct. 1997.
Honeywell, "Installation Guide VisionPRO TH8000 Series", pp. 1-12, Jan. 2012.
Honeywell, "Operating Manual VisionPRO TH8000 Series" (English, French, Spanish), pp. 1-96, Mar. 2011.
Honeywell, "User Guide VisionPRO WiFi Programmable Thermostat Model TH8320WF", pp. 1-38, Aug. 2012.
International Search Report, Written Opinion and International Preliminary Report on Patentability for International Application No. PCT/US2012/058183 filed on Sep. 30, 2012, 14 pages.
International Search Report, Written Opinion and International Preliminary Report on Patentability for International Application No. PCT/US2012/058203 filed on Sep. 30, 2012, 12 pages.
Hunter Internet Thermostat Installation Guide, Aug. 14, 2012, 8 pages.
Lennox, "Homeowner's Manual ComfortSense 7000 Series", pp, 1-15, May 2009.
Lennox, "Homeowner's Manual icomfort Touch Thermostat", pp. 1-20, Dec. 2010.
Lennox, "Owner's Guide, ComforSense 5000 Series Models L5711U and L5732U Programmable Touch Screen Thermostats", 1-32, Feb. 2008.
Lu, Jiakang et al., "The Smart Thermostat: Using Occupancy Sensors to Save Energy in Homes", pp. 211-224, SenSys '10, Nov. 3-5, 2010.
Lux PSPU732T Manual, LUX Products Corporation, Jan. 6, 2009, 48 pages.
NetX RP32-WiFi Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
Trane, "ComfortLink II Installation Guide", pp. 1-20, Mar. 2011.
Trane, "Trane Communicating Thermostats for Fan Coil Control", pp. 1-32, May 2011.
Trane, "TCONT600AF11MA Programmable Comfort Control", pp. 1-14, Mar. 2006.
Trane, "Trane Communicating Thermostats for Heat Pump Control", pp. 1-32, May 2011.
Venstar T2900 Manual, Venstar, Inc., Apr. 2008, 113 pages.
Venstar T5800 Manual, Venstar, Inc., Sep. 7, 2011, 63 pages.
Washington State University Extension Energy Program, "Electric Heat Lock Out on Heat Pumps", pp. 1-3, Apr. 2010.
White Rodgers (Emerson) Model IF98EZ-1621 Homeowner's User Guide, White Rodgers, Jan. 25, 2012, 28 pages.
International Preliminary Report on Patentability dated Apr. 9, 2015 in International Patent Application No. PCT/US2012/058203, all pages.
Office action dated Aug. 9, 2018 in Canadian Patent Application No. 2,885,691, all pages.
Notice of Publication dated Aug. 12, 2015 in Chinese Patent Application No. 201280077438.9, 1 page.
Office action dated Mar. 24, 2016 in Chinese Patent Application No. 201280077438.9, 1 page.
Office action dated Nov. 17, 2016 in Chinese Patent Application No. 201280077438.9, 1 page.
Notice of Decision to Grant dated Mar. 6, 2017 in Chinese Patent Application No. 201280077438.9, 1 page.
Extended European Search Report dated May 13, 2016 in European Patent Application No. 12885319.9, all pages.

$$\Delta_{o/c_i} = \frac{(\Delta P_o - \Delta P_c)^2}{\Delta P_c}$$

$$\text{fit} = \sum_{i=1}^{N} \Delta_{o/c_i}$$

$$\text{fit} = \begin{cases} 0 \text{ when observed data matches model, and} \\ > 0 \text{ when observed data does not match model} \end{cases}$$

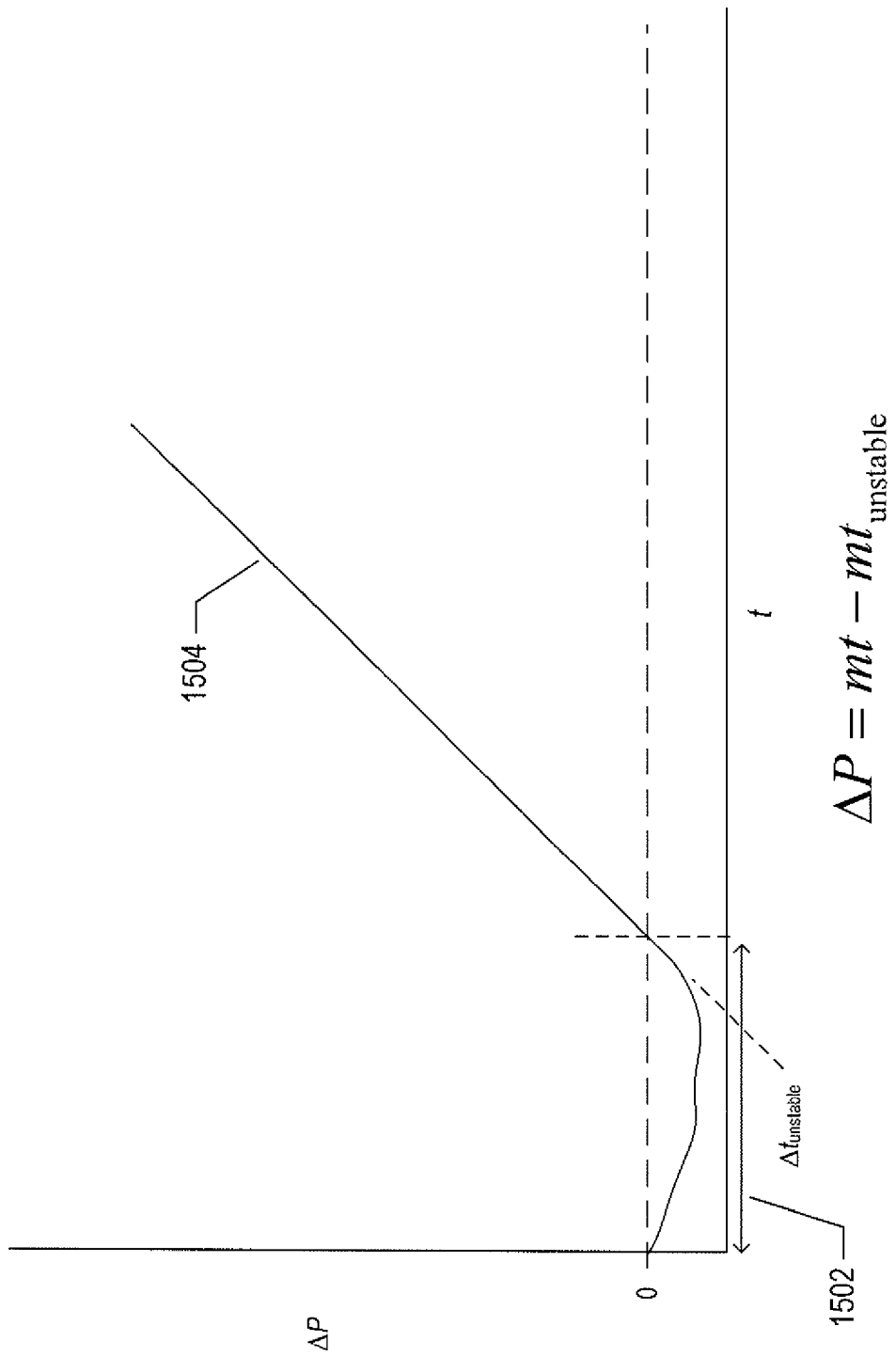

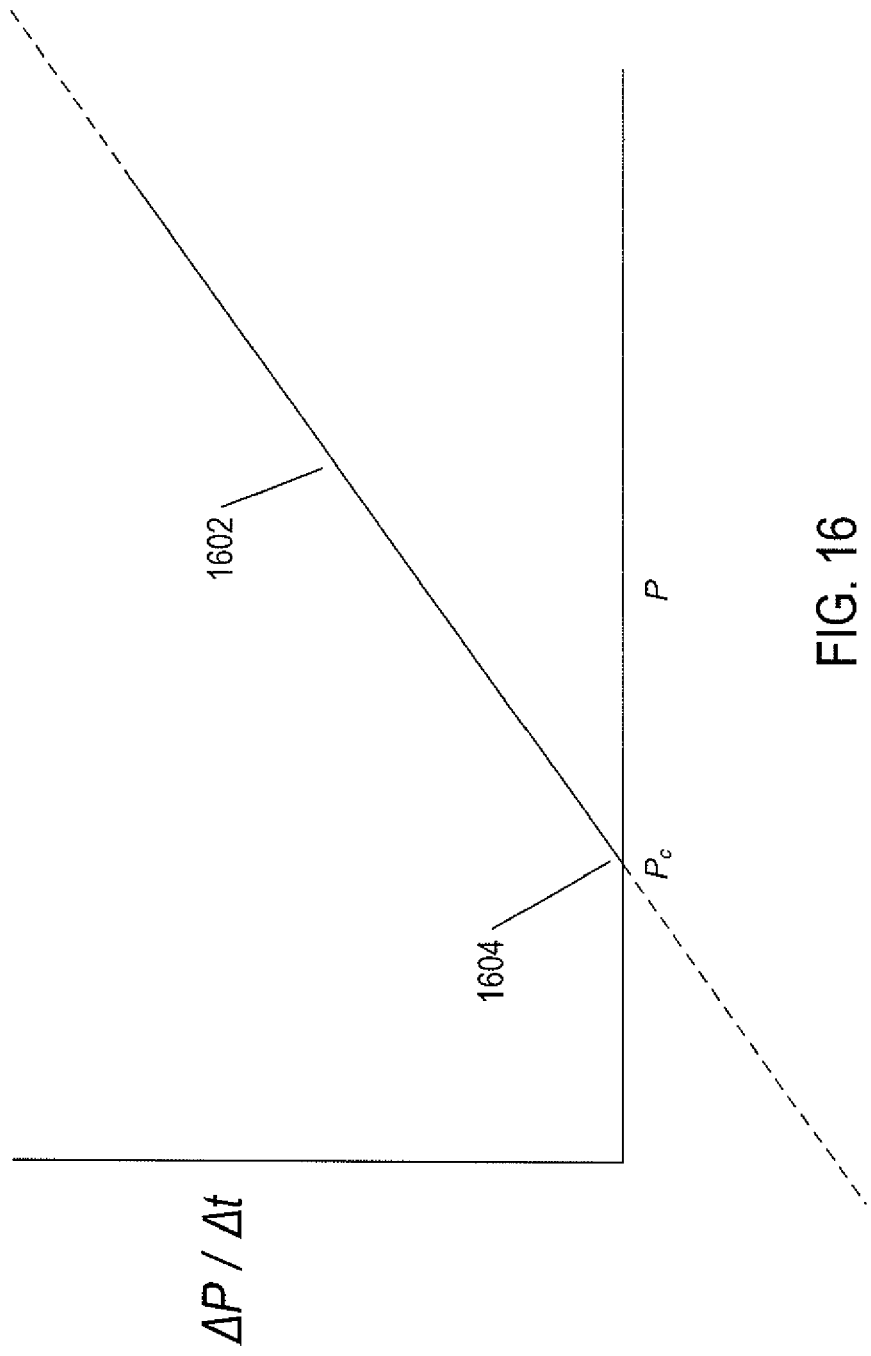

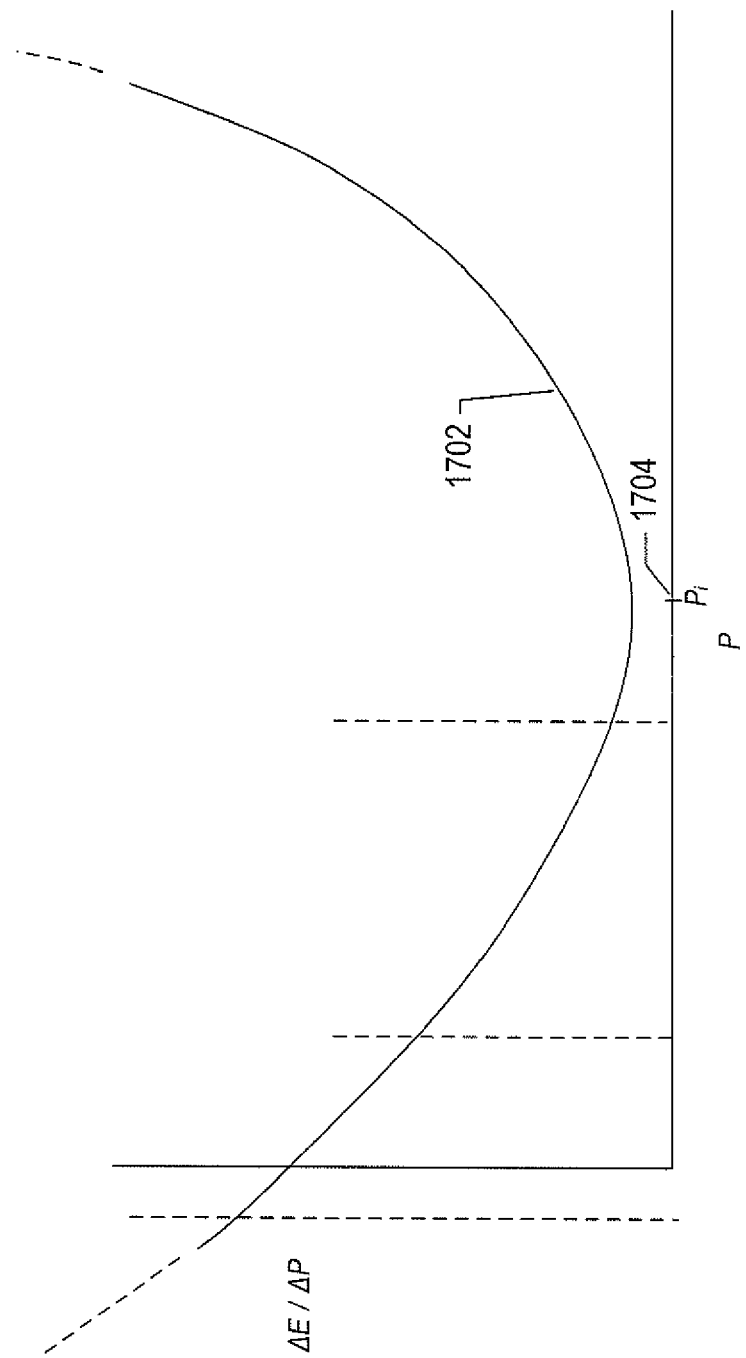

| auto component activation setting | $P_{lowLockout}$ | $P_{highLockout}$ | System |
|---|---|---|---|
| max savings | | | |
| balanced | | | |
| max comfort | | | |
| off | | | |

FIG. 19A

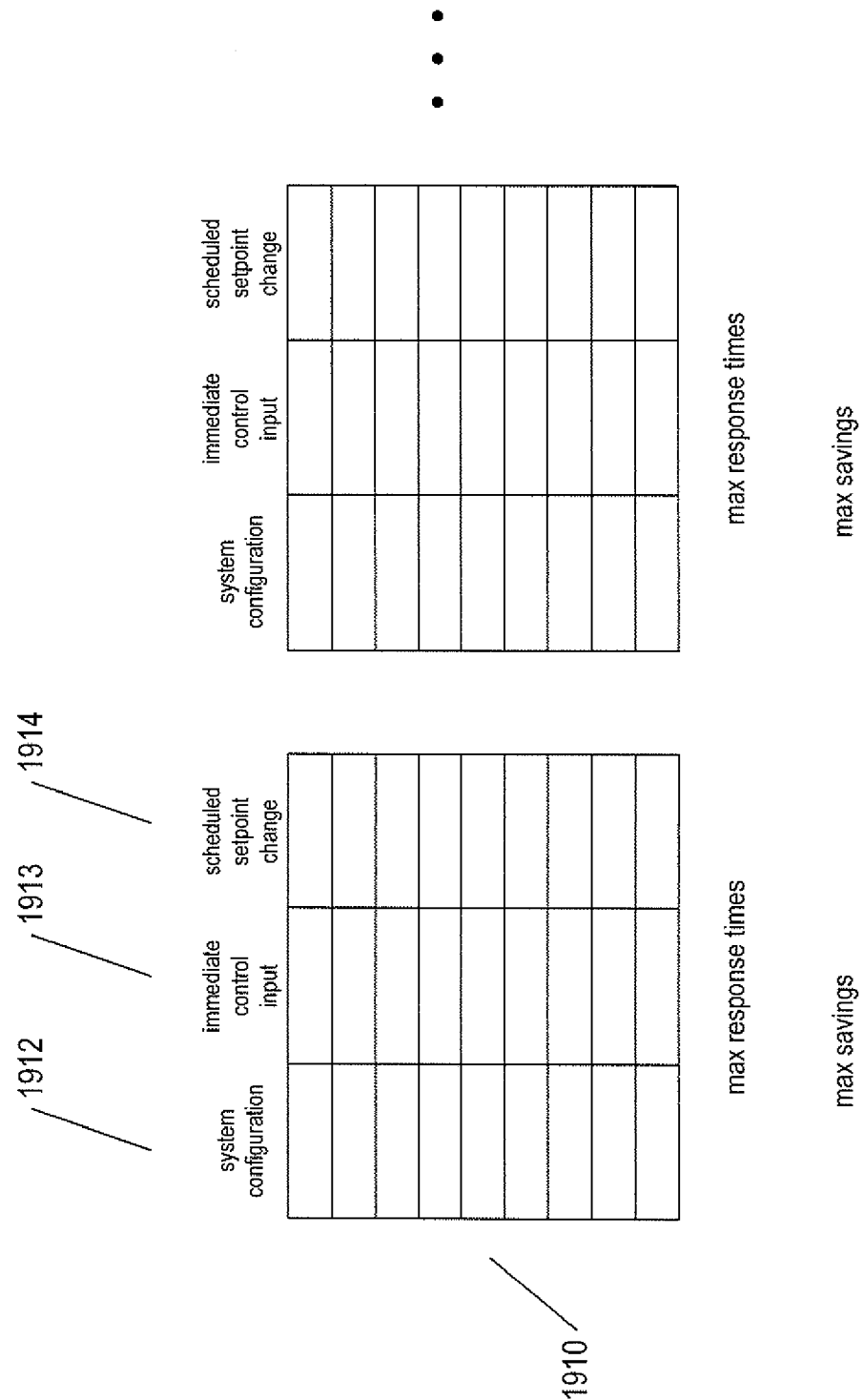

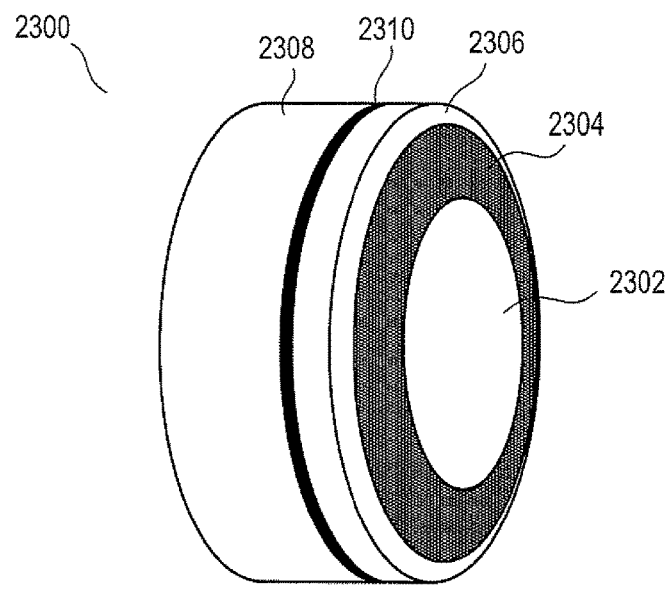
FIG. 23A
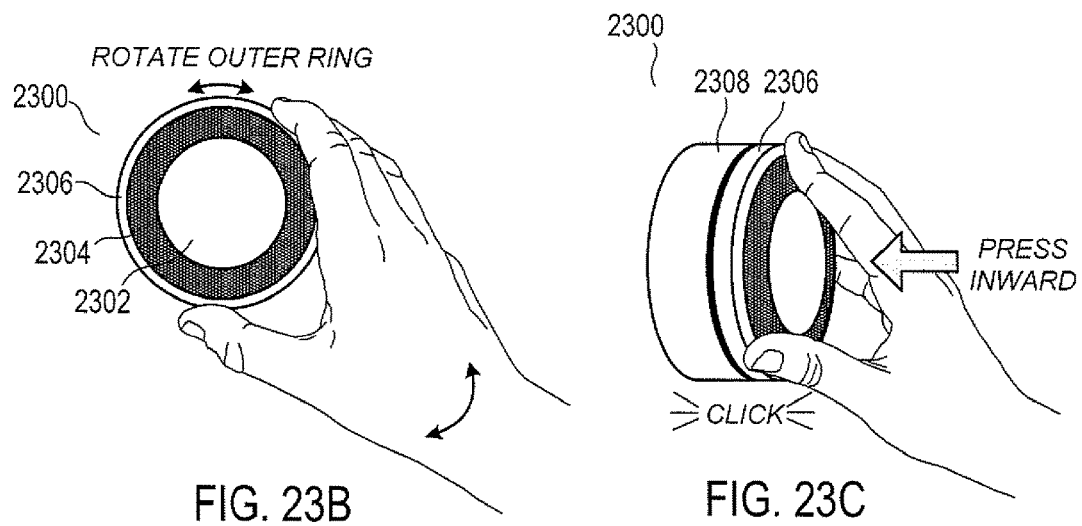
FIG. 23B
FIG. 23C

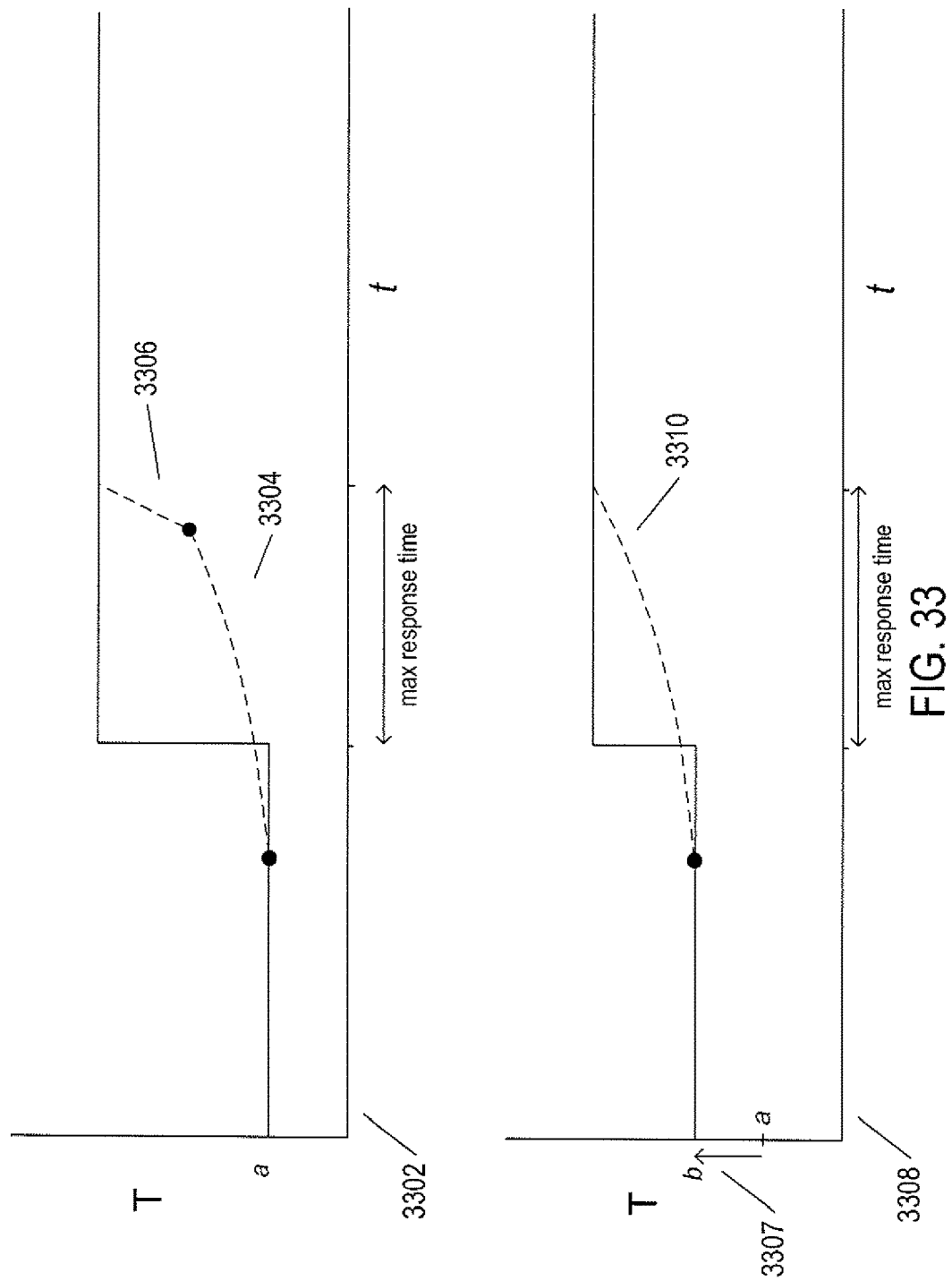

| Levels | Max savings | Balanced | Max comfort (default OOCB and 3.0 update) | OFF |
|---|---|---|---|---|
| AUX leaf lockout temp | 35F default. When HPR is available, temp on HPR higher than 1F/hr. If any point below 0F/hr, then push this up till that temp. | 40F default. When HPR is available, temp on HPR higher than 2F/hr + 3F. If any point below 0F/hr, then push this up till that temp. | 50F default. When HPR is available, temp on HPR higher than 3F/hr + 5F. If any point below 0F/hr, then push this up till that temp. | 50F default. |
|  | Range limited to be between 25 and 40F. | Range limited to be 35 and 45F. | Range limited to be 45 - 60F. |  |
| Night time temp economizer | ON (if no wifi, OFF) | ON (if no wifi, OFF) | OFF | OFF |
| AUX usage level | Manual adjustment: t2T 60min or longer and kick in AUX. If the multi-stage algorithm indicates a need for more heat, turn on AUX even above AUX lockout temp. | Manual adjustment: t2T 45min or longer and kick in AUX. If the multi-stage algorithm indicates a need for more heat, turn on AUX even above AUX lockout temp. | Manual adjustment: t2T 30min or longer and kick in AUX. If the multi-stage algorithm indicates a need for more heat, turn on AUX even above AUX lockout temp. | Manual adjustment: t2T 30min or longer and kick in AUX. If the multi-stage algorithm indicates a need for more heat, turn on AUX even above AUX lockout temp. |
|  | Schedule adjustment: t2T 120min or longer and kick in AUX from beignning. If the multi-stage algorithm indicates a need for more heat, turn on AUX even above AUX lockout temp. | Schedule adjustment: t2T 90min or longer and kick in AUX from beignning. If the multi-stage algorithm indicates a need for more heat, turn on AUX even above AUX lockout temp. | Schedule adjustment: t2T 60min or longer and kick in AUX from beignning. If the multi-stage algorithm indicates a need for more heat, turn on AUX even above AUX lockout temp. | Schedule adjustment: t2T 60min or longer and kick in AUX from beignning. If the multi-stage algorithm indicates a need for more heat, turn on AUX even above AUX lockout temp. |
| Pre-heating | ON | ON | ON | OFF |

FIG. 39

HVAC CONTROL SYSTEM PROVIDING USER EFFICIENCY-VERSUS-COMFORT SETTINGS THAT IS ADAPTABLE FOR BOTH DATA-CONNECTED AND DATA-UNCONNECTED SCENARIOS

CROSS-REFERENCE TO RELATED APPLICATION

This application is a Continuation of U.S. patent application Ser. No. 14/637,205, filed Mar. 3, 2015, Entitled "INTELLIGENT ENVIRONMENTAL CONTROL SYSTEM", which is a Continuation of U.S. patent application Ser. No. 13/970,164, filed Aug. 19, 2013, Entitled "INTELLIGENT CONTROLLER FOR AN ENVIRONMENTAL CONTROL SYSTEM", now U.S. Pat. No. 9,002,526, which is a continuation of U.S. patent application Ser. No. 13/632,093, filed Sep. 30, 2012, Entitled "INTELLIGENT CONTROLLER FOR AN ENVIRONMENTAL CONTROL SYSTEM", now U.S. Pat. No. 8,554,376. Each of the above-referenced patent applications is incorporated by reference herein.

TECHNICAL FIELD

The current patent application is directed to intelligent controllers and, in particular, to intelligent controllers, and methods incorporated within intelligent controllers, that monitors the response of a controlled environment in order to effectively control one or more systems that control the environment.

BACKGROUND

Control systems and control theory are well-developed fields of research and development that have had a profound impact on the design and development of a large number of systems and technologies, from airplanes, spacecraft, and other vehicle and transportation systems to computer systems, industrial manufacturing and operations facilities, machine tools, process machinery, and consumer devices. Control theory encompasses a large body of practical, system-control-design principles, but is also an important branch of theoretical and applied mathematics. Various different types of controllers are commonly employed in many different application domains, from simple closed-loop feedback controllers to complex, adaptive, state-space and differential-equations-based processor-controlled control systems.

One class of intelligent controllers includes intelligent controllers that control systems that affect one or more environmental parameters within an environment. Often, an intelligent controller is tasked with controlling the systems under various constraints in order to meet two or more control goals, requiring careful balancing and tradeoffs in the degrees to which potentially conflicting goals are obtained. Designers, manufactures, and users of intelligent controllers continue to seek control methods and systems that effectively control systems when two or more control goals may conflict.

SUMMARY

The current application is directed to intelligent controllers that continuously, periodically, or intermittently monitor progress towards one or more control goals under one or more constraints in order to achieve control that satisfies potentially conflicting goals. An intelligent controller may alter aspects of control, dynamically, while the control is being carried out, in order to ensure that goals are obtained and a balance is achieved between potentially conflicting goals. The intelligent controller uses various types of information to determine an initial control strategy as well as to dynamically adjust the control strategy as the control is being carried out.

BRIEF DESCRIPTION OF THE DRAWINGS

FIG. 15A illustrates one type of local model.

FIGS. 15A-B illustrate several types of local modeling techniques.

FIGS. 16-17 illustrate, using plots similar to the plots shown in FIGS. 14B-C and 15A-B, two additional types of information that may be obtained by monitoring P versus t response behaviors and various types of additional information with respect to the systems controlled by the intelligent controller.

FIGS. 19A-D illustrate additional types of information that may be electronically stored within an intelligent controller with respect to P-responses and response times.

FIG. 23A illustrates a perspective view of an intelligent thermostat.

FIGS. 23B-C illustrate the intelligent thermostat being controlled by a user.

FIG. 33 illustrates night-time-temperature economization.

FIG. 39 provides an example configuration of the response-time monitoring methods used in one implementation of an intelligent thermostat.

DETAILED DESCRIPTION

The current application is directed to intelligent controllers that continuously, periodically, or intermittently monitor progress towards one or more control goals under one or more constraints in order to achieve control that satisfies potentially conflicting goals. An intelligent controller may alter aspects of control, dynamically, while the control is being carried out, in order to ensure that goals are obtained and a balance is achieved between potentially conflicting goals. The subject matter of this patent specification relates to the subject matter of the following commonly assigned applications, each of which is incorporated by reference herein: U.S. Ser. No. 13/038,191 filed Mar. 1, 2011; U.S. Ser. No. 13/269,501 filed Oct. 7, 2011; U.S. Prov. Ser. No. 61/550,343 filed Oct. 21, 2011; and U.S. Ser. No. 13/632,028 filed even date herewith and entitled, "Intelligent Controller Providing Time to Target State."

The detailed description includes three subsections: (1) an overview of the smart-home environment; (2) methods and implementations for monitoring progress and dynamically altering control by an intelligent controller; and (3) intelligent thermostats that incorporate methods and implementations methods and implementations for monitoring progress and dynamically altering control by an intelligent controller. The first subsection provides a description of one area of technology that offers many opportunities for application and incorporation of methods for monitoring and dynamically adjusting control. The second subsection provides a detailed description of a general class of intelligent controllers that monitor progress towards control goals and dynamically adjust control based on monitoring results. A third subsection provides a specific example of intelligent thermostats that incorporate methods for monitoring and dynamically adjusting control.

Overview of the Smart-Home Environment

Figure 1:
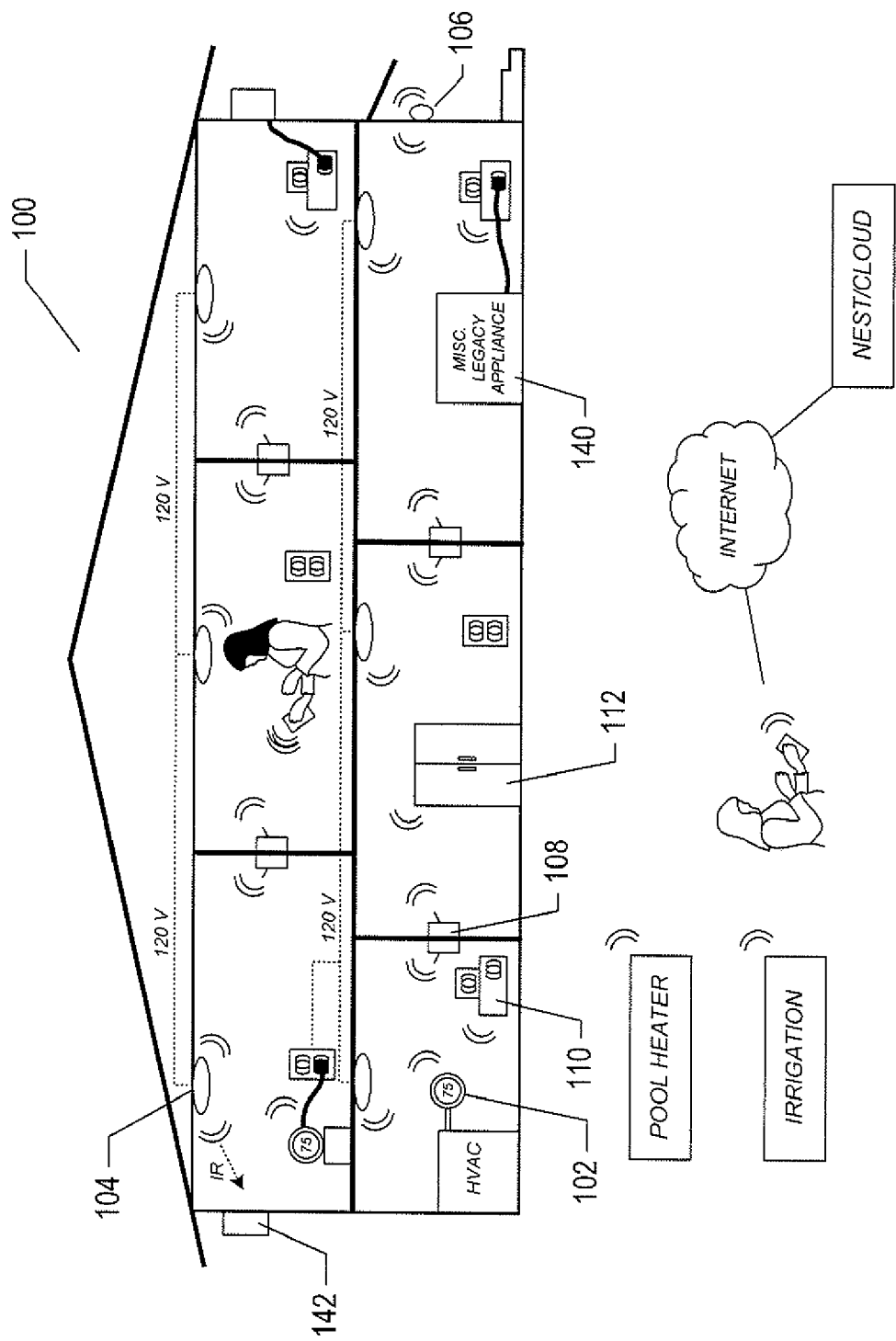
FIG. 1 illustrates a smart-home environment.

FIG. 1 illustrates a smart-home environment. The smart-home environment 100 includes a number of intelligent, multi-sensing, network-connected devices. These smart-home devices intercommunicate and are integrated together within the smart-home environment. The smart-home devices may also communicate with cloud-based smart-home control and/or data-processing systems in order to distribute control functionality, to access higher-capacity and more reliable computational facilities, and to integrate a particular smart home into a larger, multi-home or geographical smart-home-device-based aggregation.

The smart-home devices may include one more intelligent thermostats 102, one or more intelligent hazard-detection units 104, one or more intelligent entryway-interface devices 106, smart switches, including smart wall-like switches 108, smart utilities interfaces and other services interfaces, such as smart wall-plug interfaces 110, and a wide variety of intelligent, multi-sensing, network-connected appliances 112, including refrigerators, televisions, washers, dryers, lights, audio systems, intercom systems, mechanical actuators, wall air conditioners, pool-heating units, irrigation systems, and many other types of intelligent appliances and systems.

In general, smart-home devices include one or more different types of sensors, one or more controllers and/or actuators, and one or more communications interfaces that connect the smart-home devices to other smart-home devices, routers, bridges, and hubs within a local smart-home environment, various different types of local computer systems, and to the Internet, through which a smart-home device may communicate with cloud-computing servers and other remote computing systems. Data communications are generally carried out using any of a large variety of different types of communications media and protocols, including wireless protocols, such as Wi-Fi, ZigBee, 6LoWPAN, various types of wired protocols, including CAT6 Ethernet, HomePlug, and other such wired protocols, and various other types of communications protocols and technologies. Smart-home devices may themselves operate as intermediate communications devices, such as repeaters, for other smart-home devices. The smart-home environment may additionally include a variety of different types of legacy appliances and devices 140 and 142 which lack communications interfaces and processor-based controllers.

Figure 2:
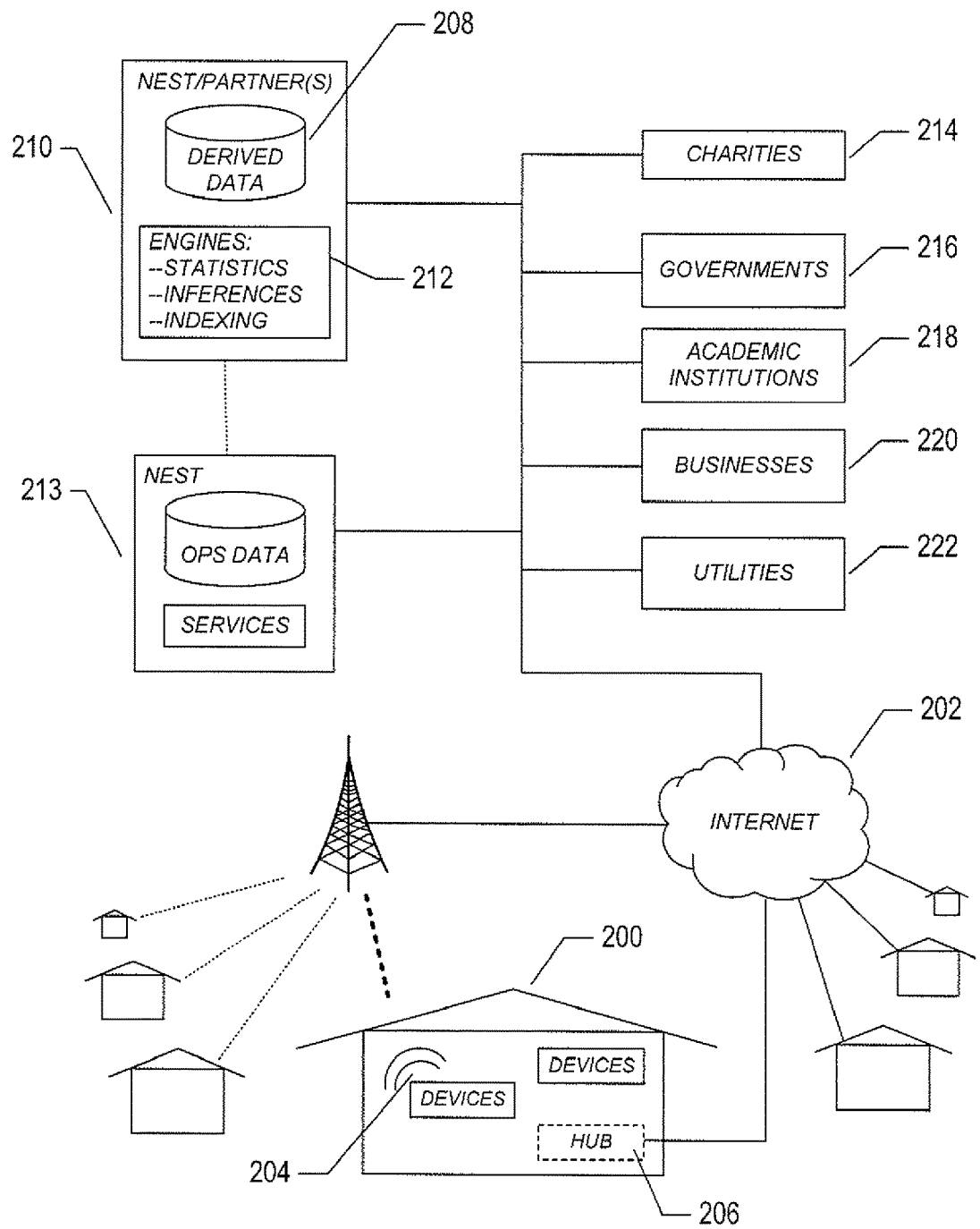
FIG. 2 illustrates integration of smart-home devices with remote devices and systems.

FIG. 2 illustrates integration of smart-home devices with remote devices and systems. Smart-home devices within a smart-home environment 200 can communicate through the Internet 202 via 3G/4G wireless communications 204, through a hubbed network 206, or by other communications interfaces and protocols. Many different types of smart-home-related data, and data derived from smart-home data 208, can be stored in, and retrieved from, a remote system 210, including a cloud-based remote system. The remote system may include various types of statistics, inference, and indexing engines 212 for data processing and derivation of additional information and rules related to the smart-home environment. The stored data can be exposed, via one or more communications media and protocols, in part or in whole, to various remote systems and organizations, including charities 214, governments 216, academic institutions 218, businesses 220, and utilities 222. In general, the remote data-processing system 210 is managed or operated by an organization or vendor related to smart-home devices or contracted for remote data-processing and other services by a homeowner, landlord, dweller, or other smart-home-associated user. The data may also be further processed by additional commercial-entity data-processing systems 213 on behalf of the smart-homeowner or manager and/or the commercial entity or vendor which operates the remote data-processing system 210. Thus, external entities may collect, process, and expose information collected by smart-home devices within a smart-home environment, may process the information to produce various types of derived results which may be communicated to, and shared with, other remote entities, and may participate in monitoring and control of smart-home devices within the smart-home environment as well as monitoring and control of the smart-home environment. Of course, in many cases, export of information from within the smart-home environment to remote entities may be strictly controlled and constrained, using encryption, access rights, authentication, and other well-known techniques, to ensure that information deemed confidential by the smart-home manager and/or by the remote data-processing system is not intentionally or unintentionally made available to additional external computing facilities, entities, organizations, and individuals.

Figure 3:
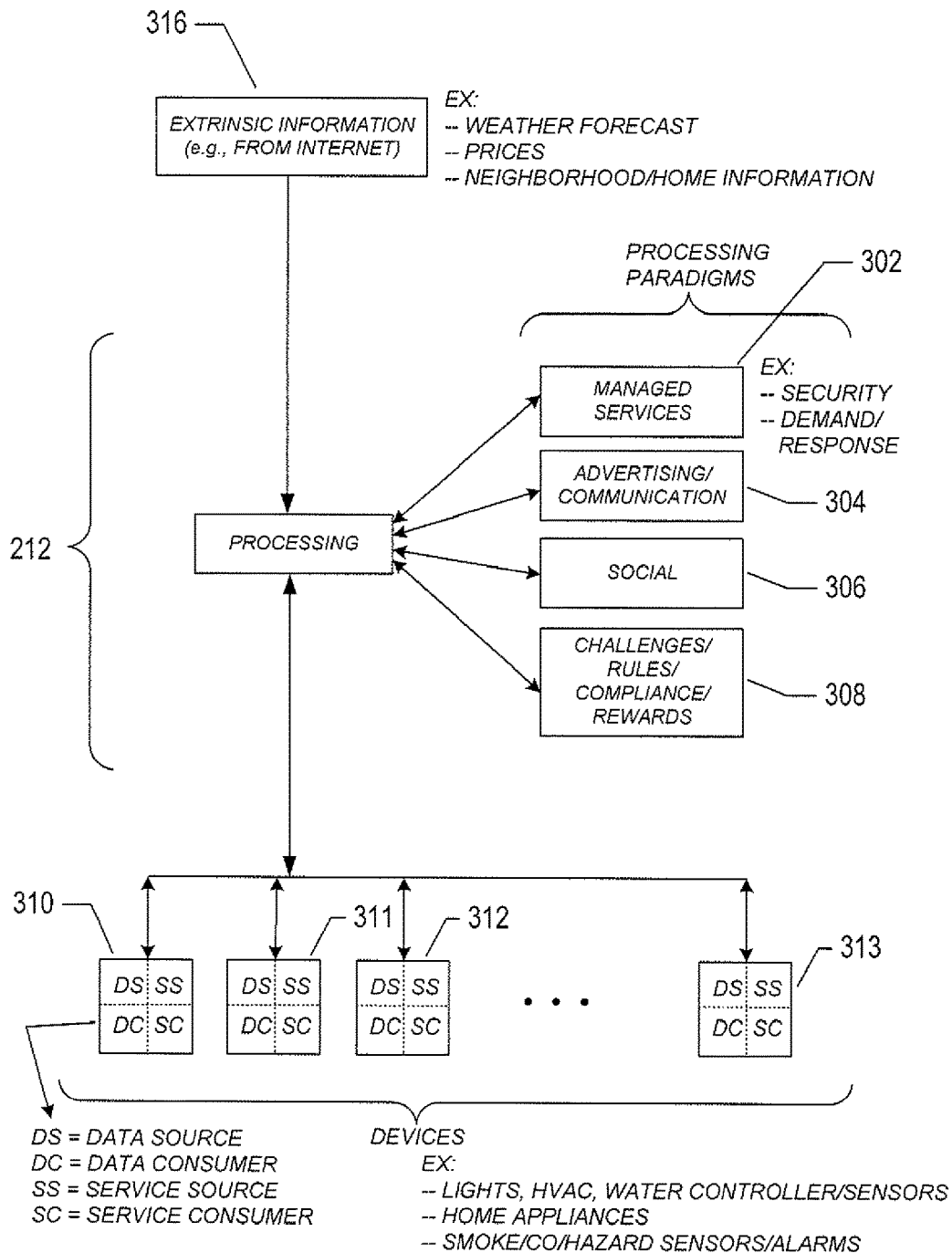
FIG. 3 illustrates information processing within the environment of intercommunicating entities illustrated in FIG. 2.

FIG. 3 illustrates information processing within the environment of intercommunicating entities illustrated in FIG. 2. The various processing engines 212 within the external data-processing system 210 can process data with respect to a variety of different goals, including provision of managed services 302, various types of advertizing and communications 304, social-networking exchanges and other electronic social communications 306, and for various types of monitoring and rule-generation activities 308. The various processing engines 212 communicate directly or indirectly with smart-home devices 310-313, each of which may have data-consumer ("DC"), data-source ("DS"), services-consumer ("SC"), and services-source ("SS") characteristics. In addition, the processing engines may access various other types of external information 316, including information obtained through the Internet, various remote information sources, and even remote sensor, audio, and video feeds and sources.

Figure 4:
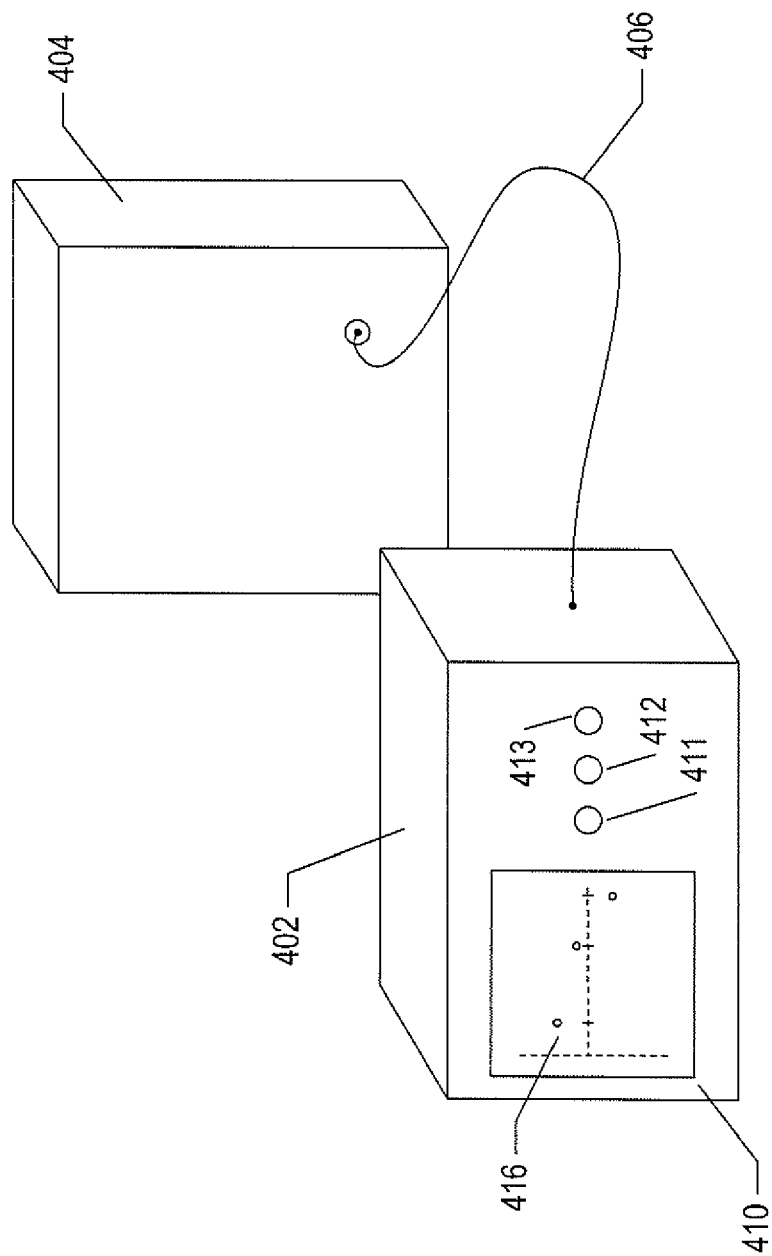
FIG. 4 illustrates a general class of intelligent controllers to which the current application is directed.

Methods and Implementations for Monitoring Progress and Dynamically Altering Control by an Intelligent Controller FIG. 4 illustrates a general class of intelligent controllers to which the current application is directed. The intelligent controller 402 controls a device, machine, system, or organization 404 via any of various different types of output control signals and receives information about the controlled entity and an environment from sensor output received by the intelligent controller from sensors embedded within the controlled entity 404, the intelligent controller 402, or in the environment. In FIG. 4, the intelligent controller is shown connected to the controlled entity 404 via a wire or fiber-based communications medium 406. However, the intelligent controller may be interconnected with the controlled entity by alternative types of communications media and communications protocols, including wireless communications. In many cases, the intelligent controller and controlled entity may be implemented and packaged together as a single system that includes both the intelligent controller and a machine, device, system, or organization controlled by the intelligent controller. The controlled entity may include multiple devices, machines, system, or organizations and the intelligent controller may itself be distributed among multiple components and discrete devices and systems. In addition to outputting control signals to controlled entities and receiving sensor input, the intelligent controller also provides a user interface 410-413 through which a human user can input immediate-control inputs to the intelligent controller as well as create and modify the various types of control schedules, and may also provide the immediate-control and schedule interfaces to remote entities, including a user-operated processing device or a remote automated control system. In FIG. 4, the intelligent controller provides a graphical-display component 410 that displays a control schedule 416 and includes a number of input components 411-413 that provide a user interface for input of immediate-control directives to the intelligent controller for controlling the controlled entity or entities and input of scheduling-interface commands that control display of one or more control schedules, creation of control schedules, and modification of control schedules.

To summarize, the general class of intelligent controllers to which the current is directed receive sensor input, output control signals to one or more controlled entities, and provide a user interface that allows users to input immediate-control command inputs to the intelligent controller for translation by the intelligent controller into output control signals as well as to create and modify one or more control schedules that specify desired controlled-entity operational behavior over one or more time periods. The user interface may be included within the intelligent controller as input and display devices, may be provided through remote devices, including mobile phones, or may be provided both through controller-resident components as well as through remote devices. These basic functionalities and features of the general class of intelligent controllers provide a basis upon which automated control-schedule learning, to which the current application is directed, can be implemented.

Figure 5:
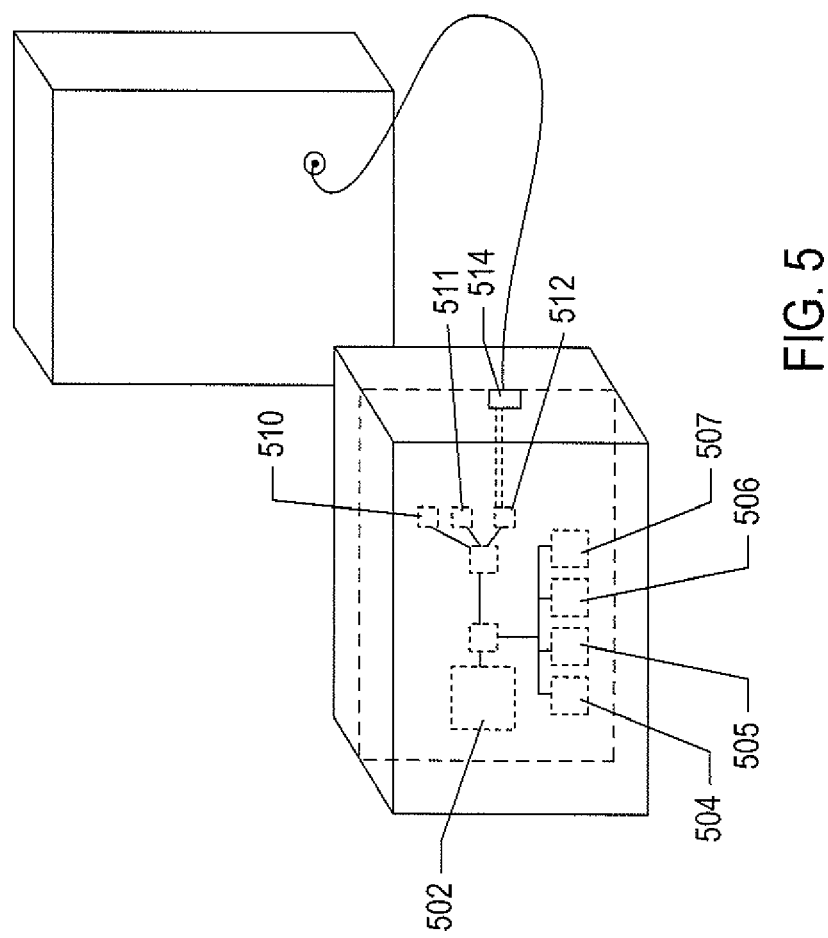
FIG. 5 illustrates additional internal features of an intelligent controller.

FIG. 5 illustrates additional internal features of an intelligent controller. An intelligent controller is generally implemented using one or more processors 502, electronic memory 504-507, and various types of microcontrollers 510-512, including a microcontroller 512 and transceiver 514 that together implement a communications port that allows the intelligent controller to exchange data and commands with one or more entities controlled by the intelligent controller, with other intelligent controllers, and with various remote computing facilities, including cloud-computing facilities through cloud-computing servers. Often, an intelligent controller includes multiple different communications ports and interfaces for communicating by various different protocols through different types of communications media. It is common for intelligent controllers, for example, to use wireless communications to communicate with other wireless-enabled intelligent controllers within an environment and with mobile-communications carriers as well as any of various wired communications protocols and media. In certain cases, an intelligent controller may use only a single type of communications protocol, particularly when packaged together with the controlled entities as a single system. Electronic memories within an intelligent controller may include both volatile and non-volatile memories, with low-latency, high-speed volatile memories facilitating execution of control routines by the one or more processors and slower, non-volatile memories storing control routines and data that need to survive power-on/power-off cycles. Certain types of intelligent controllers may additionally include mass-storage devices.

Figure 6:
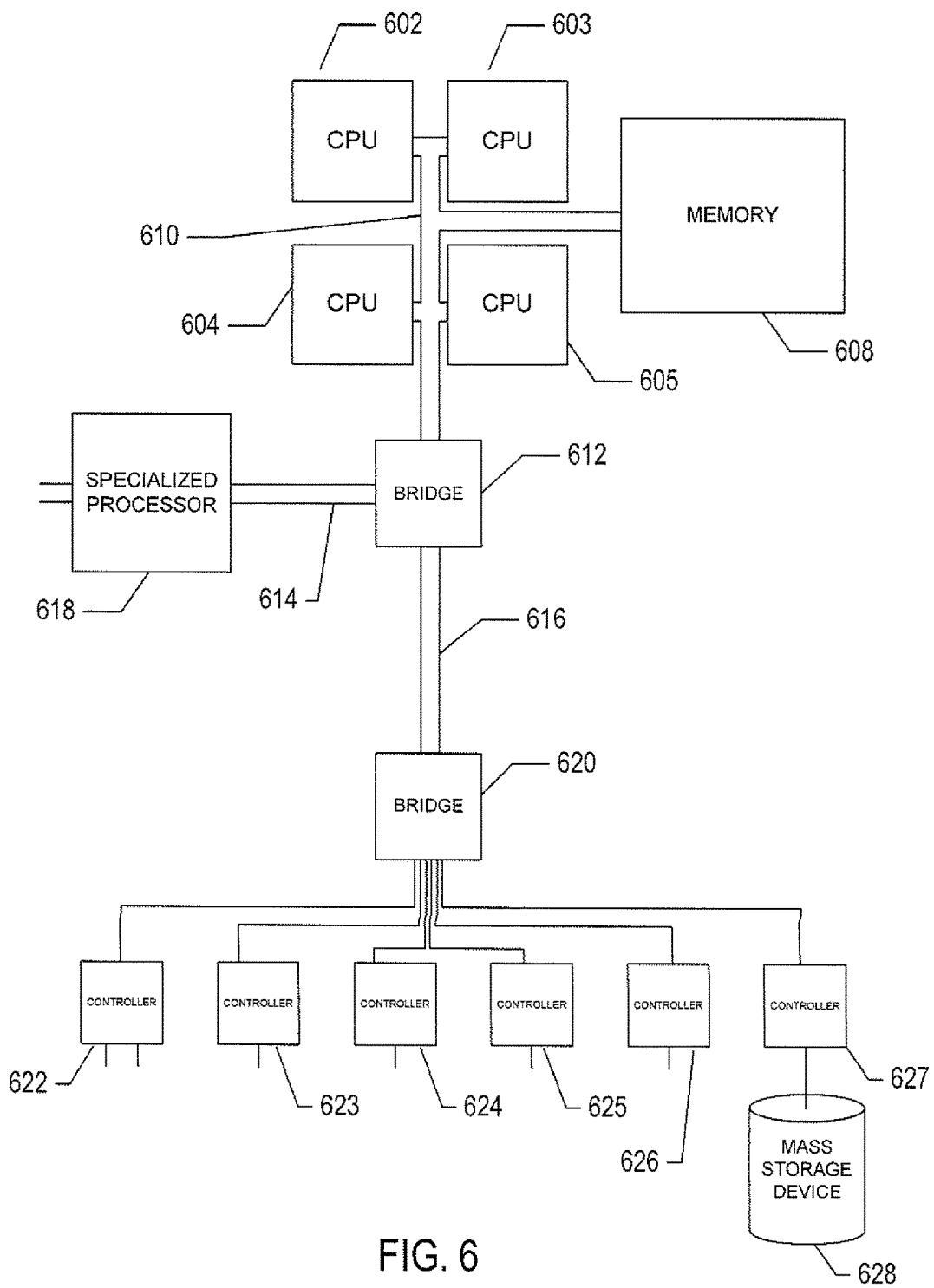
FIG. 6 illustrates a generalized computer architecture that represents an example of the type of computing machinery that may be included in an intelligent controller, server computer, and other processor-based intelligent devices and systems.

FIG. 6 illustrates a generalized computer architecture that represents an example of the type of computing machinery that may be included in an intelligent controller, server computer, and other processor-based intelligent devices and systems. The computing machinery includes one or multiple central processing units ("CPUs") 602-605, one or more electronic memories 608 interconnected with the CPUs by a CPU/memory-subsystem bus 610 or multiple busses, a first bridge 612 that interconnects the CPU/memory-subsystem bus 610 with additional busses 614 and 616 and/or other types of high-speed interconnection media, including multiple, high-speed serial interconnects. These busses and/or serial interconnections, in turn, connect the CPUs and memory with specialized processors, such as a graphics processor 618, and with one or more additional bridges 620, which are interconnected with high-speed serial links or with multiple controllers 622-627, such as controller 627, that provide access to various different types of mass-storage devices 628, electronic displays, input devices, and other such components, subcomponents, and computational resources.

Figure 7:
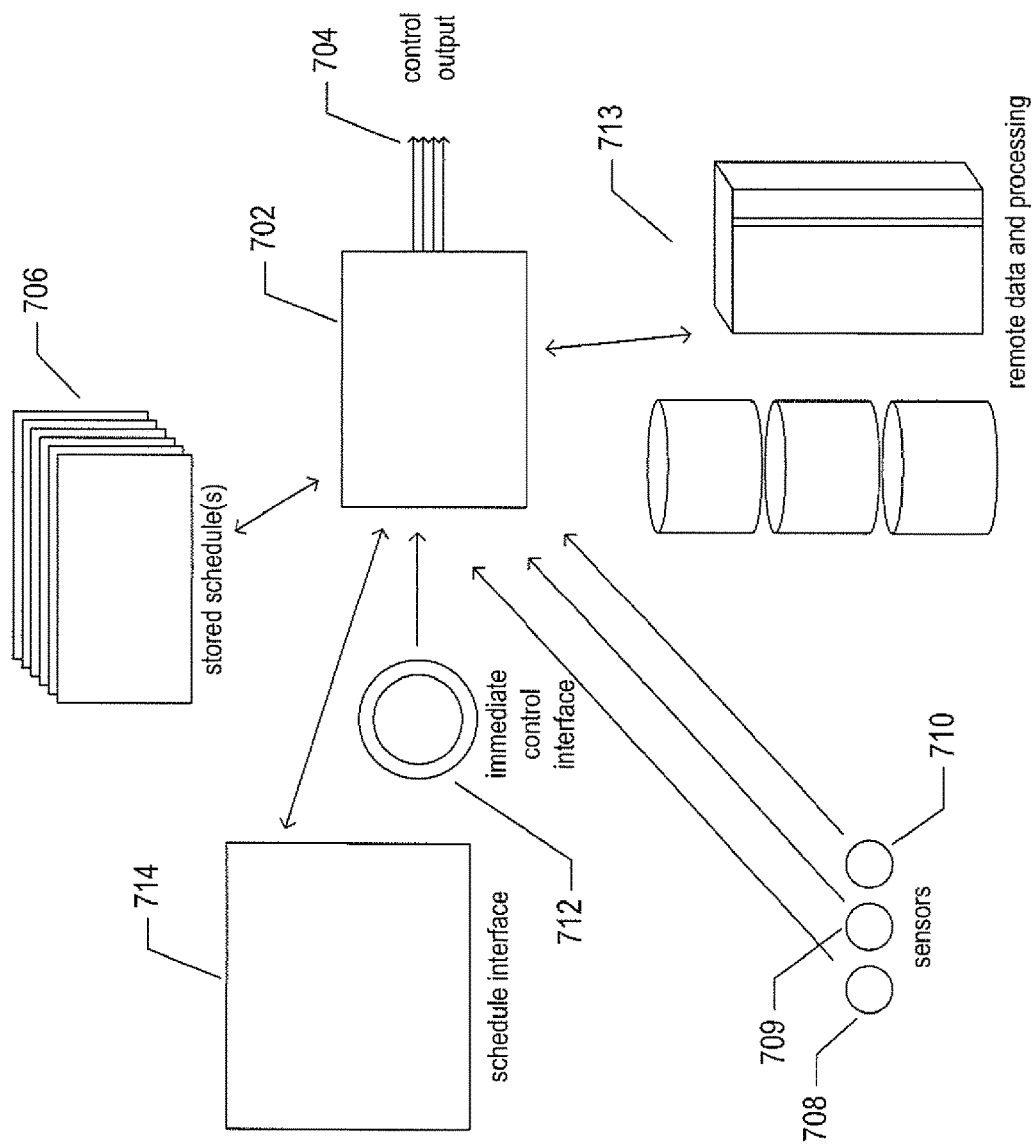
FIG. 7 illustrates features and characteristics of an intelligent controller of the general class of intelligent controllers to which the current application is directed.

FIG. 7 illustrates features and characteristics of an intelligent controller of the general class of intelligent controllers to which the current application is directed. An intelligent controller includes controller logic 702 generally implemented as electronic circuitry and processor-based computational components controlled by computer instructions stored in physical data-storage components, including various types of electronic memory and/or mass-storage devices. It should be noted, at the onset, that computer instructions stored in physical data-storage devices and executed within processors comprise the control components of a wide variety of modern devices, machines, and systems, and are as tangible, physical, and real as any other component of a device, machine, or system. Occasionally, statements are encountered that suggest that computer-instruction-implemented control logic is "merely software" or something abstract and less tangible than physical machine components. Those familiar with modern science and technology understand that this is not the case. Computer instructions executed by processors must be physical entities stored in physical devices. Otherwise, the processors would not be able to access and execute the instructions. The term "software" can be applied to a symbolic representation of a program or routine, such as a printout or displayed list of programming-language statements, but such symbolic representations of computer programs are not executed by processors. Instead, processors fetch and execute computer instructions stored in physical states within physical data-storage devices. Similarly, computer-readable media are physical data-storage media, such as disks, memories, and mass-storage devices that store data in a tangible, physical form that can be subsequently retrieved from the physical data-storage media.

The controller logic accesses and uses a variety of different types of stored information and inputs in order to generate output control signals 704 that control the operational behavior of one or more controlled entities. The information used by the controller logic may include one or more stored control schedules 706, received output from one or more sensors 708-710, immediate control inputs received through an immediate-control interface 712, and data, commands, and other information received from remote data-processing systems, including cloud-based data-processing systems 713. In addition to generating control output 704, the controller logic provides an interface 714 that allows users to create and modify control schedules and may also output data and information to remote entities, other intelligent controllers, and to users through an information-output interface.

Figure 8:
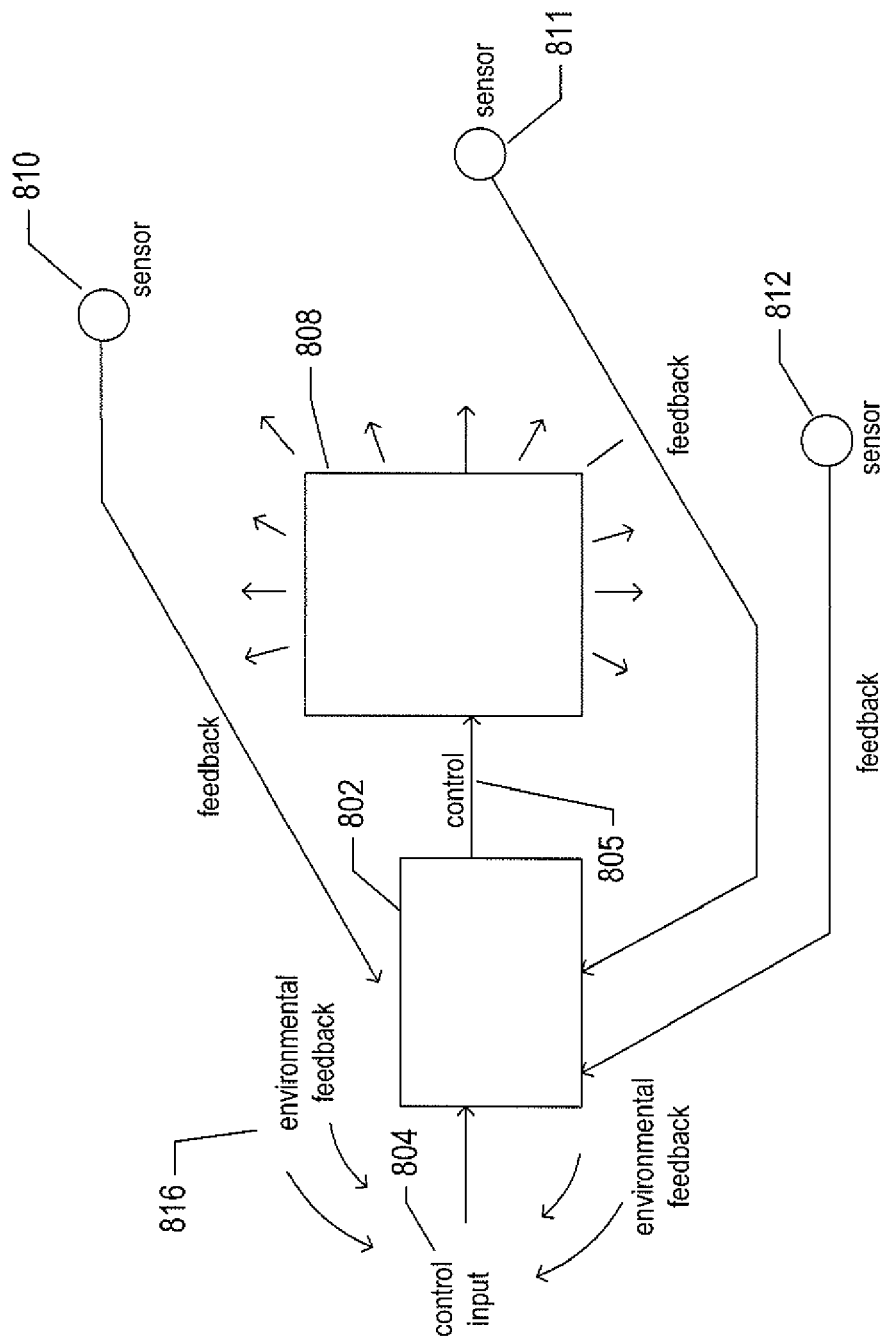
FIG. 8 illustrates a typical control environment within which an intelligent controller operates.

FIG. 8 illustrates a typical control environment within which an intelligent controller operates. As discussed above, an intelligent controller 802 receives control inputs from users or other entities 804 and uses the control inputs, along with stored control schedules and other information, to generate output control signals 805 that control operation of one or more controlled entities 808. Operation of the controlled entities may alter an environment within which sensors 810-812 are embedded. The sensors return sensor output, or feedback, to the intelligent controller 802. Based on this feedback, the intelligent controller modifies the output control signals in order to achieve a specified goal or goals for controlled-system operation. In essence, an intelligent controller modifies the output control signals according to two different feedback loops. The first, most direct feedback loop includes output from sensors that the controller can use to determine subsequent output control signals or control-output modification in order to achieve the desired goal for controlled-system operation. In many cases, a second feedback loop involves environmental or other feedback 816 to users which, in turn, elicits subsequent user control and scheduling inputs to the intelligent controller 802. In other words, users can either be viewed as another type of sensor that outputs immediate-control directives and control-schedule changes, rather than raw sensor output, or can be viewed as a component of a higher-level feedback loop.

Figure 9:
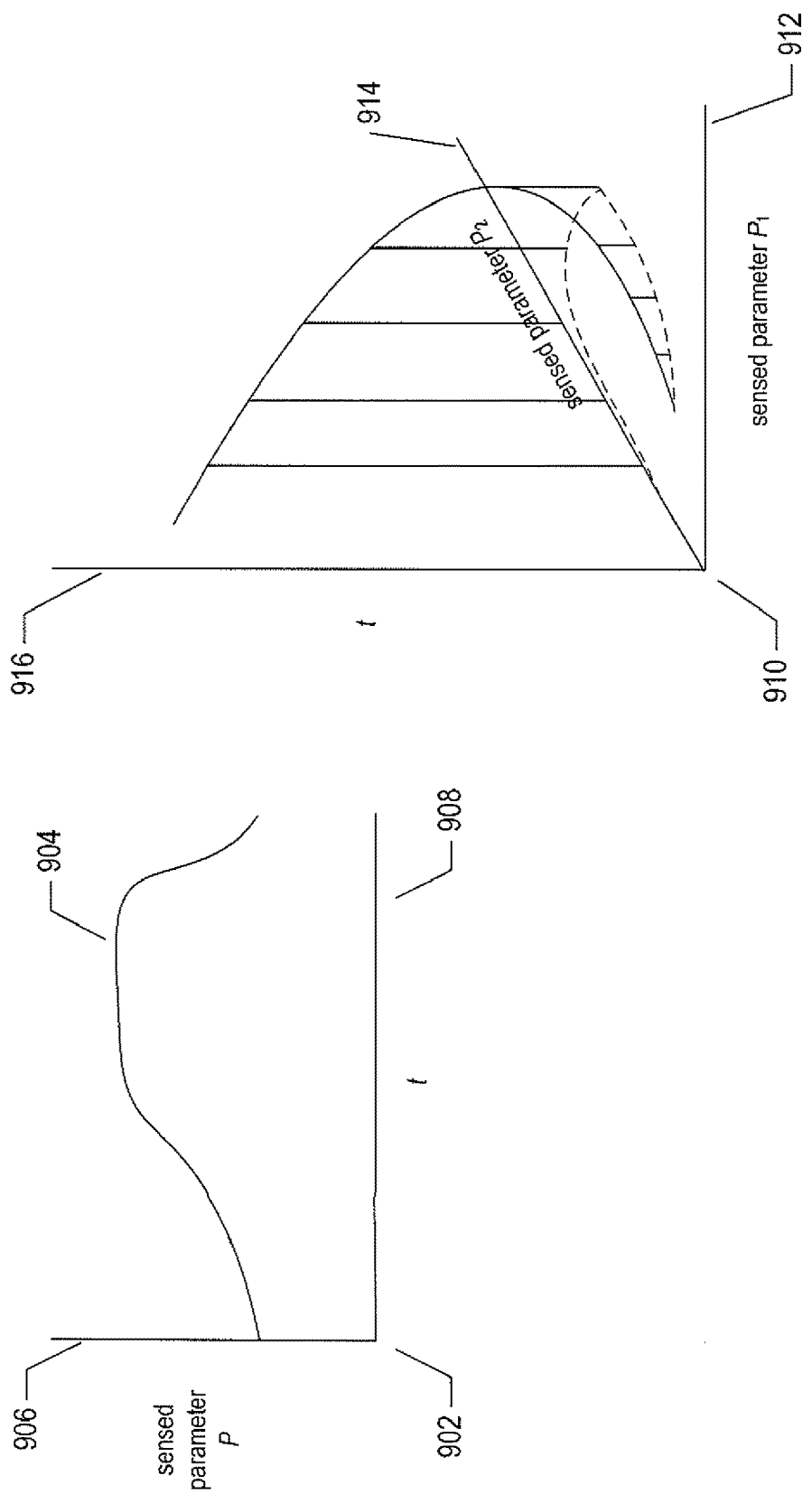
FIG. 9 illustrates the general characteristics of sensor output.

There are many different types of sensors and sensor output. In general, sensor output is directly or indirectly related to some type of parameter, machine state, organization state, computational state, or physical environmental parameter. FIG. 9 illustrates the general characteristics of sensor output. As shown in a first plot 902 in FIG. 9, a sensor may output a signal, represented by curve 904, over time, with the signal directly or indirectly related to a parameter P, plotted with respect to the vertical axis 906. The sensor may output a signal continuously or at intervals, with the time of output plotted with respect to the horizontal axis 908. In certain cases, sensor output may be related to two or more parameters. For example, in plot 910, a sensor outputs values directly or indirectly related to two different parameters $P_1$ and $P_2$, plotted with respect to axes 912 and 914, respectively, over time, plotted with respect to vertical axis 916. In the following discussion, for simplicity of illustration and discussion, it is assumed that sensors produce output directly or indirectly related to a single parameter, as in plot 902 in FIG. 9. In the following discussion, the sensor output is assumed to be a set of parameter values for a parameter P. The parameter may be related to environmental conditions, such as temperature, ambient light level, sound level, and other such characteristics. However, the parameter may also be the position or positions of machine components, the data states of memory-storage address in data-storage devices, the current drawn from a power supply, the flow rate of a gas or fluid, the pressure of a gas or fluid, and many other types of parameters that comprise useful information for control purposes.

Figure 10A:
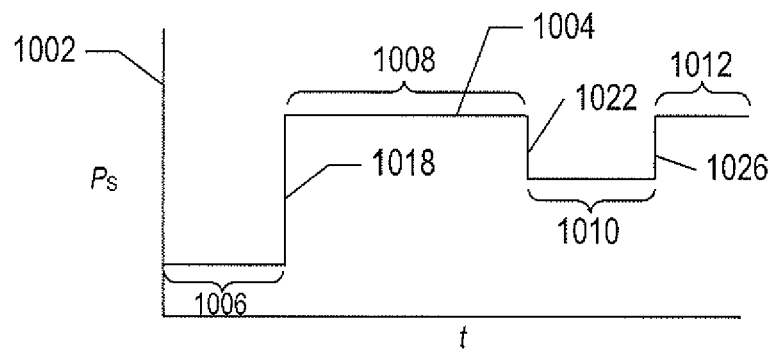
FIGS. 10A-D illustrate information processed and generated by an intelligent controller during control operations.

FIGS. 10A-D illustrate information processed and generated by an intelligent controller during control operations. All the figures show plots, similar to plot 902 in FIG. 9, in which values of a parameter or another set of control-related values are plotted with respect to a vertical axis and time is plotted with respect to a horizontal axis. FIG. 10A shows an idealized specification for the results of controlled-entity operation. The vertical axis 1002 in FIG. 10A represents a specified parameter value, $P_S$. For example, in the case of an intelligent thermostat, the specified parameter value may be temperature. For an irrigation system, by contrast, the specified parameter value may be flow rate. FIG. 10A is the plot of a continuous curve 1004 that represents desired parameter values, over time, that an intelligent controller is directed to achieve through control of one or more devices, machines, or systems. The specification indicates that the parameter value is desired to be initially low 1006, then rise to a relatively high value 1008, then subside to an intermediate value 1010, and then again rise to a higher value 1012. A control specification can be visually displayed to a user, as one example, as a control schedule.

Figure 10B:
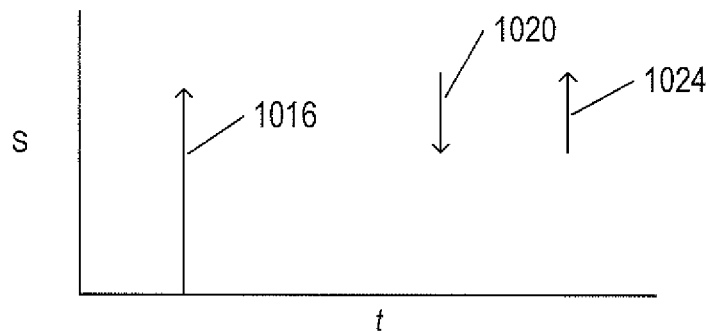

FIG. 10B shows an alternate view, or an encoded-data view, of a control schedule corresponding to the control specification illustrated in FIG. 10A. The control schedule includes indications of a parameter-value increase 1016 corresponding to edge 1018 in FIG. 10A, a parameter-value decrease 1020 corresponding to edge 1022 in FIG. 10A, and a parameter-value increase 1024 corresponding to edge 1016 in FIG. 10A. The directional arrows plotted in FIG. 10B can be considered to be setpoint changes, or indications of desired parameter changes at particular points in time within some period of time.

A setpoint change may be stored as a record with multiple fields, including fields that indicate whether the setpoint change is a system-generated setpoint or a user-generated setpoint, whether the setpoint change is an immediate-control-input setpoint change or a scheduled setpoint change, the time and date of creation of the setpoint change, the time and date of the last edit of the setpoint change, and other such fields. In addition, a setpoint may be associated with two or more parameter values. As one example, a range setpoint may indicate a range of parameter values within which the intelligent controller should maintain a controlled environment. Setpoint changes are often referred to as "setpoints."

Figure 10C:
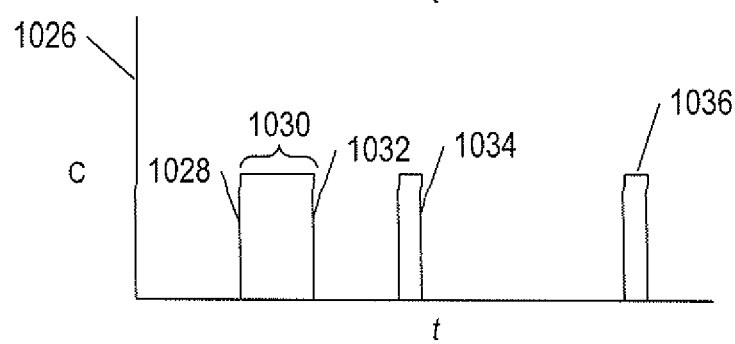

FIG. 10C illustrates the control output by an intelligent controller that might result from the control schedule illustrated in FIG. 10B. In this figure, the magnitude of an output control signal is plotted with respect to the vertical axis 1026. For example, the control output may be a voltage signal output by an intelligent thermostat to a heating unit, with a high-voltage signal indicating that the heating unit should be currently operating and a low-voltage output indicating that the heating system should not be operating. Edge 1028 in FIG. 10C corresponds to setpoint 1016 in FIG. 10B. The width of the positive control output 1030 may be related to the length, or magnitude, of the desired parameter-value change, indicated by the length of setpoint arrow 1016. When the desired parameter value is obtained, the intelligent controller discontinues output of a high-voltage signal, as represented by edge 1032. Similar positive output control signals 1034 and 1036 are elicited by setpoints 1020 and 1024 in FIG. 10B.

Figure 10D:
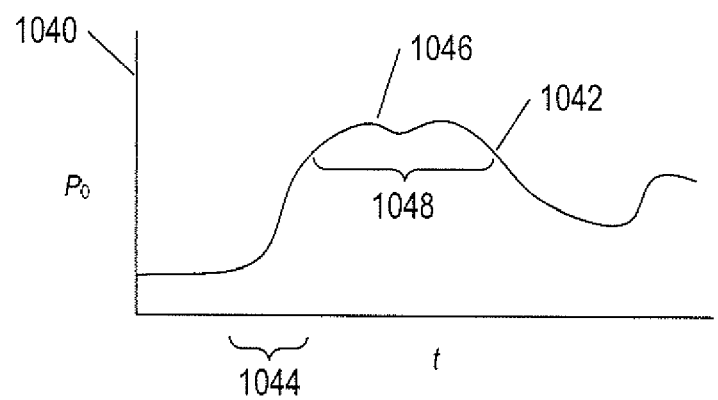

Finally, FIG. 10D illustrates the observed parameter changes, as indicated by sensor output, resulting from control, by the intelligent controller, of one or more controlled entities. In FIG. 10D, the sensor output, directly or indirectly related to the parameter P, is plotted with respect to the vertical axis 1040. The observed parameter value is represented by a smooth, continuous curve 1042. Although this continuous curve can be seen to be related to the initial specification curve, plotted in FIG. 10A, the observed curve does not exactly match that specification curve. First, it may take a finite period of time 1044 for the controlled entity to achieve the parameter-valued change represented by setpoint 1016 in the control schedule plotted in FIG. 10B. Also, once the parameter value is obtained, and the controlled entity directed to discontinue operation, the parameter value may begin to fall 1046, resulting in a feedback-initiated control output to resume operation of the controlled entity in order to maintain the desired parameter value. Thus, the desired high-level constant parameter value 1008 in FIG. 10A may, in actuality, end up as a time-varying curve 1048 that does not exactly correspond to the control specification 1004. The first level of feedback, discussed above with reference to FIG. 8, is used by the intelligent controller to control one or more control entities so that the observed parameter value, over time, as illustrated in FIG. 10D, matches the specified time behavior of the parameter in FIG. 10A as closely as possible. The second level feedback control loop, discussed above with reference to FIG. 8, may involve alteration of the specification, illustrated in FIG. 10A, by a user, over time, either by changes to stored control schedules or by input of immediate-control directives, in order to generate a modified specification that produces a parameter-value/time curve reflective of a user's desired operational results.

Figure 11A:
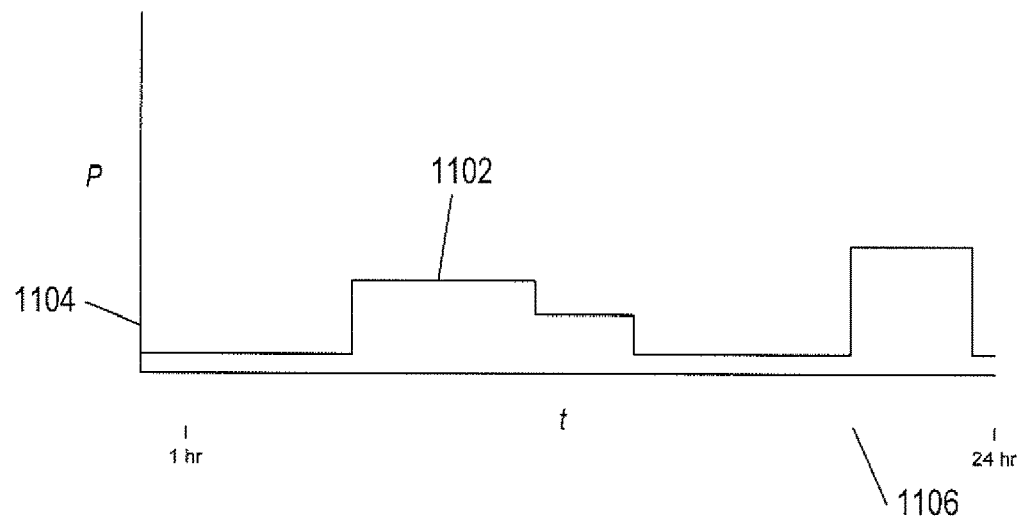
FIGS. 11A-C show three different types of control schedules.
Figure 11B:
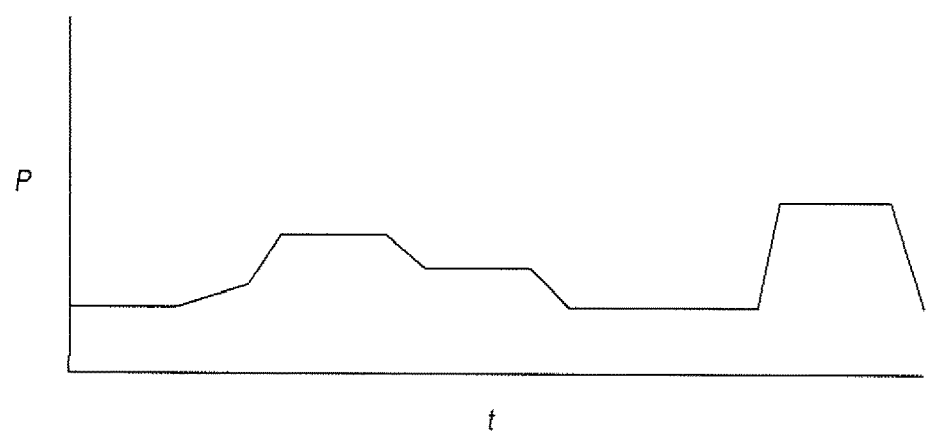
Figure 11C:
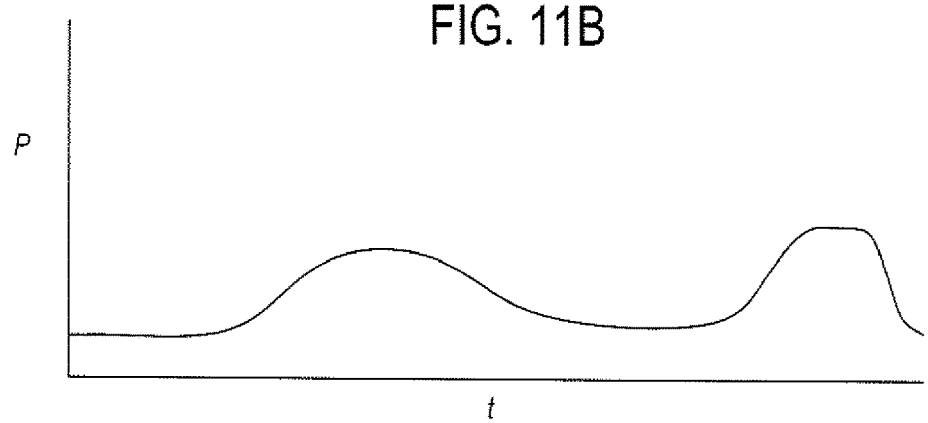

FIGS. 11A-C show three different types of control schedules. In FIG. 11A, the control schedule is a continuous curve 1102 representing a parameter value, plotted with respect to the vertical axis 1104, as a function of time, plotted with respect to the horizontal axis 1106. The continuous curve comprises only horizontal and vertical sections. Horizontal sections represent periods of time at which the parameter is desired to remain constant and vertical sections represent desired changes in the parameter value at particular points in time. This is a simple type of control schedule and is used, below, in various examples of automated control-schedule learning. However, automated control-schedule-learning methods can also learn more complex types of schedules. For example, FIG. 11B shows a control schedule that includes not only horizontal and vertical segments, but arbitrarily angled straight-line segments. Thus, a change in the parameter value may be specified, by such a control schedule, to occur at a given rate, rather than specified to occur instantaneously, as in the simple control schedule shown in FIG. 11A. Automated-control-schedule-learning methods may also accommodate smooth-continuous-curve-based control schedules, such as that shown in FIG. 11C. In general, the characterization and data encoding of smooth, continuous-curve-based control schedules, such as that shown in FIG. 11C, is more complex and includes a greater amount of stored data than the simpler control schedules shown in FIGS. 11B and 11A.

Setpoint changes, often referred to simple as "setpoints," are generally encoded as records within electronic memory and/or mass-storage devices, In the following discussion, it is generally assumed that a parameter value tends to relax towards lower values in the absence of system operation, such as when the parameter value is temperature and the controlled system is a heating unit. However, in other cases, the parameter value may relax toward higher values in the absence of system operation, such as when the parameter value is temperature and the controlled system is an air conditioner. The direction of relaxation often corresponds to the direction of lower resource or expenditure by the system. In still other cases, the direction of relaxation may depend on the environment or other external conditions, such as when the parameter value is temperature and the controlled system is an HVAC system including both heating and cooling functionality.

Turning to the control schedule shown in FIG. 11A, the continuous-curve-represented control schedule 1102 may be alternatively encoded as discrete setpoints corresponding to vertical segments, or edges, in the continuous curve. A continuous-curve control schedule is generally used, in the following discussion, to represent a stored control schedule either created by a user or remote entity via a schedule-creation interface provided by the intelligent controller or created by the intelligent controller based on already-existing control schedules, recorded immediate-control inputs, and/or recorded sensor data, or a combination of these types of information.

Figure 12A:
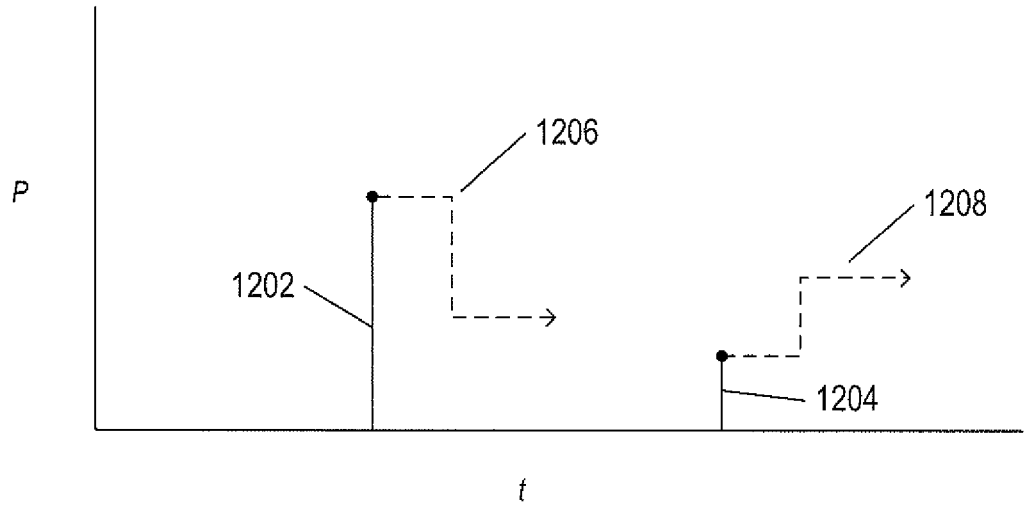
FIGS. 12A-G show representations of immediate-control inputs that may be received and executed by an intelligent controller, and then recorded and overlaid onto control schedules, such as those discussed above with reference to FIGS. 11A-C, as part of automated control-schedule learning.

Immediate-control inputs are also graphically represented in parameter-value versus time plots. FIGS. 12A-G show representations of immediate-control inputs that may be received and executed by an intelligent controller, and then recorded and overlaid onto control schedules, such as those discussed above with reference to FIGS. 11A-C, as part of automated control-schedule learning. An immediate-control input is represented graphically by a vertical line segment that ends in a small filled or shaded disk. FIG. 12A shows representations of two immediate-control inputs 1202 and 1204. An immediate-control input is essentially equivalent to an edge in a control schedule, such as that shown in FIG. 11A, that is input to an intelligent controller by a user or remote entity with the expectation that the input control will be immediately carried out by the intelligent controller, overriding any current control schedule specifying intelligent-controller operation. An immediate-control input is therefore a real-time setpoint input through a control-input interface to the intelligent controller.

Because an immediate-control input alters the current control schedule, an immediate-control input is generally associated with a subsequent, temporary control schedule, shown in FIG. 12A as dashed horizontal and vertical lines that form a temporary-control-schedule parameter vs. time curve extending forward in time from the immediate-control input. Temporary control schedules 1206 and 1208 are associated with immediate-control inputs 1202 and 1204, respectively, in FIG. 12A.

Figure 12B:
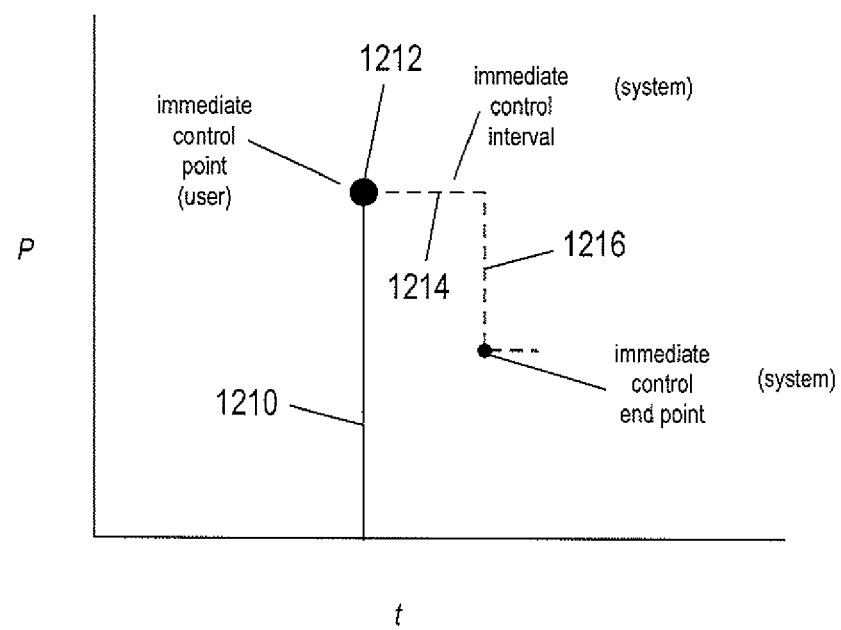

FIG. 12B illustrates an example of immediate-control input and associated temporary control schedule. The immediate-control input 1210 is essentially an input setpoint that overrides the current control schedule and directs the intelligent controller to control one or more controlled entities in order to achieve a parameter value equal to the vertical coordinate of the filled disk 1212 in the representation of the immediate-control input. Following the immediate-control input, a temporary constant-temperature control-schedule interval 1214 extends for a period of time following the immediate-control input, and the immediate-control input is then relaxed by a subsequent immediate-control-input endpoint, or subsequent setpoint 1216. The length of time for which the immediate-control input is maintained, in interval 1214, is a parameter of automated control-schedule learning. The direction and magnitude of the subsequent immediate-control-input endpoint setpoint 1216 represents one or more additional automated-control-schedule-learning parameters. Please note that an automated-control-schedule-learning parameter is an adjustable parameter that controls operation of automated control-schedule learning, and is different from the one or more parameter values plotted with respect to time that comprise control schedules. The parameter values plotted with respect to the vertical axis in the example control schedules to which the current discussion refers are related directly or indirectly to observables, including environmental conditions, machines states, and the like.

Figure 12C:
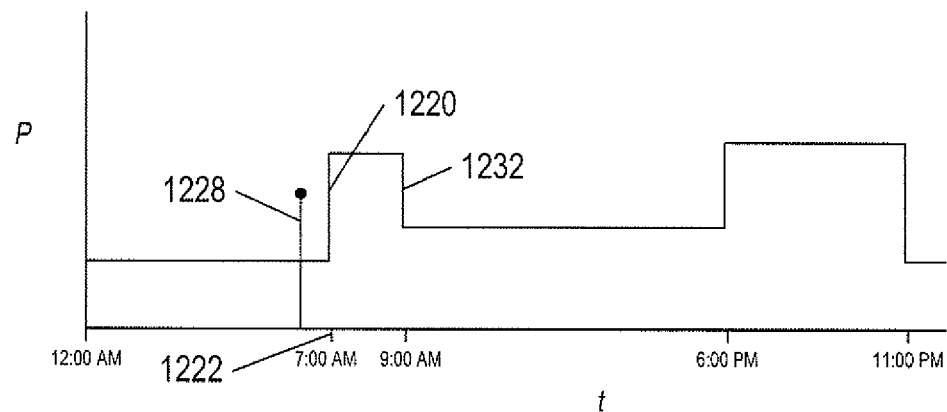
Figure 12D:
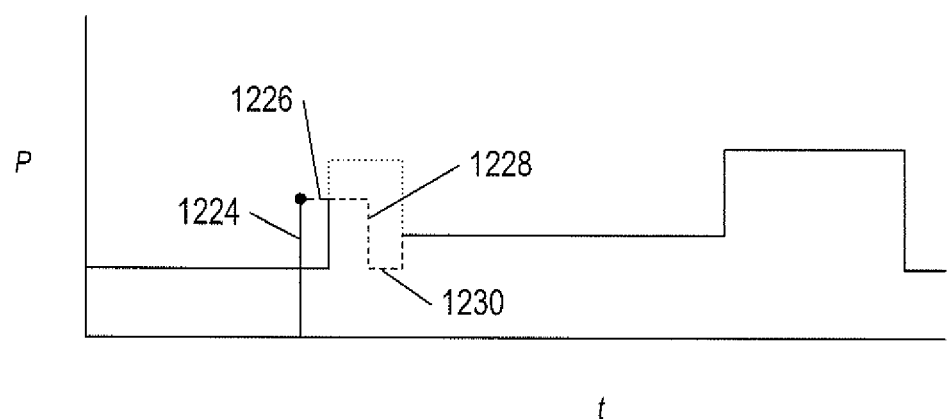

FIG. 12C shows an existing control schedule on which an immediate-control input is superimposed. The existing control schedule called for an increase in the parameter value P, represented by edge 1220, at 7:00 a.m. (1222 in FIG. 12C). The immediate-control input 1224 specifies an earlier parameter-value change of somewhat less magnitude. FIGS. 12D-G illustrate various subsequent temporary control schedules that may obtain, depending on various different implementations of intelligent-controller logic and/or current values of automated-control-schedule-learning parameter values. In FIGS. 12D-G, the temporary control schedule associated with an immediate-control input is shown with dashed line segments and that portion of the existing control schedule overridden by the immediate-control input is shown by dotted line segments. In one approach, shown in FIG. 12D, the desired parameter value indicated by the immediate-control input 1224 is maintained for a fixed period of time 1226 after which the temporary control schedule relaxes, as represented by edge 1228, to the parameter value that was specified by the control schedule at the point in time that the immediate-control input is carried out. This parameter value is maintained 1230 until the next scheduled setpoint, which corresponds to edge 1232 in FIG. 12C, at which point the intelligent controller resumes control according to the control schedule.

Figure 12E:
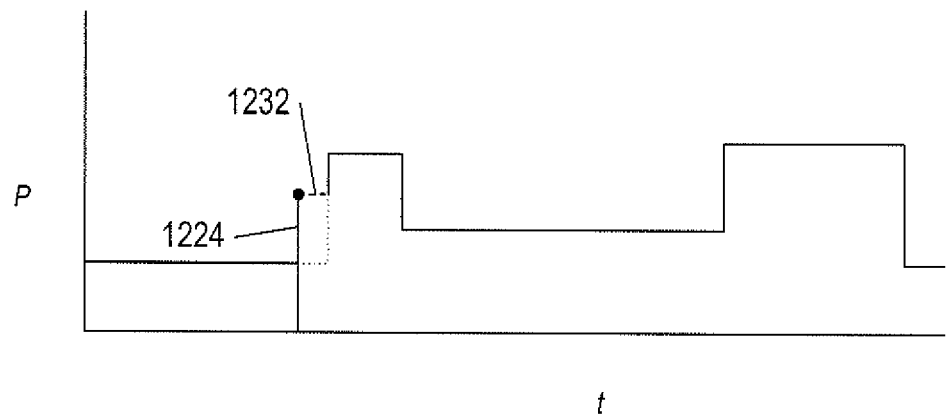

In an alternative approach shown in FIG. 12E, the parameter value specified by the immediate-control input 1224 is maintained 1232 until a next scheduled setpoint is reached, in this case the setpoint corresponding to edge 1220 in the control schedule shown in FIG. 12C. At the next setpoint, the intelligent controller resumes control according to the existing control schedule.

Figure 12F:
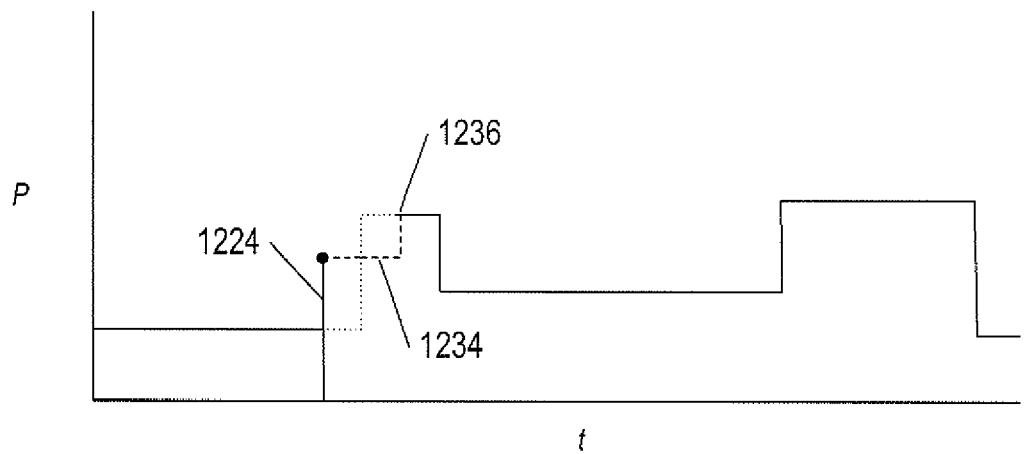

In a different approach, shown in FIG. 12F, the parameter value specified by the immediate-control input 1224 is maintained by the intelligent controller for a fixed period of time 1234, following which the parameter value that would have been specified by the existing control schedule at that point in time is resumed 1236.

Figure 12G:
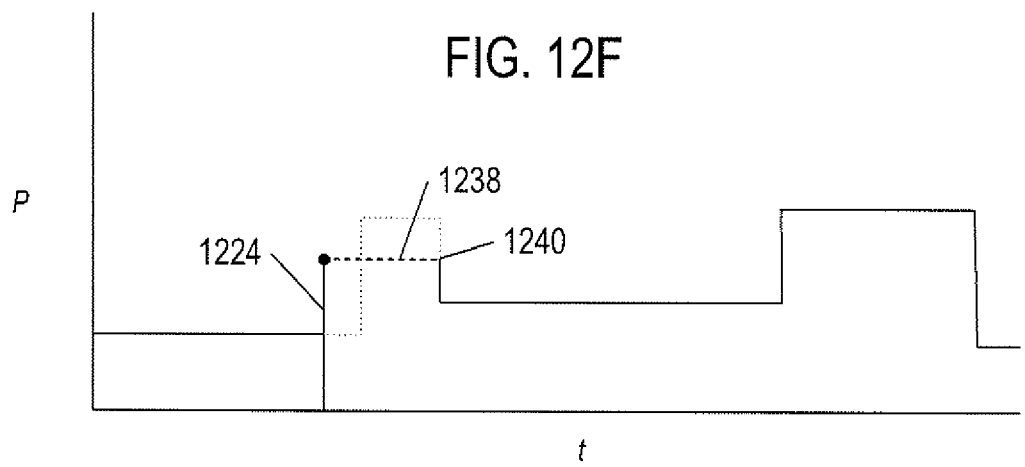

In the approach shown in FIG. 12G, the parameter value specified by the immediate-control input 1224 is maintained 1238 until a setpoint with opposite direction from the immediate-control input is reached, at which the existing control schedule is resumed 1240. In still alternative approaches, the immediate-control input may be relaxed further, to a lowest-reasonable level, in order to attempt to optimize system operation with respect to resource and/or energy expenditure. In these approaches, generally used during aggressive learning, a user is compelled to positively select parameter values greater than, or less than, a parameter value associated with a minimal or low rate of energy or resource usage.

In one example implementation of automated control-schedule learning, an intelligent controller monitors immediate-control inputs and schedule changes over the course of a monitoring period, generally coinciding with the time span of a control schedule or subschedule, while controlling one or more entities according to an existing control schedule except as overridden by immediate-control inputs and input schedule changes. At the end of the monitoring period, the recorded data is superimposed over the existing control schedule and a new provisional schedule is generated by combining features of the existing control schedule and schedule changes and immediate-control inputs. Following various types of resolution, the new provisional schedule is promoted to the existing control schedule for future time intervals for which the existing control schedule is intended to control system operation.

Figure 13A:
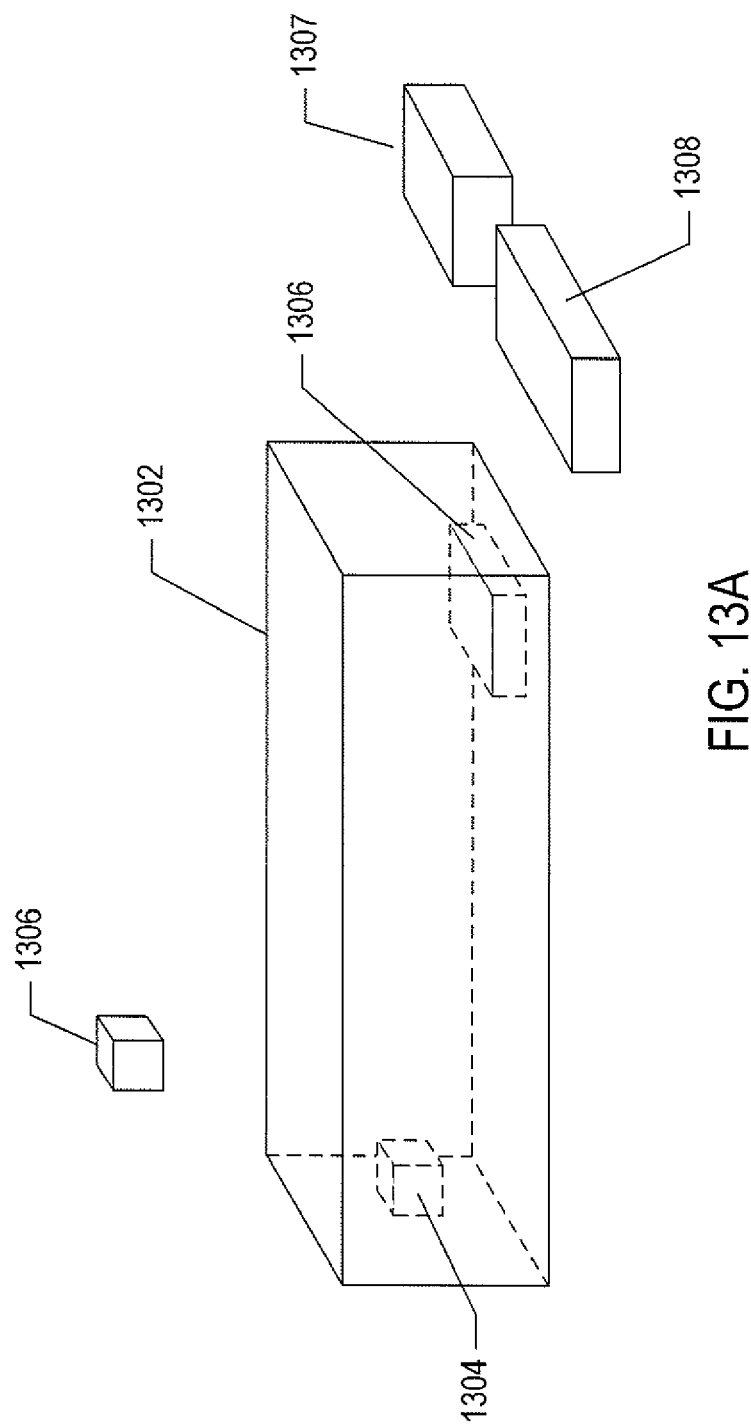
FIGS. 13A-D illustrate the general context in which intelligent controllers, to which the current application is directed, operate.

FIGS. 13A-D illustrate the general context in which intelligent controllers, to which the current application is directed, operate. As shown in FIG. 13A, this context comprises a region or volume 1302, one or more intelligent controllers 1304 and 1306, and one or more devices, systems, or other entities 1306-1308 that are controlled by the one or more intelligent controllers and that operate on the region or volume 1302. In many cases, the intelligent controllers are described as controlling the region or volume 1302 although, in fact, they directly control the one or more devices, systems, or other entities 1306-1308. The region or volume 1302 may be a complex region or volume that includes multiple connected or separate subregions or subvolumes. The region, regions, volume, or volumes controlled by an intelligent controller is referred to, below, as the "controlled environment." The intelligent controllers may reside within the environment, as intelligent controller 1304 shown in FIG. 13A, or may reside externally, as, for example, intelligent controller 1306 in FIG. 13A. Similarly, the devices, systems, or other entities that operate on the environment 1306-1308 may reside within the environment, as, for example, system 1306 in FIG. 13A, or may be located outside of the environment, as, for example, systems 1307-1308 in FIG. 13A. In a specific example discussed in a following subsection, the systems are HVAC systems and/or additional air conditioners and heaters and the intelligent controllers are intelligent thermostats, with the environment a residence, multi-family dwelling, commercial building, or industrial building that is heated, cooled, and/or ventilated by the systems controlled by the intelligent thermostats.

Figure 13B:
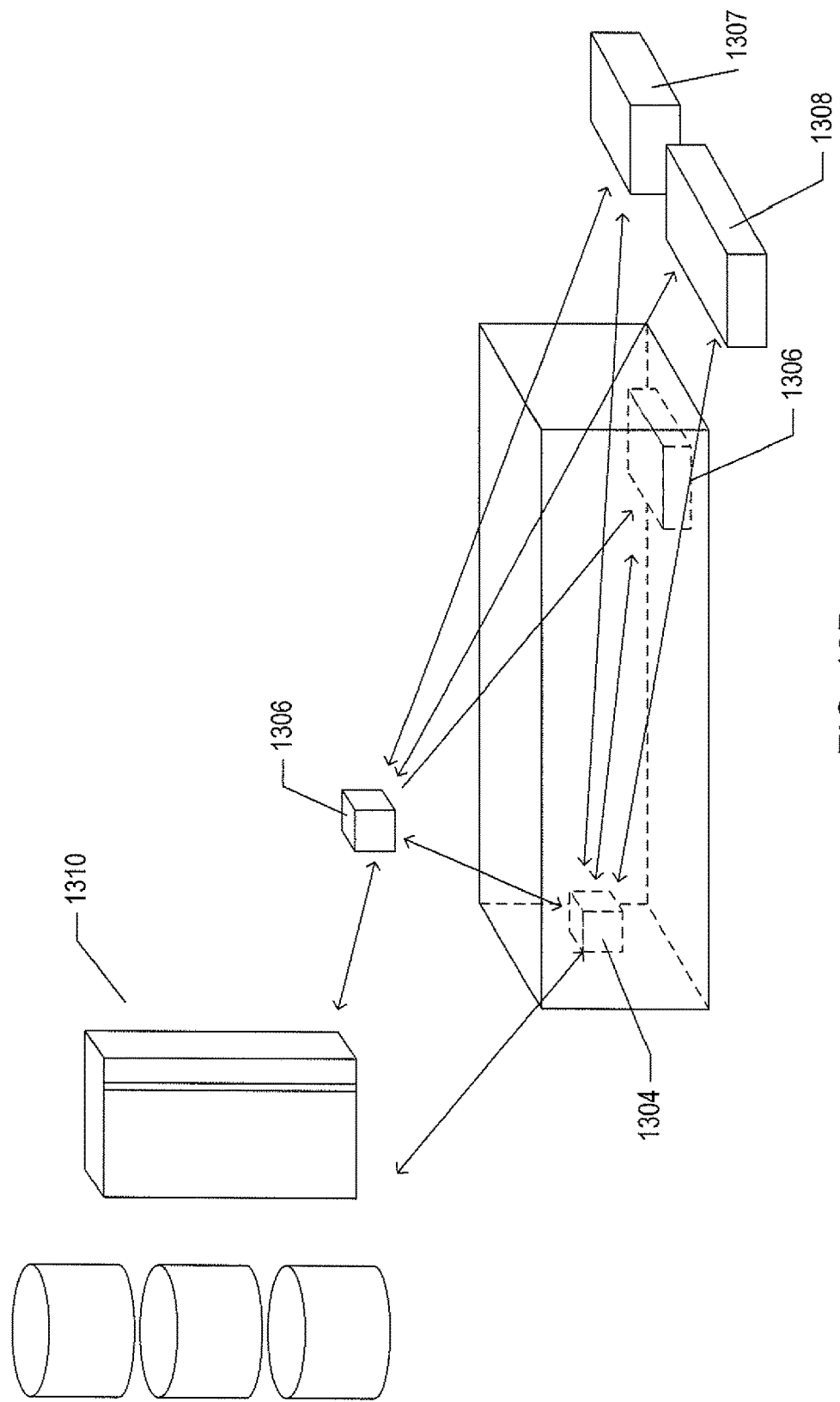
Figure 13C:
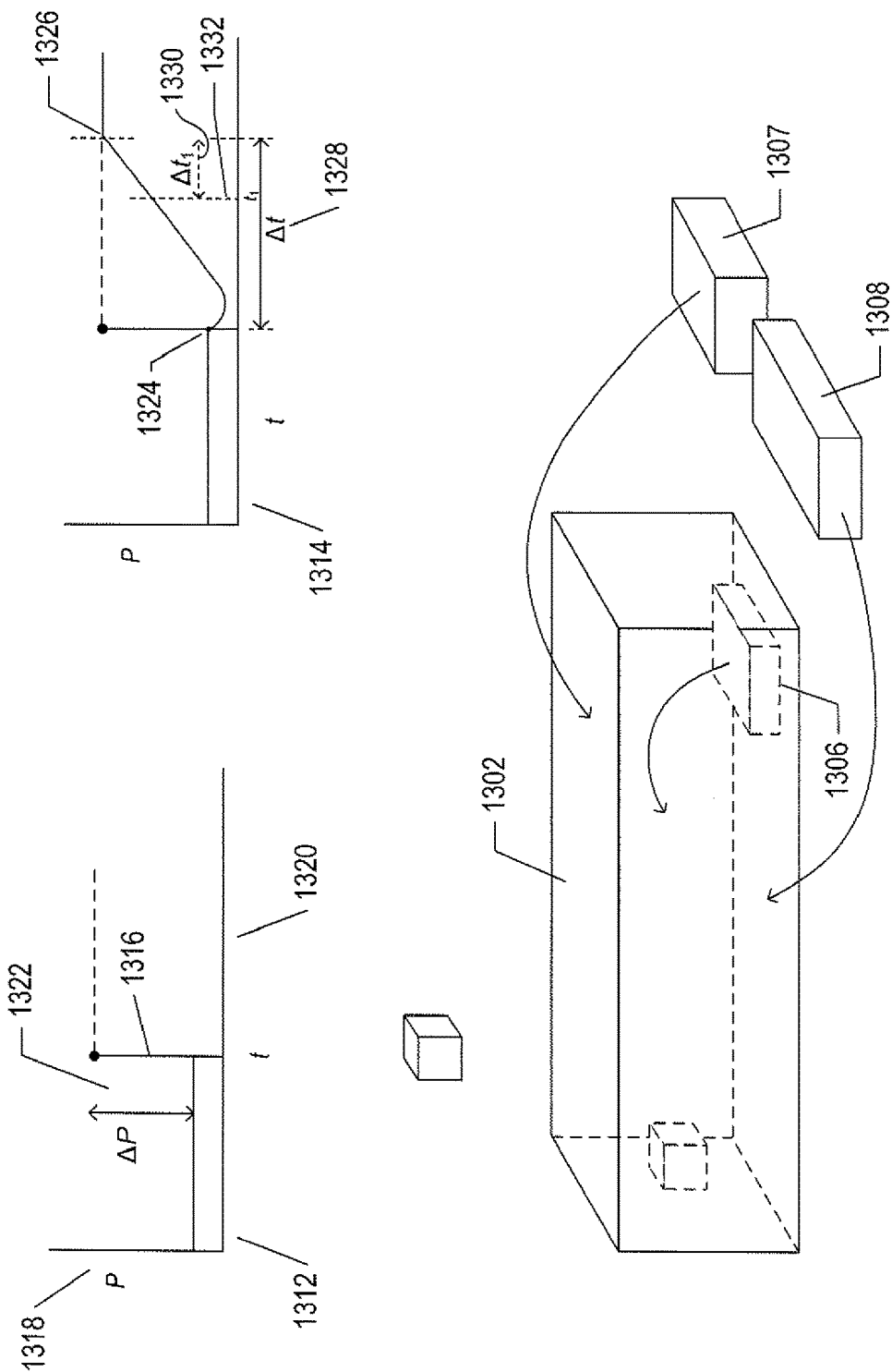

As shown in FIG. 13B, the intelligent controllers 1304 and 1306 generally intercommunicate with one another and may additionally intercommunicate with a remote computing system 1310 to which certain of control tasks and intelligent-control-related computations are distributed. In addition, the intelligent controllers generally output control signals to, and receive data signals from, the systems 1306-1308 controlled by the intelligent controllers. As shown in FIG. 13C, the systems 1306-1308 are controlled by the intelligent controllers to operate on the environment 1302. This operation may involve exchange of various types of substances, operations that result in heat exchange with the environment, exchange of electrical current with the environment, and many other types of operations. These operations generally affect one or more characteristics or parameters of the environment which are directly or indirectly monitored by the intelligent controllers. The intelligent controllers, to which the current application is directed, generally control the environment based on control schedules and immediate-control inputs that can be thought of as overlaid on or added to the control schedules. The context within which the general class of intelligent controllers operates is illustrated, in FIG. 13C, with two plots 1312 and 1314. The first plot 1312 is a portion of a control schedule to which an immediate-control input 1316 has been added. Alternatively, the portion of the control schedule may feature a scheduled setpoint rather than the immediate-control input 1316. The vertical axis is labeled "P" 1318 to represent the value of a particular parameter or characteristic of the environment, referred to as an "environmental parameter," and the horizontal axis represents time 1320. The immediate-control input 1316 or, alternatively, a scheduled setpoint, generally represent a desired change in the parameter or characteristic 1322, designated $\Delta P$. At the time of the immediate-control input, or before or at the time of a scheduled input, the intelligent controller generally outputs control signals to the systems in order to change the parameter or characteristic P by $\Delta P$. It should be noted that, although in the current example $\Delta P$ is positive, with the desired parameter P greater than the current value of the parameter P, the $\Delta P$ may also be negative, with the desired value of P less than the current P. It may also be the case that intelligent controllers control the systems with respect to multiple parameters, in which case there may be separate control schedules for each parameter, and multiple parameters may be combined together to form a composite parameter for a single control schedule. Alternatively, setpoints may be associated with multiple P values for each of one or more environmental parameters. In the following discussion, for simplicity of illustration and discussion, it is assumed that a single parameter P is monitored by the one or more intelligent controllers, each setpoint specifies a single parameter value, and that intelligent controllers output control signals to one or more systems in order to control the value of the parameter P within the controlled environment 1302.

As shown in plot 1314, once intelligent controllers initiate system operation in order to change the value of the parameter P by $\Delta P$, the parameter P changes, over time, in a continuous manner from the initial P value 1324 to the desired P value 1326. In other words, the P values cannot be instantaneously altered at times corresponding to immediate-control inputs or scheduled setpoints. As a result, there is a time interval $\Delta t$ 1328, referred to as the "response time," that separates the time of an immediate-control input or scheduled setpoint change in the time which the parameter value specified by the setpoint change or immediate-control input is achieved. Intelligent controllers to which the current application is directed model the P versus t behavior within this response-time $\Delta t$ interval 1328 so that, at any point in time during the response time, the time remaining to a point in time the desired t value is obtained, or, in other words, the remaining response time, can be displayed or reported. Thus, for example, at time $t_1$ 1330, the intelligent controller calculates the length of time interval $\Delta t_1$ 1332, the remaining response time, and reports the length of this time interval in a textural, graphical, or numeric display output on an intelligent-controller display device, such as display device 410 in FIG. 4, or outputs the information through a remote-display interface for display on a remote display device, such as a smart phone. The information may include a remaining-response-time indication, an indication of the remaining response time relative to the entire response time, information including the response time so far elapsed, and other response-time related information. It should be noted that calculation of the time remaining before a desired P value is achieved may be used independently, for various different intelligent-controller operations, from the display of the remaining response time. For example, intelligent controllers may alter control strategies depending on the remaining response time computed for various different control strategies.

Figure 13D:
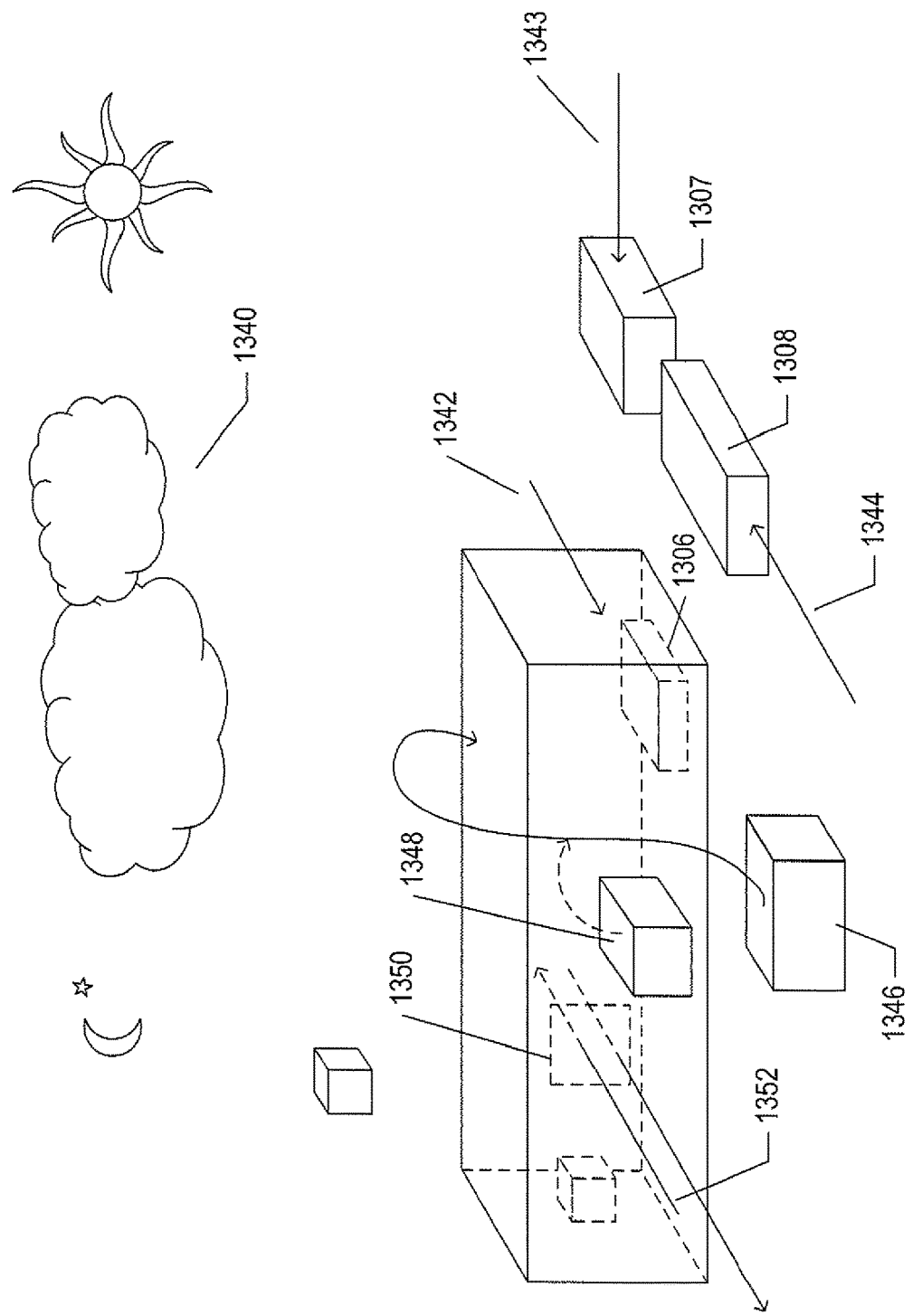

At first impression, the task of computing the remaining response time may appear relatively simple. However, as shown in FIG. 13D, the task is often far from simple. FIG. 13D shows various different conditions and effects that may alter the P versus t behavior of a controlled environment. In many cases, the time of day, weather, and time of year 1340 may alter the P versus t behavior of the environment, referred to below as the environment's P response. The P response may also be altered by different types of inputs 1342-1344 to the systems or internal states of the systems. For example, a system that requires electricity for operation may be inoperable during power failures, as a result of which the P response during power failures may be substantially different than the P response when power is available. The P response may also be affected by external entities other than the systems 1346 which operate on the environment or by internal systems and devices other than systems 1306-1308 that operate on the environment 1348. In addition, changes to buildings or structures, such as opened windows 1350 may significantly alter the P response to the environment due to a thermal or material exchange 1352. These are but a few of the many different possible factors that may change the P response of the environment, and thus complicate and frustrate remaining-response-time calculations and displays carried out by intelligent controllers.

Figure 14A:
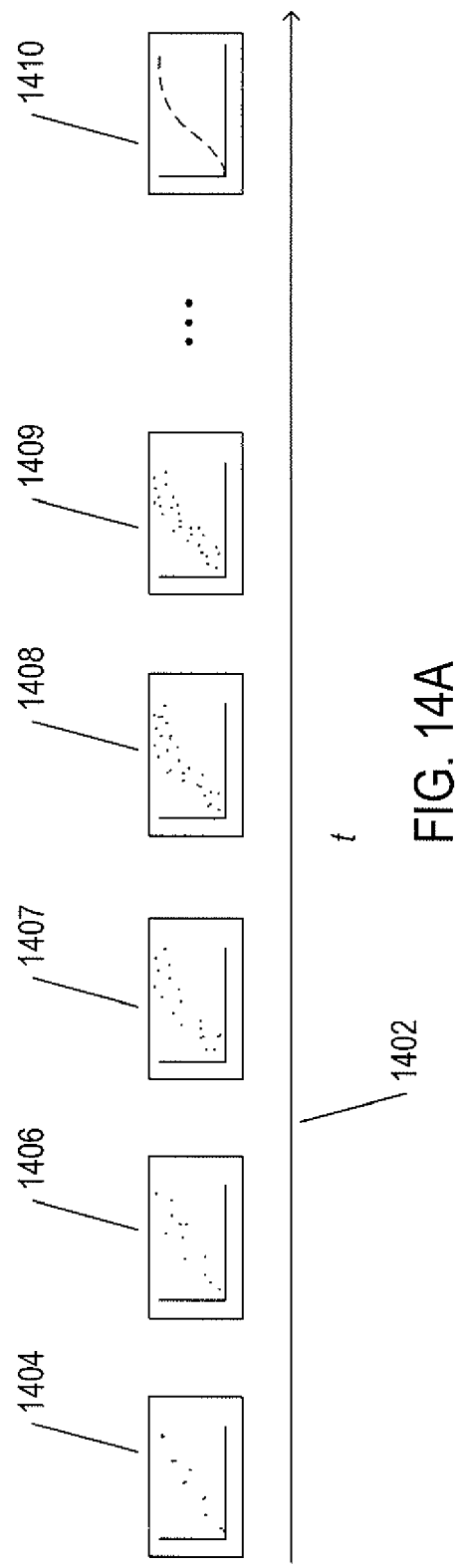
FIGS. 14A-E illustrate construction of one or more of a first type of P-response model based on observed P-response data.

In many implementations of the intelligent controllers to which the current application is directed, as a result of the many factors that may impact a particular P response for a controlled environment, the intelligent controller or controllers uses at least two different models for the P response during the response time in order to compute and display remaining response times. FIGS. 14A-E illustrate construction of one or more of a first type of P-response model based on observed P-response data. FIG. 14A shows a collection of data by an intelligent controller and construction of a parameterized P-response curve from the data. In FIG. 14A, the horizontal axis 1402 is a time axis with respect to which various data states are shown. During the response time after an immediate-control input or scheduled setpoint, such as interval Δt 1328 in FIG. 13C, the intelligent controller monitors the change in P value in time and plots points to represent an observed P-response curve. In FIG. 14A, the first such plot 1404 represents the points plotted with respect to a first observed P-response curve of the intelligent controller. In general, the points are stored in a file or database, often as encoded coordinate pairs, rather than plotted in a graphical plot. However, for ease of description and illustration, the stored data is referred to as a "plot" in the following discussion. Observation of a first P response generally produces a set of points, such as those shown plotted in plot 1404, that describe a general trend in P versus t behavior. The intelligent controller continues to make observations of P responses, over time, adding observed P versus t points to the plot, as shown by plots 1406-1409 in FIG. 14A. After some time, were the recorded P versus t points plotted visually in a graph, they would form a relatively dense cloud of points that suggest a P versus t curve that describes the P response for the control environment. When sufficient points have been stored, the intelligent controller can generate a parameterized model, or function, that statistically best fits the collected points, as represented in FIG. 14A by parameterized plot 1410. A parameterized plot is a plot that is associated with a model that represents the observed P versus t data over the course of many P-response observations. In certain cases, the P-response data may be discarded following plot parameterization, or after passage of significant periods of time.

Figure 14B:
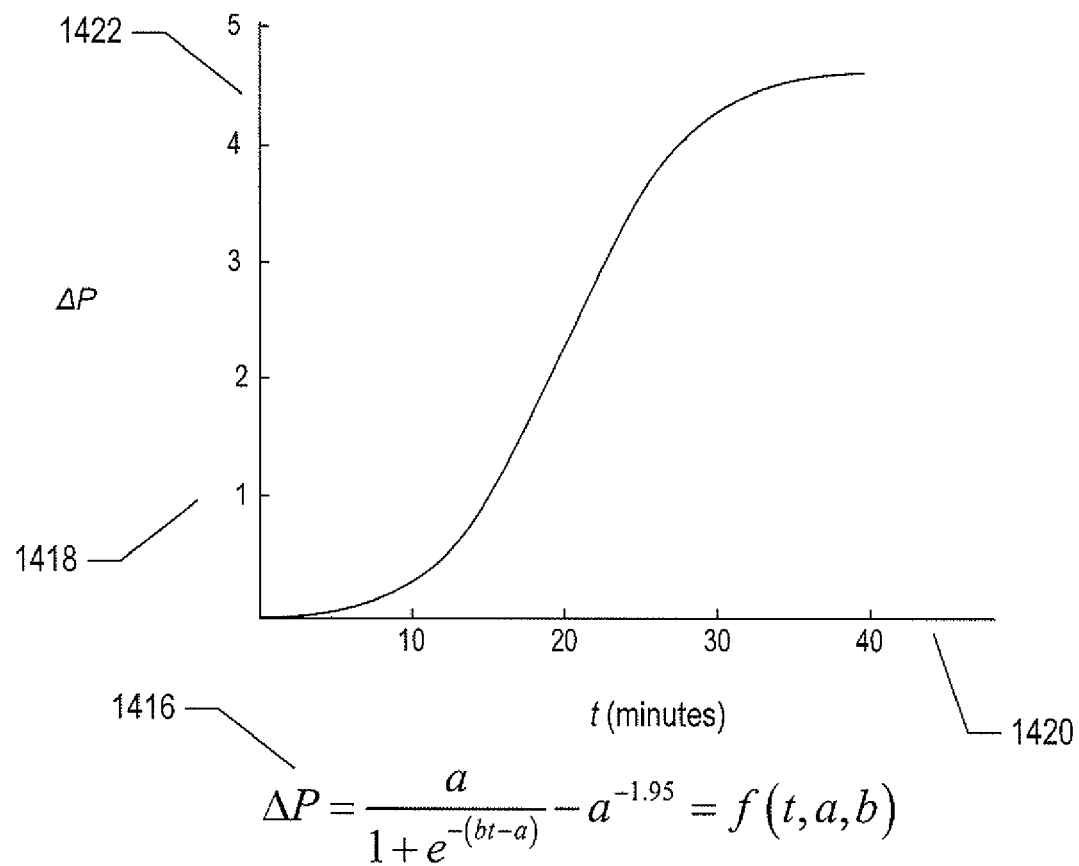

There are many possible models for P-response curves. FIG. 14B illustrates one P-response-curve model. In FIG. 14B, the expression 1416

$$\Delta P = \frac{\alpha}{1 + e^{-(bt-a)}} - a^{-1.95} = f(t, a, b),$$

is plotted in graph 1418 with horizontal axis 1420 representing time and vertical axis 1422 representing a change in P value, ΔP, starting from an initial time represented by the origin 1424. The model is non-linear between zero and about 15 minutes, is approximately linear for ten minutes, is again non-linear until about 35 minutes, and then flattens considerably thereafter. It should be noted that this model can be appropriate for certain ΔP changes and certain types of characteristics and parameters in certain environments acted on by certain types of devices and systems, but is certainly not appropriate for a large number or even a large fraction of possible controlled environments, ΔP changes, and characteristics and parameters. The expression is parameterized by two constants a and b. Thus, in general, the model computes ΔP as a function of time, the function parameterized by and one or more constant-valued parameters that are determined for a given P and a given controlled environment. In the case of the model shown in FIG. 14D, the slope of the straight-line portion of the P-response curve generated from the model can be varied by varying the value of parameter b, while the range in ΔP values can be altered by changing the value of parameter a. Many other types of models can be used for P-response curves.

Figure 14C:
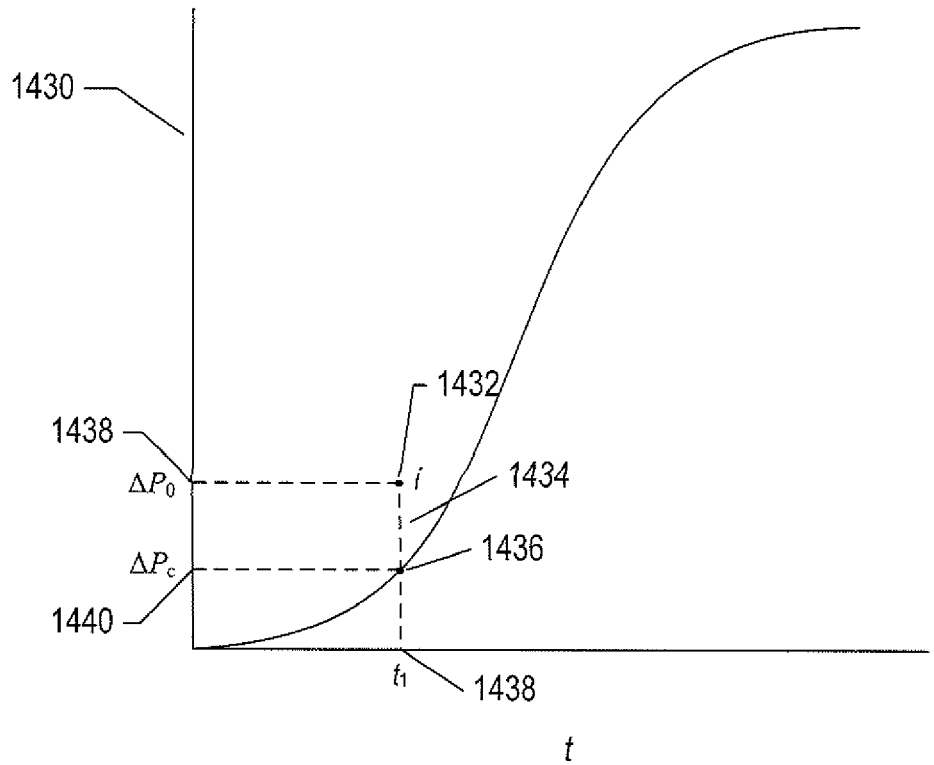
Figure 14D:
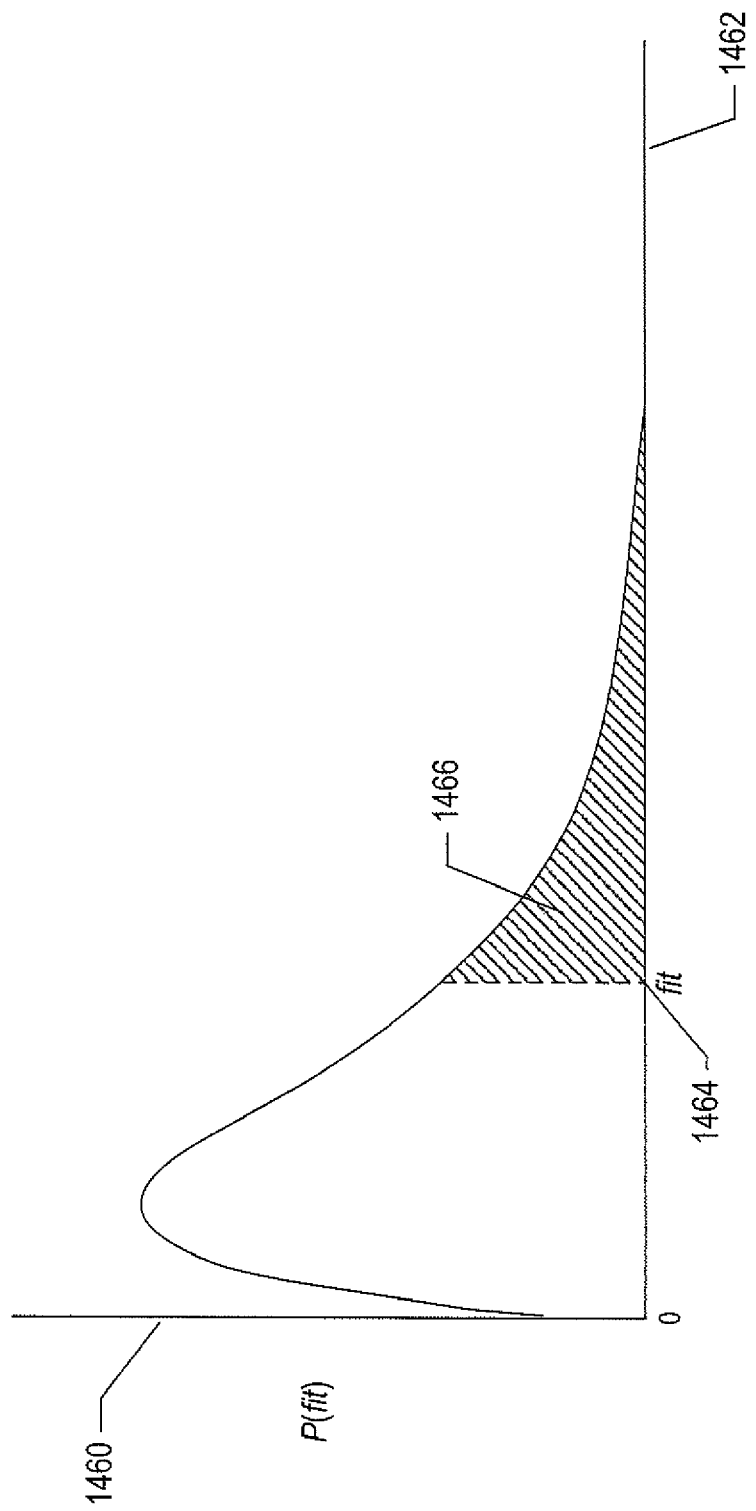

The parameterized model generated for a collection of observed P responses is generally only an estimate and, because of all the different factors that may affect P responses, the parameterized model is generally an estimate for the average P response of the controlled environment. Were the model curve to be plotted within the dense clouds of points representing the observed data, generally only a very few of the observed points would actually fall on the P-response curve generated by the model. Models are selected and evaluated by evaluating how well the data fits the model. There are many statistical methods that may be employed to compute the fit of a model to experimental data. FIGS. 14C-D illustrate one such method. FIG. 14C shows the model P response curve in a graphical plot 1430 similar to that shown in FIG. 14B along with one of the observed P versus t points 1432. A vertical line segment 1434, passing through the observed P versus t point 1432, also passes through the model curve at point 1436 and through the time axis at point 1438, the time coordinate of which is referred to as $t_1$. The ΔP coordinate 1438 of the observed P versus t point is labeled $\Delta P_o$, and the ΔP coordinate 1440 of the point on the model curve corresponding to time $t_1$ 1410 is labeled $\Delta P_c$. A discrepancy $\Delta_{o/c_i}$ between the observed data point i 1432 and corresponding model point 1436 can be computed as:

$$\Delta_{o/c_i} = \frac{(\Delta p_o - \Delta p_c)^2}{\Delta p_c}$$

A fit value for the curve with respect to the observed data can be computed by summing all of the discrepancies for all of the data points, as follows:

$$\text{fit} = \sum_{i=1}^{N} \Delta_{o/c_i}.$$

Were all of the data points to fall along the model curve, the fit value would be 0. As the observed data departs further from the model curve, the fit value increases.

As shown in FIG. 14D, it is often the case that fit values calculated from various different data sets fall into a particular type of probability distribution. One such probability distribution is shown in FIG. 14D. The vertical axis 1460 represents the probability of observing a particular fit value and the horizontal axis 1462 represents the different possible fit values. For a particular fit value, such as fit value 1464, the area under the probability-distribution curve to the right of the fit value 1466, shown cross-hatched in FIG. 14D, represents the probability of observing the fit value 1464 or a fit value greater than that fit value. This probability can also be used to evaluate the reasonableness of the model with respect to observed data. When the probability of a fit value equal to or greater than the observed fit value falls below a threshold probability, the model may be rejected.

Returning to FIG. 14A, the intelligent controller may, after observing each response and adding the data points for the observed P response to a plot, compute the fit value of various different models with respect to the data and, when one or more models is associated with a fit value less than a first threshold value or with a corresponding probability value greater than a second threshold value, the intelligent controller may select the best fitting model from the one or more models and generate a parameterized plot by associating the selected model, including selected constant values for the model parameters, with the plot. This constitutes what is referred to as "parameterizing the plot" in the following discussion. Once a plot is parameterized, the plot becomes a global model that can be used, by the intelligent controller, to predict remaining response time, or time-to, values for display and for other purposes. The parameterized plot may be continued to be refined, over time, following addition of new P-response data, including changing the global model associated with the parameterized plot and altering constant-parameter values. This refinement may continue indefinitely, or may be discontinued after a highly reliable model is constructed. Alternatively, the parameterized plot may represent a sliding data window, with only recent data used to select a current associated model and parameter values.

Figure 14E:
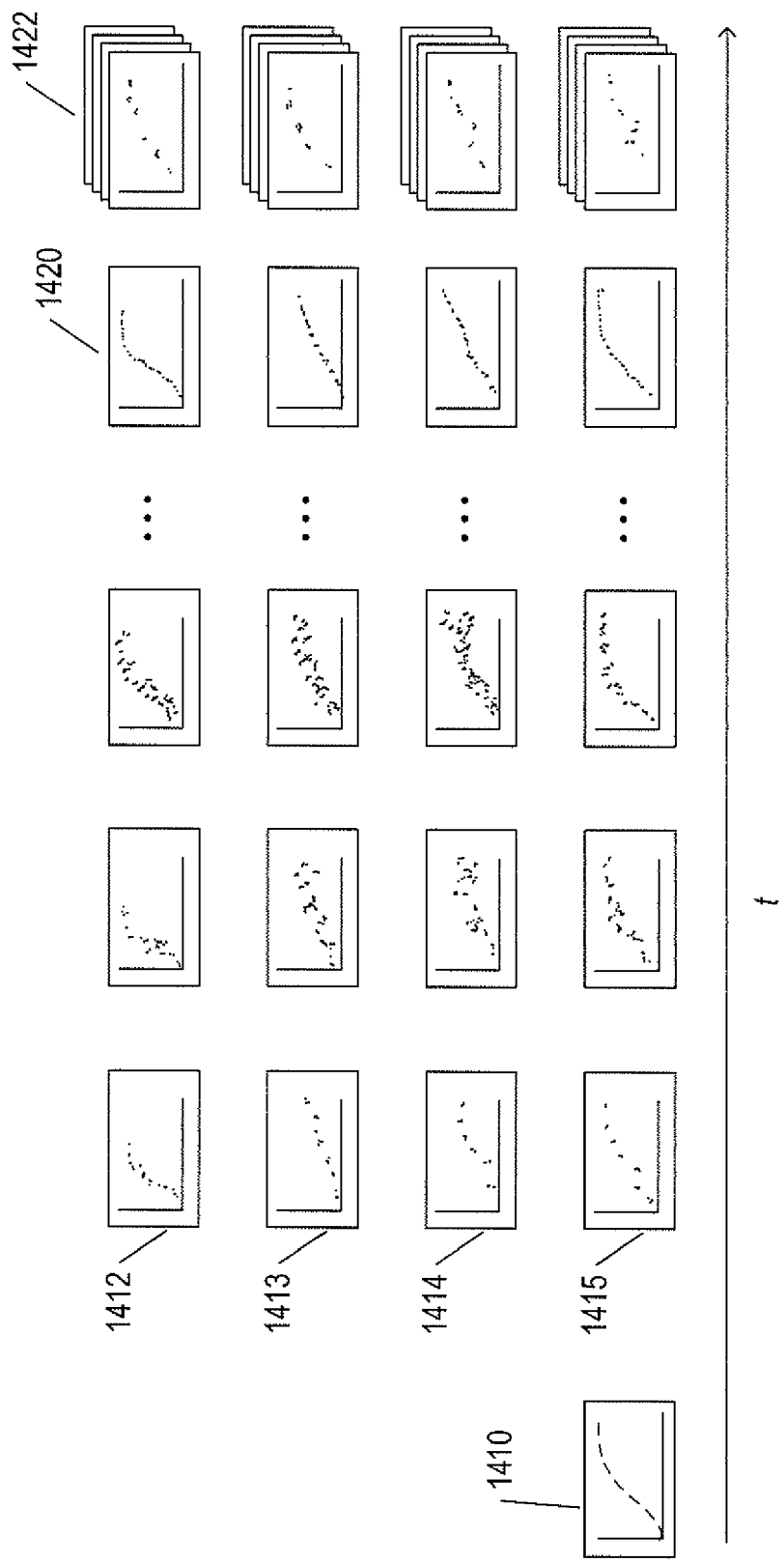

An intelligent controller may generate various different parameterized models, also referred to as "global models," for various different conditions. FIG. 14E illustrates generation of multiple global models as a continuation of the timeline shown in FIG. 14A. Once a first parameterized plot 1410 has been generated, the intelligent controller may elect to divide the collected data points among multiple plots 1412-1415 each collecting observed P responses under different conditions. For example, when it is determined that weather and outside-temperature are important influences on P responses, the intelligent controller may collect separate P-response data for sunny days, cloudy days, nighttime, days with high wind, and other such different weather conditions. FIG. 14E illustrates division of the initial plot 1410 into four plots 1412-1415 arranged along a vertical parameter or condition dimension, such as a weather-and-temperature dimension. Then, as shown in FIG. 14E, the intelligent controller may continue to collect data for each of these individual plots until they can be parameterized, with the parameterized plots shown in column 1420. At this point, the intelligent controller may then generate new plots, essentially extending the data collection along a new dimension, as represented by the column of sets of plots 1422 shown in FIG. 14E. The intermediate global models, such as global model 1410, may be retained in addition to the subsequently generated global models for particular conditions. Of course, the amount of data that may need to be collected in order to parameterize multi-dimensional plots expands exponentially, and this combinatorial effect severely constrains the number of different dimensions that an intelligent controller may consider. Nonetheless, an intelligent controller need not be constrained to generating only a single global model, but may generate multiple global models, each for a different condition or set of conditions, in order to better approximate P response curves that obtain under those conditions. In certain cases, the response model may depend on the magnitude of the ΔP represented by a scheduled setpoint change or immediate-input control.

Figure 15B:
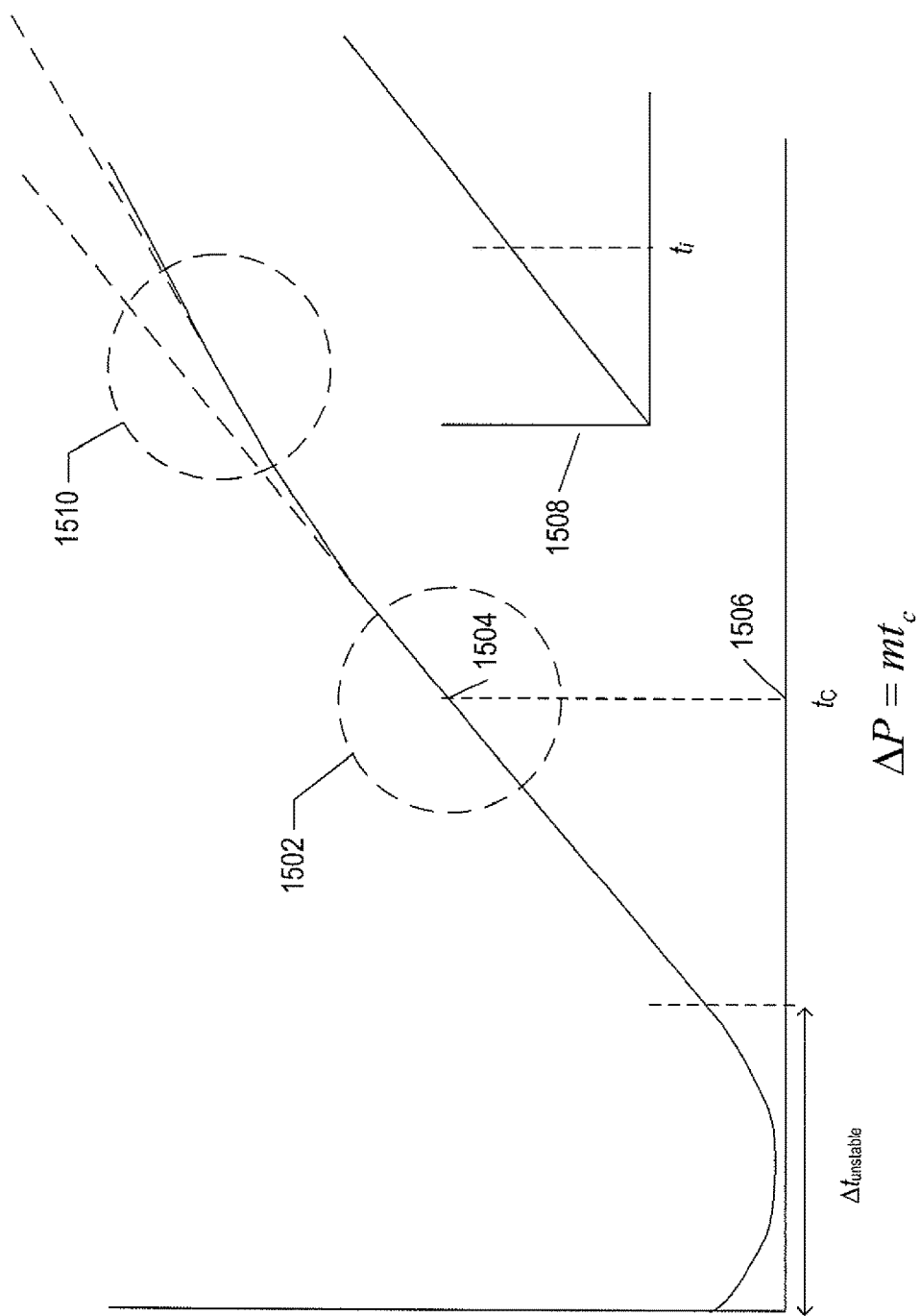

A second type of P-response model that may be employed by intelligent controllers is referred to as a "local model." Generally, regardless of how much data is collected and used to generate one or more global models, it is difficult for an intelligent controller to generate global models that are sufficiently accurate for highly accurate remaining-response-time calculations. Although this is not always the case, it is not unexpected, due to all the various different types of factors that may affect a P response, discussed above with reference to FIG. 13D. However, it is frequently possible to generate a simpler local model, during a particular response time. FIGS. 15A-B illustrate several types of local modeling techniques.

FIG. 15A illustrates one type of local model. In many cases, following output of control signals to one or more systems by an intelligent controller, there is a period of time referred to as $\Delta t_{unstable}$ 1502 during which the P value may fail to change or actually change in the direction opposite from the desired direction. After the unstable time interval 1502, the ΔP versus t response may be nearly linear 1504. This type of local model may be expressed as:

$$\Delta P = mt - mt_{unstable}$$

where m is the slope of the straight-line portion and is the single constant for the model. As shown in FIG. 15B, even when the response following the unstable period is not linear, but is instead a curve, the response may be approximated by a series of local linear models. In FIG. 15B, the portion of the P response within the dashed circle 1502 about the point 1504 with time coordinate $t_1$ 1506, considered as a local origin, is nearly linear, and can be approximated by a linear model 1508, expressed as:

$$\Delta P = mt_c.$$

Another portion of the P-response curve within dashed circle 1510 can be approximated by a different linear model with a different slope. Thus, by selecting a set of successive linear models over the interval between an immediate-control input or scheduled setpoint and the time when the desired P value is obtained, the intelligent controller can incrementally calculate accurate remaining response times.

Thus, global models and local models provide models of P responses. The global models are generally used during the initial portion of a response time following an immediate-control input or scheduled setpoint because, during this initial period of time, there is generally insufficient observed data to compute parameters for a local model and/or to select a particular local model. However, often it is the case that, following an initial period of time, when sufficient P versus t data points are available for the current P response, a local model can be selected and parameterized to provide more accurate remaining-response-time predictions up until the time that the desired P value is obtained. This is, however, not always the case. It may be the case that the global model is more predictive throughout the entire response time or that, after a local model is selected and used, the global model again, after another period of time, is again better able to predict the remaining-response-time value from a local model. In certain cases, neither global nor local models provide adequate predictive power. For this reason, many intelligent controllers of the class of intelligent controllers to which the current application is directed continuously reevaluate P-response models and attempt to select the best model for each point in time over an entire interval during which the remaining-response-time values are continuously, periodically, or intermittently calculated and displayed.

In addition to the local and global P-response models for the change in $\Delta P$ with t during responses of an environment to immediate-control-elicited or scheduled-setpoint-change-elicited control of one or more systems, many additional types of P-response-related information can be obtained by an intelligent controller and electronically stored in memory and/or mass-storage devices within the intelligent controller or in remote computing facilities accessible to intelligent controllers. FIGS. 16-17 illustrate, using plots similar to the plots shown in FIGS. 14B-C and 15A-B, two additional types of information that may be obtained by monitoring P versus t response behaviors and various types of additional information with respect to the systems controlled by the intelligent controller. FIG. 16 shows a $\Delta P/\Delta t$ versus P curve for a particular type of system that affects a controlled environment and that is controlled directly by the intelligent controller. In the case shown in FIG. 16, a portion of the $\Delta P/\Delta t$ versus P curve is a straight line 1602. This line represents the fact that, for the particular system for which the data has been collected, the rate at which the system changes the value of parameter P within the controlled environment varies with respect to the current value of P. The current value of P may be the current value of P within the controlled environment or the current value of P external to the controlled environment. For example, this type of curve is frequently used to describe dependence of heat-pump effectiveness with respect to outside temperature. As shown in FIG. 16, there is a critical P value, $P_c$ 1604, at which $\Delta P/\Delta t$ transitions from a positive to a negative value. When an intelligent controller is attempting to increase the P value in the controlled environment, it clearly would not choose to use a system with $\Delta P/\Delta t$ characteristics such as those shown in FIG. 16 when the current P value, such as the outside temperature, is less than the critical P value $P_c$. Frequently, an intelligent controller establishes a P-value cutoff, or lockout value, substantially higher than $P_c$, below which the intelligent controller does not activate the system in order to increase the value of P in a controlled environment due to the poor effectiveness, or rate of change in P, of the system below the lockout value.

FIG. 17 shows a different type of information that may be obtained and electronically stored by an intelligent controller to characterize a particular system. FIG. 17 shows a plot of $\Delta E/\Delta P$ versus P for a particular system, where $\Delta E$ is the amount of energy needed to change the value of the parameter P within a controlled environment by $\Delta P$. In essence, this curve is reflective of the dependence of the energy efficiency of a system with respect to the current value of P. The current value of P may be the current value of P within the controlled environment or the current value of P external to the controlled environment. As one example, such a curve may represent the energy efficiency of a furnace with respect to the outside temperature. In the curve 1702 plotted in FIG. 17, the energy efficiency is maximized, when $\Delta E/\Delta P$ is lowest, at a P value of approximately $P_1$ 1704 and decreases as P is either increased or decreased from this maximum-efficiency P value. In the example of a furnace, the energy efficiency of the furnace may decrease as outside temperatures decreases due to increasing thermal exchange of the controlled environment with the external environment and may also decrease as temperatures reach a relatively high value, due to the decreasing difference between the temperature of air output by the furnace with respect to the ambient temperature. In other words, when the temperature is neither too cold nor too hot, the furnace may not be capable of efficiently increasing the temperature of a controlled environment.

The data plotted in FIGS. 16 and 17, like the previously described P-response models, is generally stored as a collection of data points in memory and/or mass-storage devices. The data corresponding to the plot shown in FIGS. 16 and 17 may be accumulated, over time, by an intelligent controller as for the previously described P-response models. The data corresponding to the plot shown in FIG. 16 may be accumulated, over time, as for the previously described P-response models, and may be parameterized for computational efficiency, as well. The data corresponding to the plot shown in FIG. 17 may also be partially or fully obtained from other sources, including from characteristics for particular types of systems.

The current applications is directed to intelligent controllers which balance control in order to achieve multiple goals which may, at times, conflict, and in order to achieve one or more goals under conflicting constraints. As an example, an intelligent controller may be designed to produce specified changes in the value of an environmental parameter P as rapidly as possible, in order to conform to a control schedule featuring controlled, vertical setpoint changes, as discussed above, with minimum expenditure of energy. Often, these goals conflict, since, as $\Delta P/\Delta t$ increase, $\Delta E/\Delta P$ decreases for certain particular systems controlled by the intelligent controller in order to control the value of P in the controlled environment, such as a system exhibiting the characteristics illustrated in FIGS. 16 and 17.

Figure 18:
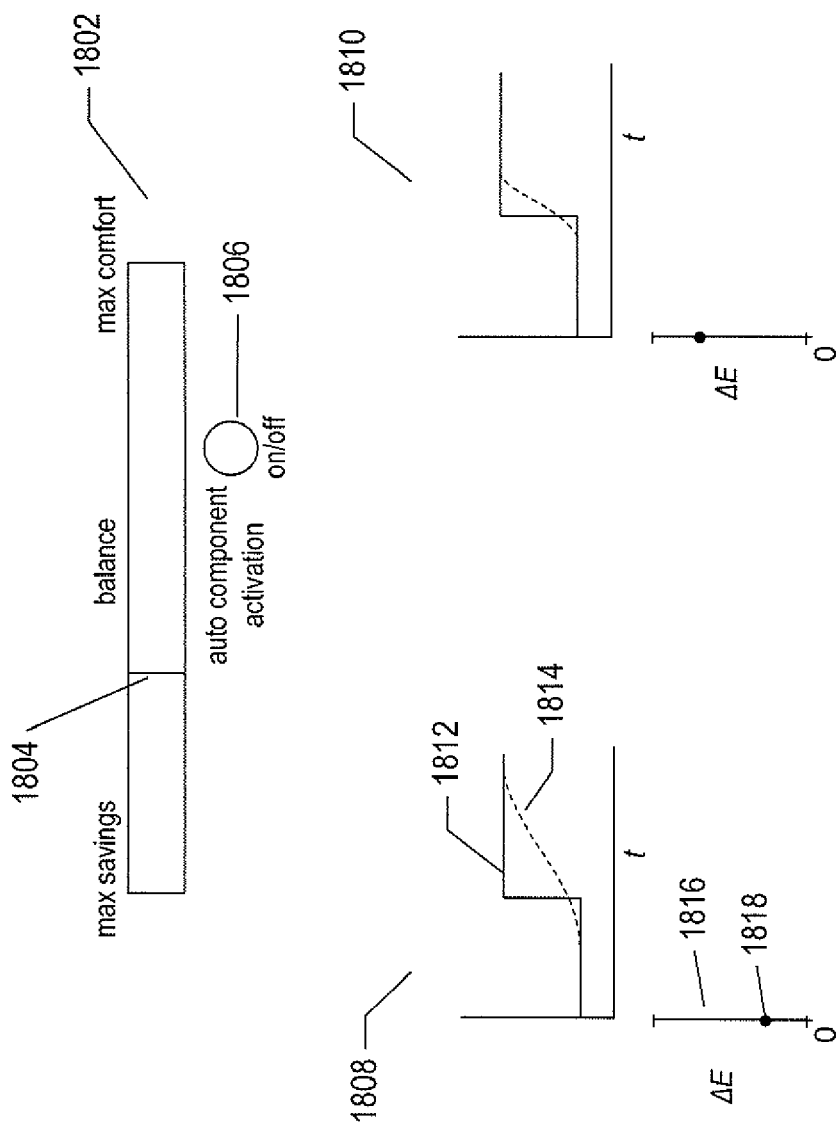
FIG. 18 illustrates an auto-component-activation-level user interface provided to users by one implementation of an intelligent controller.

In certain intelligent controllers within the class of intelligent controllers to which the current application is directed, the intelligent controller provides a user-interface feature to allow a user to select an auto-component-activation level for operation of the intelligent controller, the auto-component-activation level specifying how the intelligent controller balances the competing goals of quickly carrying out setpoint changes but doing so in an energy-efficient manner. The auto-component-activation level is used during determinations by the intelligent controller with respect to which system or systems to activate in order to carry out a setpoint change. The FIG. 18 illustrates an auto-component-activation-level user interface provided to users by one implementation of an intelligent controller. The auto-component-activation-level user interface includes a slider-bar feature 1802 that allows a user to move a slider or cursor 1804 along the slider bar 1802 to select an autocomponent-activation level in the range of [max savings, max comfort]. At the max-savings level, the intelligent controller seeks to use the most energy efficient and/or cost efficient means for achieving desired changes in the value of environmental parameter P within an environment controlled by the intelligent controller. By contrast, at the auto-component-activation level max comfort, the intelligent controller attempts to execute desired changes in P value as quickly as possible. Intermediate auto-component-activation-level values represent various levels of balance between max savings and max comfort. The auto-component-activation-level user interface may also be enabled and disabled via an on/off feature 1806. In certain implementations, the intelligent controller recognizes four auto-component-activation levels: (1) off; (2) max savings; (3) balance; and (4) max comfort. In other implementations, there may be a larger number of auto-component-activation levels. In certain implementations, there may be a continuous range of auto-component-activation levels.

FIG. 18 additionally shows a P-response curve overlaid on a control schedule as well as an indication of energy usage for both the max-savings auto-component-activation level 1808 and for the max-comfort auto-component-activation level 1810. In FIG. 18, the control schedule is represented by a solid line, such as solid line 1812 and the P-response curve is illustrated with a dashed line, such as dashed curve 1814. Below the overlaid control schedules, a vertical bar, such as vertical bar 1816, represents the range of energy usage by one or more systems controlled by the intelligent controller, with a filled disk, such as filled disk 1818, representing a particular energy-usage value. As can be seen in FIG. 18, in the max-savings mode, relatively little energy is used, as represented by the position of filled disk 1818 within the vertical range bar 1816, in order to achieve a change in the P value, but the P-response curve 1814 has a relatively shallow slope, as a result of which the response time is relatively long. By contrast, in the max-comfort mode, response time is relatively short, but the energy usage relatively high.

Figure 19C:
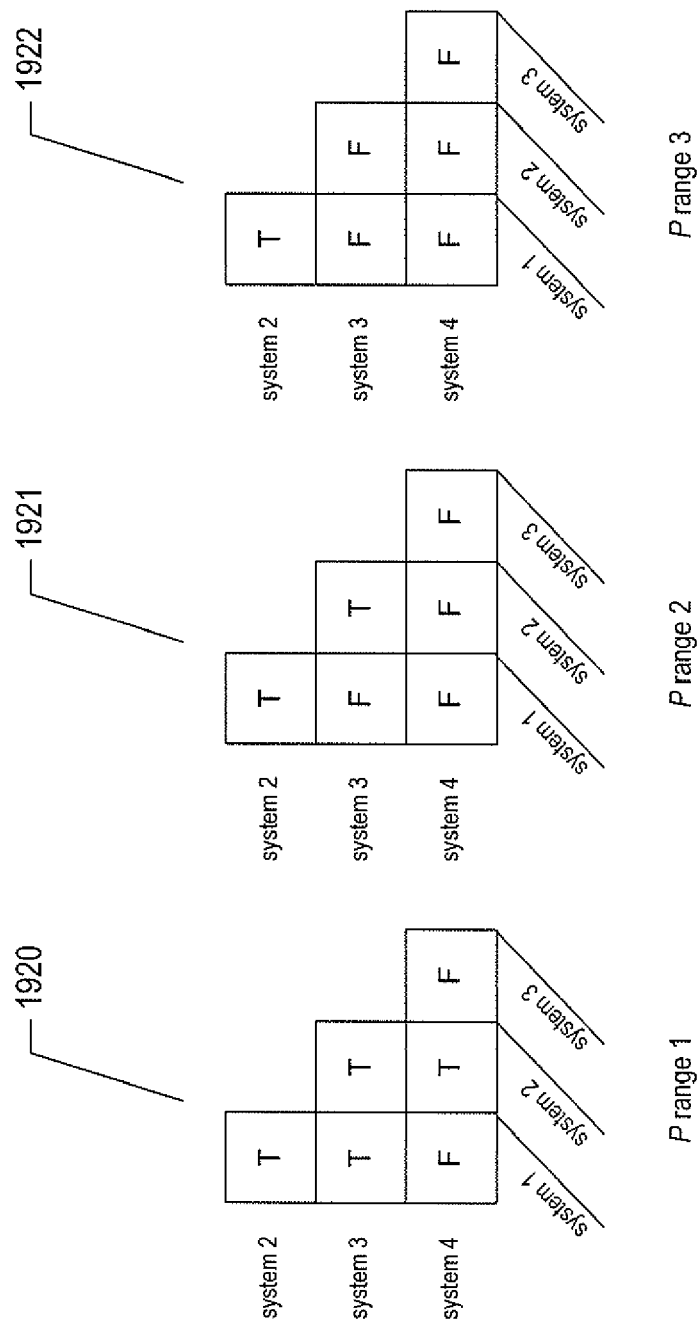

FIGS. 19A-D illustrate additional types of information that may be electronically stored within an intelligent controller with respect to P-responses and response times. FIG. 19A illustrates a table 1902 with four columns 1904-1907 that include: (1) auto-component-activation level 1904; (2) $P_{lowLockout}$ 1905; (3) $P_{highLockout}$ 1906; and (4) system 1907. Each row in this table represents a range of P values, [$P_{lowLockout}$, $P_{highLockout}$] within which a system is activated by an intelligent controller under each of various different auto-component-activation levels. As discussed above with reference to FIG. 16, certain types of systems may be ineffectual below a critical P value. As also discussed with reference to that figure, a $P_{lowLockout}$ value may be set to the $P_c$ critical value indicated by a plot, such as that shown in FIG. 16, or to a higher P value below which a system may be too inefficient to use in order to raise the value of an environmental parameter P within a controlled environment. Similarly, a system may be associated with an upper $P_{highLockout}$ for efficient operation. Values of $P_{lowLockout}$ and $P_{highLockout}$ lockout define a range of P values within which the intelligent controller may choose to activate a particular system, and this range of P values may vary with the auto-component-activation-level. The values stored in table 1902 may be empirically derived, determined, over time, by an intelligent controller, or initially specified and then adjusted. They represent a heuristic with respect to selecting systems to activate in order to achieve setpoint changes under various P values. Additional such tables may be used when there are additional environmental variables being controlled.

FIG. 19B illustrates additional tables that may be stored by an intelligent controller in electronic memory and/or in a mass-storage device. An intelligent controller may store a separate table of the type shown in FIG. 19B for each of various different auto-component-activation levels. Each table, such as table 1910, includes three columns 1912-1914, including (1) system configuration 1912; immediate-control input 1913; and scheduled setpoint change 1914. Each table stores the maximum response time that the intelligent controller should achieve for setpoint changes for particular system configurations and types of setpoint changes. The system configuration may correspond to an overall classification of the systems controlled by the intelligent controller. For example, in a climate-control application, the system configuration may refer to the overall type of heating used to heat a residence, including radiant heating, heat pump, forced-air furnace, or various combinations of heating units. Users of various different types of heating-unit configurations may expect different response-time characteristics. Radiant heating users, for example, may be accustomed to slow response times, allowing the intelligent controller greater latitude in controlling the heating units to achieve energy-efficient control. In certain implementations, similar tables may include preconditioning times for each of various different auto-component-activation levels, each table providing preconditioning intervals for particular system configurations and types of setpoint changes.

FIG. 19C illustrates yet additional tables that may be stored within electronic memory and/or a mass-storage device within an intelligent controller. FIG. 19C shows a series of three compatibility tables 1920-1922, each for a different range of P values that indicate pairwise compatibility between each of four systems controlled by an intelligent controller. These tables indicate whether or not two systems can be currently activated by an intelligent controller. As an example, a heat pump is often accompanied by an auxiliary heating strip for home heating and, under certain conditions, the heat-pump compressor cannot be concurrently operated with the auxiliary heating strip.

Figure 19D:
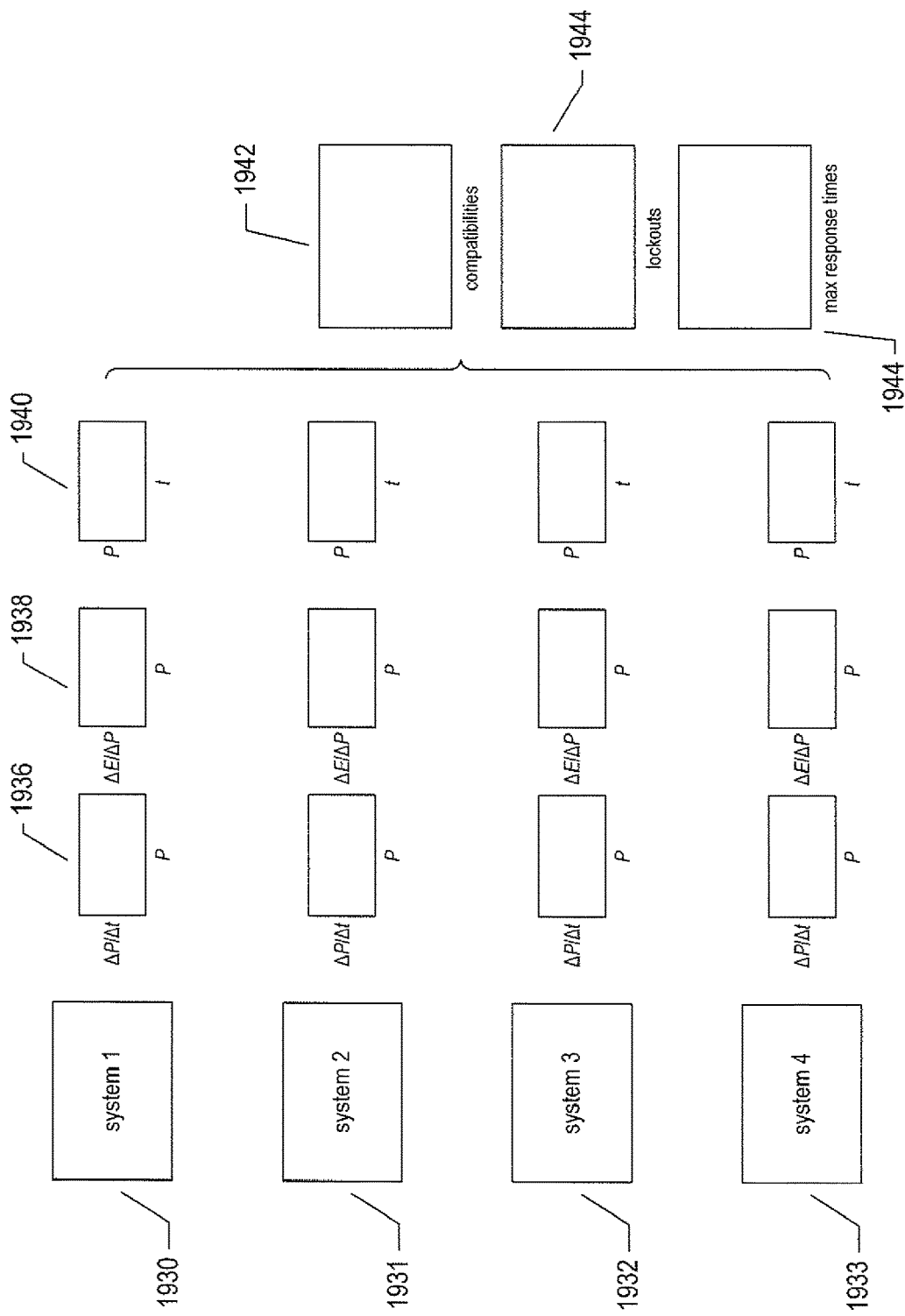

FIG. 19D illustrates information stored by an intelligent controller, in one implementation, with respect to P-responses and other characteristics of four different systems controlled by the intelligent controller to control the value of an environmental parameter P within a controlled environment. In FIG. 19D, each of the four systems is represented by a rectangle 1930-1933. The intelligent controller stores $\Delta P/\Delta t$ versus P data, $\Delta E/\Delta P$ versus P data, and P versus t data for each system, such as the $\Delta P/\Delta t$ versus P data 1936, $\Delta E/\Delta P$ versus P data 1938, and P versus t data 1940 associated with system 1930. This type of information is discussed above with reference to FIGS. 14A-17. The P-response models may additionally be global models collected for specific system or system combinations, so that they reflect system-specific or system-combination-specific P-responses. In addition, the intelligent controller stores tables of system compatibility indications 1942, lockout values 1944, and maximum response times 1946 for all of the systems and/or configurations, as discussed above with reference to FIGS. 19A-C.

Figure 20:
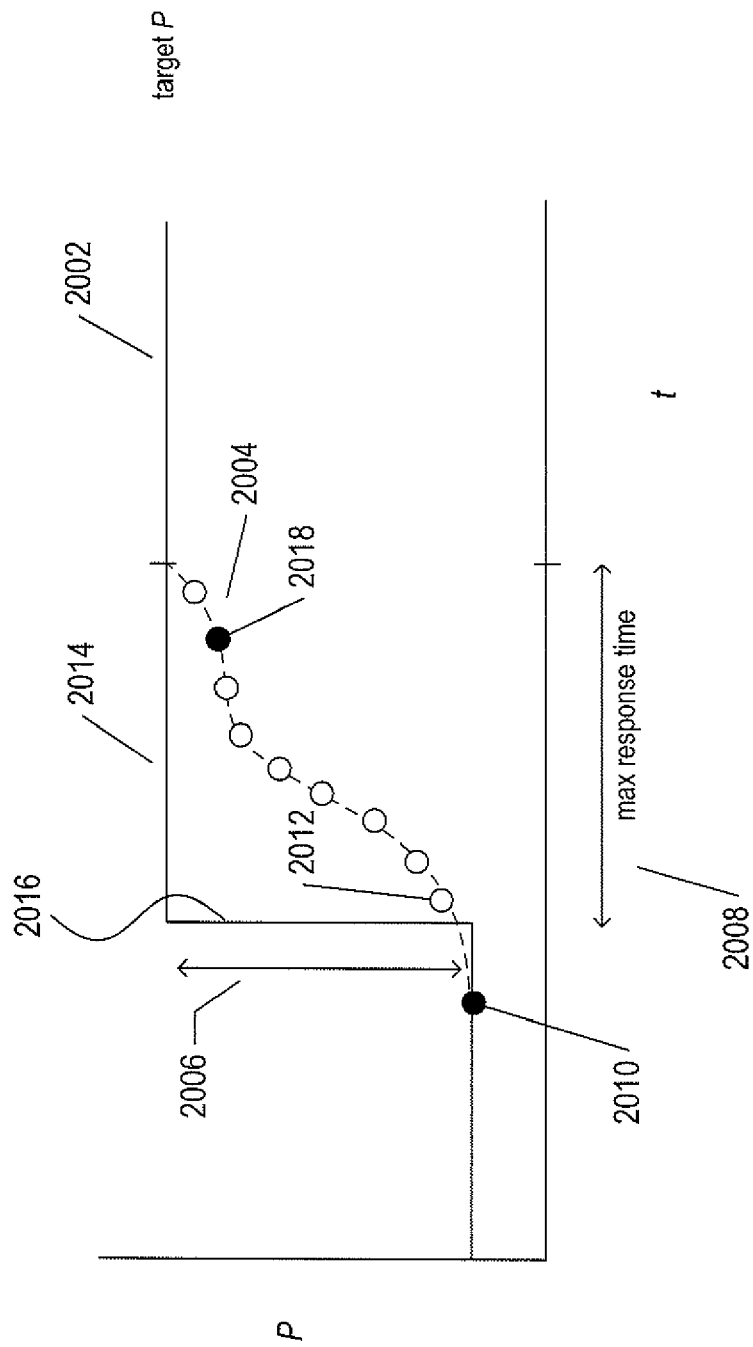
FIG. 20 illustrates one implementation of a technique for efficient control, by an intelligent controller, of one or more systems in order to change the value of an environmental variable P according to a control schedule or immediate-control input.

FIG. 20 illustrates one implementation of a technique for efficient control, by an intelligent controller, of one or more systems in order to change the value of an environmental variable P according to a scheduled setpoint change or immediate-control input. FIG. 20 shows a control schedule 2002 along with a P-response curve 2004 that obtains as the intelligent controller controls one or more systems to raise the value of the environmental variable P by a specified amount ΔP 2006. In general, the intelligent controller is constrained to raise the value of the environmental parameter P within a maximum response time 2008. In order to achieve the specified change in P value, ΔP, within the maximum response time, the intelligent controller makes an initial decision, represented by shaded disk 2010, with regard to which systems to activate and then continuously monitors the P-response curve, as represented by unshaded disks, such as unshaded disk 2012, to ensure that the desired ΔP change is achieved within the maximum response time. Should the rate of change in P value begin to lag the degree of change needed to achieve the target P value 2014 associated with an immediate-control input or scheduled setpoint change 2016, then the intelligent controller makes one or more additional decisions, such as decision 2018, with respect to the systems that are activated in order to achieve the target P value. Note that the initial decision is shown, in FIG. 20, to occur at a point in time earlier than the time of the setpoint change. This reflects the fact that the initial decision is not tied to the time of the setpoint change, but may occur earlier, in order to begin changing the value of the environmental variable P so that an energy efficient and/or cost-effective control strategy that may need a longer period of time than the maximum response time may be employed. There may be cases when the initial decision occurs later in time than the time of the setpoint change or at the same time as the time of the setpoint change, as well.

Figure 21:
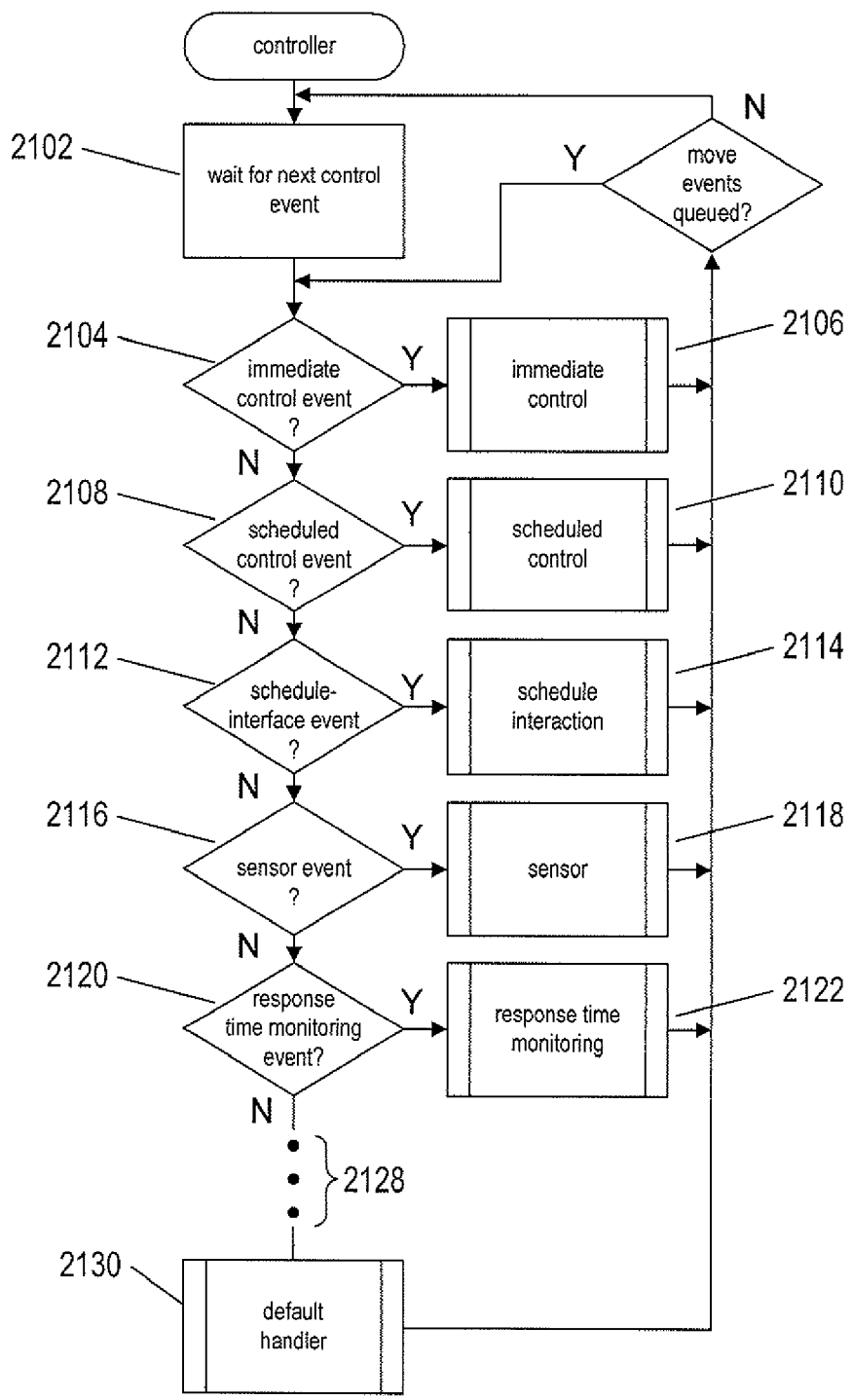
FIG. 21 illustrates a control-flow diagram for intelligent-controller operation.

FIG. 21 illustrates a control-flow diagram for intelligent-controller operation. In general, an intelligent controller, at a high level, continuously operates within the context of an event handler or event loop. In step 2102, the intelligent controller waits for a next control event. When the next control event occurs, then, in a series of conditional statements, the intelligent controller determines the type of event and invokes a corresponding control routine. In the case of an immediate-control event, as determined in step 2104, the intelligent controller calls an immediate-control routine, in step 2106, to carry out the intelligent controller's portion of a user interaction to receive one or more immediate-control inputs that direct the intelligent controller to issue control signals, adjust a control schedule, and/or carry out other activities specified by a user through an intermediate-control interface. In the case that the control event is a scheduled control event, such as when the current time corresponds to a time at which a control schedule specifies a control activity to be undertaken, as determined in step 2108, a schedule-control routine is called, in step 2110, to carry out the scheduled control event. When the control event is a schedule-interface event, as determined in step 2112, the intelligent controller invokes a schedule-interaction routine, in step 2114, to carry out the intelligent controller's portion of a schedule-input or schedule-change dialog with the user through a schedule interface. In the case that the control event is a sensor event, as determined in step 2116 a sensor routine is called by the intelligent controller in step 2118 to process the sensor event. Sensor events may include interrupts generated by a sensor as a result of a change in sensor output, expiration of timers set to awaken the intelligent controller to process sensor data of a next-scheduled sensor-data-processing interval, and other such types of events. When a response-time-monitoring event occurs, as determined in step 2120, a response-time-monitoring routine is called, in step 2122, to handle the event. This type of event is discussed, in detail, below.

Figure 22A:
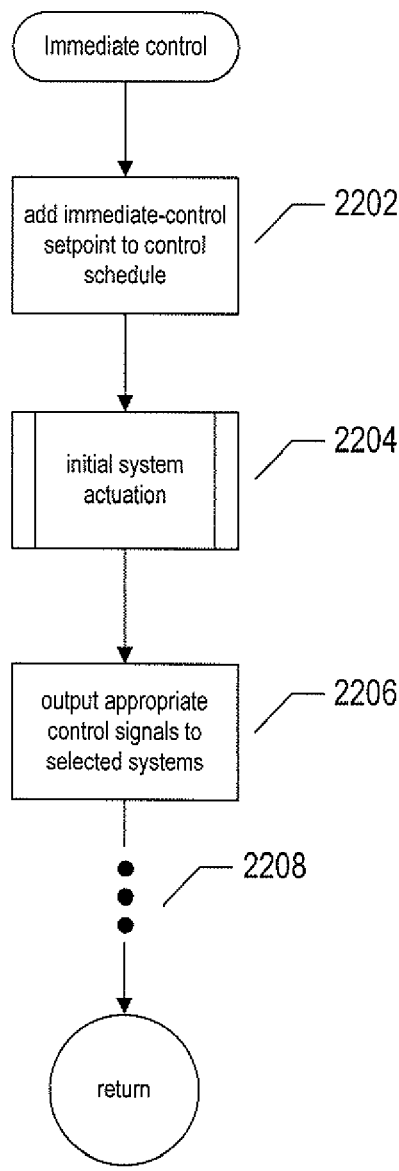
FIGS. 22A-E illustrate, using control-flow diagrams, the logic employed by an intelligent controller to achieve desired P-response behavior following immediate-control inputs and scheduled setpoint changes.

FIGS. 22A-E illustrate, using control-flow diagrams, the logic employed by an intelligent controller to achieve desired P-response behavior following immediate-control inputs and scheduled setpoint changes. FIG. 22A shows a portion of the immediate-control routine called in step 2106 of FIG. 21. This is an event handler for an immediate-control event. In step 2202, the routine adds an immediate-control setpoint to the control schedule. Then, in step 2204, the routine calls a routine "initial system activation" in order to select an initial system or set of systems to activate in order to carry out the immediate-control input. This initial-system-activation routine is discussed above with reference to decision 2010 in FIG. 20. In step 2206, the immediate-control routine outputs appropriate control signals to the selected one or more systems and, as indicated by ellipses 2208, may carry out various other steps related to handling immediate-control events. A similar call to the routine "initial system activation" is made in the routine "scheduled control" called in step 2210 of FIG. 21 to handle scheduled setpoint changes.

Figure 22B:
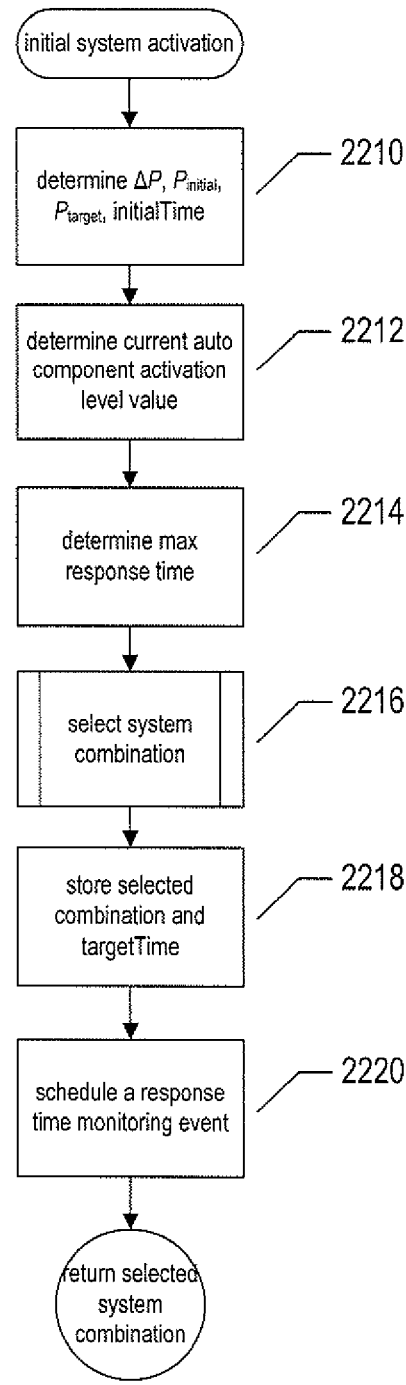

FIG. 22B provides a control-flow diagram for the routine "initial system activation" called in step 2204 in FIG. 22A. In step 2210, the routine "initial system activation" determines the ΔP corresponding to an immediate-control input or scheduled setpoint change as well as the current P value, $P_{initial}$, a target P value, $P_{target}$, and the current time, or initial time. Then, in step 2212, the initial-system-activation routine determines the current auto-component-activation level, in certain embodiments set through an auto-component-activation-level user interface, as discussed above with reference to FIG. 18. In step 2214, the intelligent controller uses the determined auto-component-activation-level value and system-configuration information to determine the maximum response time for carrying out the immediate-control input or scheduled setpoint change which resulted in a call to the routine "initial system activation" from an immediate-control-input event handler or scheduled-setpoint-change event handler. In step 2216, the routine "select system combination" is called to select one or more systems for initial activation in order to carry out the immediate-control input or scheduled setpoint change. In step 2218, an indication of the selected one or more systems is stored along with a target time for achieving the $P_{target}$ value in memory. In step 2220, the routine "initial system activation" schedules a next response-time-monitoring event in order to continuously, intermittently, or periodically monitor the P-response curve to ensure that the target P value, $P_{target}$, is achieved within the maximum response time.

Figure 22C:
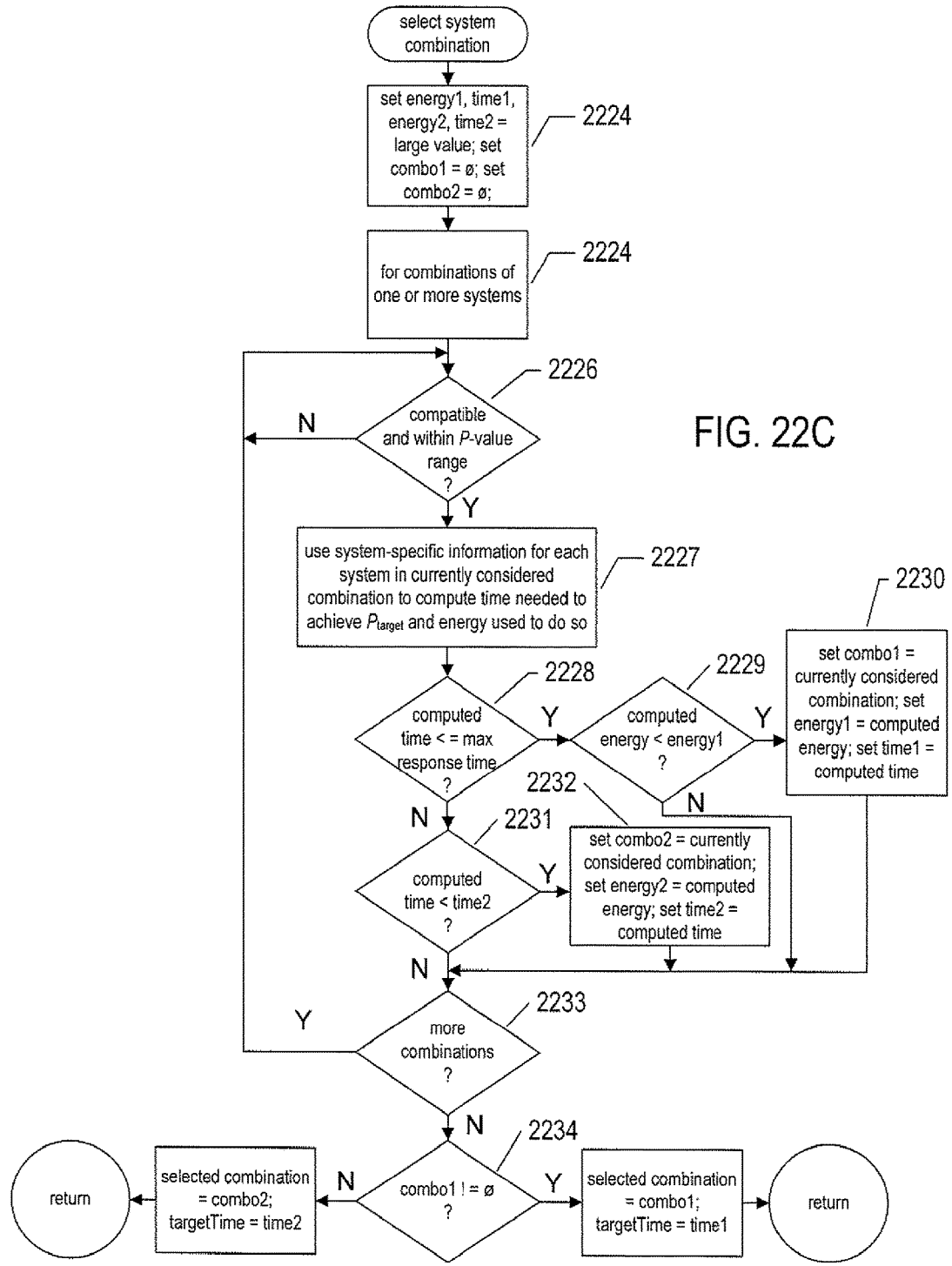

FIG. 22C provides a control-flow diagram for the routine "select system combination" called in step 2216 of FIG. 22B. In step 2224, the routine "select system combination" sets numerous local variables, including setting the local variables energy1, time1, energy2, and time2 to large values and setting the local variables combo1 and combo2 to null. Then, in the for-loop of steps 2225-2233, the routine "select system combination" considers possible combinations of one or more systems in order to select a best combination for activation by the intelligent controller in order to achieve a specified ΔP P-value change as a result of an immediate-control input or scheduled setpoint change. It should be noted that, while the illustrated control logic assumes that complete information, such as that shown in FIG. 19D, may be available for all systems, this may often not be the case, in which appropriate adjustments are made in calculations that depend on these types of information, including use of default values or omission of application of certain types of rules. In step 2226, the routine "select system combination"

uses the appropriate compatibility table for the current P-value range, discussed above with reference to FIG. 19C, to ensure that the currently considered system combination contains no incompatible systems. Also, in step 2226, the routine "select system combination" uses the table discussed above in FIG. 19A to ensure that none of the systems in the currently considered system combination is outside of its P-value range. When the currently considered system combination includes incompatible systems or systems that should not be activated under current conditions, the combination is rejected, and control flows to a next iteration of the for-loop of steps 2225-2233. In step 2227, the routine "select system combination" uses the system specific information, such as the data 1936, 1938, and 1940 for system 1930 in FIG. 19D, for each system in the currently considered combination in order to compute a time needed to achieve $P_{target}$ and the amount of energy used to do so. The estimation of $P_{target}$ may additionally use other types of information, including weather forecasts, system operational status, and other such information obtained from remote information sources. Various different methods can be used to obtain the time and energy values. Simplistic methods may employ additive combination of the energies and times needed for individual systems to achieve $P_{target}$, with weighting or subsequent averaging, in order to compute a total time and energy value. Alternatively, more complex types of calculations may be used in order to precisely estimate the response time and energy usage needed for the currently considered combination of systems to achieve $P_{target}$. When the computed time is less than or equal to the maximum response time determined in step 2214 in FIG. 22B, as determined in step 2228, and when the computed energy is less than the value stored in energy1, which represents the lowest observed energy for previously considered combinations of systems, as determined in step 2229, then, in step 2230, the local variable combo1 is set to the currently considered combination of systems, energy1 is set to the computed energy, and time1 is set to the computed time. When the computed time is not less than or equal to the max response time, but the computed time is less than the value currently stored in the local variable time2, as determined in step 2231, then the local variable combo2 is set to the currently considered combination of systems, energy2 is set to the computed energy, and time2 is set to the computed time in step 2232. In other words, in the for-loop of steps 2225-2233, of the various possible combinations of one or more systems is considered in order to find, when possible, a combination that will achieve $P_{target}$ in less than or equal to the maximum response time for the system configuration with the lowest possible energy usage. It should be noted that the maximum response time may be dynamically altered, from values stored in memory, such as in the tables discussed above with reference to FIG. 19B, according to various additional rules, heuristics, and considerations, such as the nature of the setpoint change being carried out. In fact, additional rules and characterizations may be used to dynamically alter various of the thresholds employed for monitoring and adjustment of the control strategies. When no combination of one or more systems can achieve $P_{target}$ in less than or equal to the maximum response time, and the combination of one or more systems with the least estimated response time is determined. When at least one combination of systems can achieve $P_{target}$ in less than or equal to the maximum response time, as determined in step 2234, then the most energy efficient of these systems is returned by the routine "select system combination." Otherwise the combination that most quickly achieves $P_{target}$ is returned. In alternative implementations, rather than considering a large number of possible combinations of systems, in the for-loop of steps 2225-2233, an initial system may be selected and additional systems added, as needed, to obtain a combination of systems adequate to carry out the setpoint change.

Figure 22D:
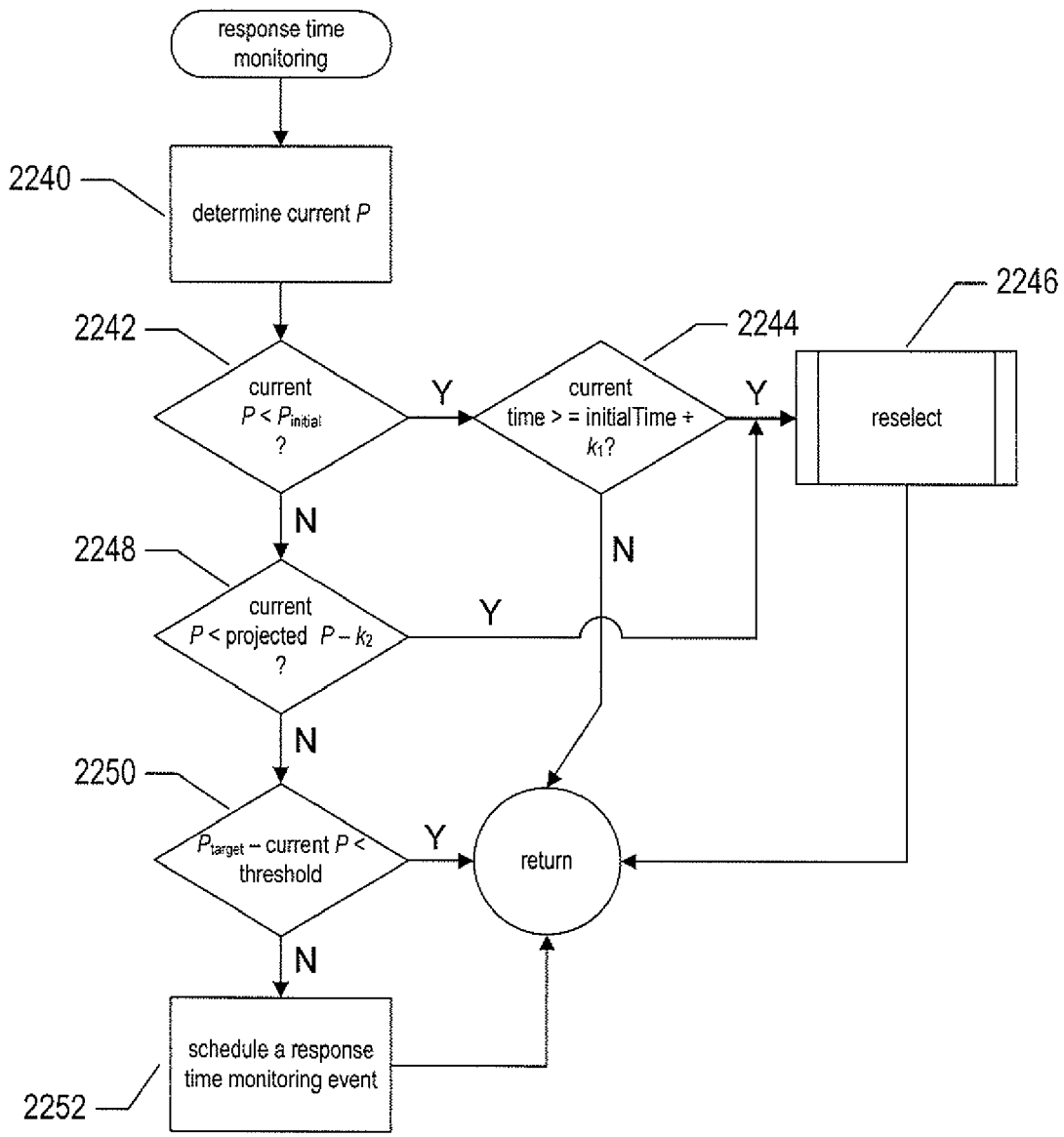

FIG. 22D provides a control-flow diagram for the routine "response time monitoring," called in step 2122 of FIG. 21. This is an event handler for the response-time-monitoring event, and carries out the monitoring for the P-response as discussed above with reference to 2012 in FIG. 20. In step 2240, the routine "response time monitoring" determines the current value for the environmental variable P. When this value is less than $P_{initial}$, as determined in step 2242, and when the current time is greater than the initial time of the P-response curve plus some constant value, as determined in step 2244, then the routine "reselect" is called in step 2246 in order to attempt to choose a better combination of one or more systems to activate in order to achieve $P_{target}$ as quickly as possible. The routine "reselect" corresponds to the subsequent decision discussed above with reference to 2018 in FIG. 20. In this case, the change in P value is opposite, in direction, from the desired change. The constant value added to the current time ensures that a reselection of active systems is not undertaken during an initial unstable period following initial system activation. Similarly, when the current value of the environmental variable P is less than the projected value of P minus a constant, as determined in step 2248, indicating that sufficient progress towards $P_{target}$ is not being made, the routine "reselect" is called in step 2246. When the current value of the environmental variable P is within a threshold distance of $P_{target}$, as determined in step 2250, the routine "response time monitoring" returns without scheduling a next response-time-monitoring event, since $P_{target}$ the response-time monitoring is no longer needed. Otherwise, a next response-time-monitoring event is scheduled in step 2252.

Figure 22E:
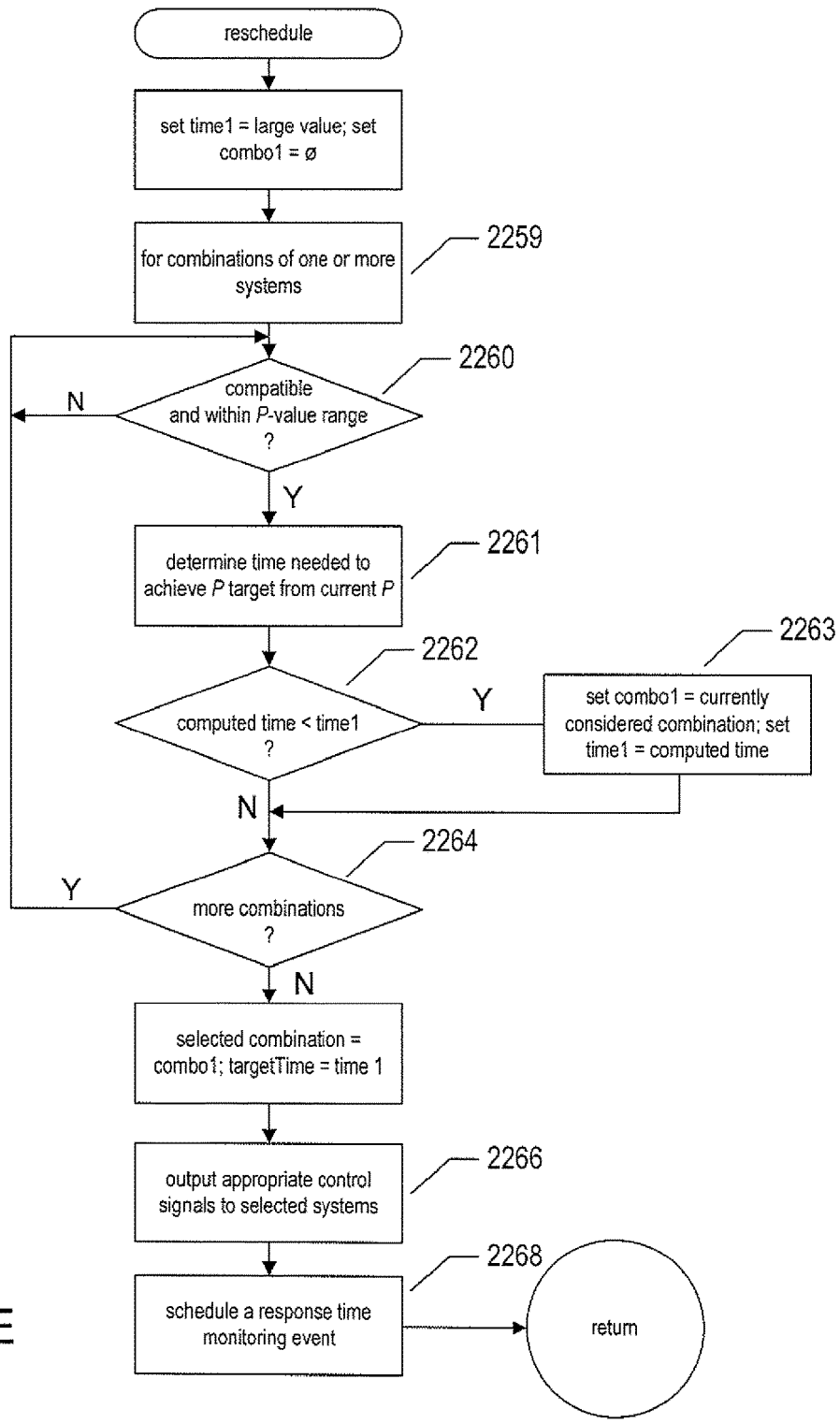

FIG. 22E provides a control-flow diagram for the routine "reselect" called in step 2246 of FIG. 22D. This routine is similar to the routine "select system combination" shown in FIG. 22C. However, in the case of the routine "reschedule," the combination of one or more systems that provides the most rapid achievement of $P_{target}$ is determined, in the for-loop of steps 2259-2264, and the appropriate control signals are output to the selected one or more systems in step 2266. Finally, in step 2268, a next response-time-monitoring event is scheduled.

Thus, returning to FIG. 20, following an immediate-control input or scheduled setpoint change 2016, the routine "initial system activation," shown in FIG. 22B, is called in order to decide which combination of one or more systems to activate in order to achieve the target P value, a step represented by decision 2010 in FIG. 20. Then, by continuously rescheduling a next response-time-monitoring event, the routine "response time monitoring" is repeatedly called, during the response time, to monitor progress towards target P, as represented by the unfilled circles, such as unfilled circle 2012 in FIG. 20. In the case that progress towards target P is unsatisfactory, as detected in the routine "response time monitoring," the routine "reschedule," shown in FIG. 22E is called in order to reselect one or more systems for activation in order to attempt to reach the target P value either within the maximum response time, if still possible, or as quickly as possible, if no longer possible within the maximum response time. A rescheduling operation is illustrated in FIG. 20 by filled disk 2018. The monitoring may be carried out, using simple heuristics, by a low-power processor within the intelligent controller, in one implementation, while the system-activation decisions may be made by a higher-power processor that is awaken by the low-power processor when the need for active-system reselection is determined.

The continuous, intermittent, or periodic monitoring, by the intelligent controller, of the progress towards a target P value following an immediate-control input or scheduled setpoint change allows the intelligent controller to achieve a desired balance between energy efficiency and response time. In additional implementations, other considerations may be factored into the selection of one or more subsystems for activation in order to achieve a specified value of an environmental parameter. In certain cases, more complex considerations may be made by an intelligent controller in order to achieve specified values for multiple parameters under various different constraints.

It should be noted that the intelligent controller computes response-time values and stores the computed remaining-response-time values in at least one memory during response-monitoring. The intelligent controller also stores selections of one or more systems for activation in memory in order to subsequently generate control signals.

Intelligent Thermostats that Incorporate Methods and Implementations for Monitoring Progress and Dynamically Altering Control by an Intelligent Controller The response-monitoring techniques discussed with reference to FIGS. 20-22E find particular application in intelligent thermostats, one class of intelligent controllers. Many residential and commercial controlled environments employ heat pumps for heating and cooling. Heat pumps are efficient at higher temperatures but lose their efficiency as the outside temperature falls. For this reason, many residential and commercial controlled environments include some type of auxiliary heating system, in addition to the heat pump, to allow for reasonable response times at temperatures below those for which heat pumps efficiently heat a controlled environment. However, in general, the auxiliary heating systems tend to be less energy efficient than heat pumps, more costly to operate than heat pumps, or, commonly, both less energy efficient and more costly, often by a factor of between 3 and 5. Thus, using the above-discussed response-type monitoring techniques, an intelligent thermostat can attempt to dynamically strike an acceptable balance between activating only a heat pump, in order to conserve energy, and activating the auxiliary heating system instead of, or concurrently with, the heat pump in order to achieve acceptable response times.

Important issues arise at the interface between (i) energy-saving technologies that might be achievable using known sensing and processing methods, and (ii) the actual widespread user adoption of devices that implement such energy-saving technologies and the integration of those devices into their daily routines and environment. The user interface for an energy-saving device generally needs to provide, to users, an easy, enjoyable, and pleasant experience, or else the user may disregard the energy-saving features of the device, such as by avoiding interaction with advanced energy-saving features, de-activating the advanced features by, for example, setting a thermostat to a temporary manual-override mode on a permanent basis, or even exchanging the device for an older-technology device with a less complicated user interface. Certain of the above described intelligent-controller interfaces, including the auto-component-activation-level-selection interface shown in FIG. 18, contribute to providing an intelligent, multi-sensing, network-connected, energy-saving device for adoption into the home in an easy, pleasant, seamless, and user-friendly manner. An intelligent-thermostat implementation, discussed below, incorporates many features that contribute to providing an intelligent, multi-sensing, network-connected, energy-saving device for adoption into the home in an easy, pleasant, seamless, and user-friendly manner.

FIGS. 23A-31 illustrate an implementation of an intelligent thermostat. Following a discussion of these figures, provided below, application of the above-discussed intelligent-controller monitoring-and-adjustment techniques in an intelligent thermostat implementation is discussed, with reference to FIGS. 32-39.

FIG. 23A illustrates a perspective view of an intelligent thermostat. The intelligent thermostat 2300 has a sleek, elegant appearance. The intelligent thermostat 2300 comprises a circular main body 2308 with a diameter of about 8 cm and that has a visually pleasing outer finish, such as a satin nickel or chrome finish. A cap-like structure comprising a rotatable outer ring 2306, a sensor ring 2304, and a circular display monitor 2302 is separated from the main body 2308 by a small peripheral gap 2310. The outer ring 2306 may have an outer finish identical to that of the main body 2308, while the sensor ring 2304 and circular display monitor 2302 may have a common circular glass (or plastic) outer covering that is gently arced in an outward direction and that provides a sleek yet solid and durable-looking overall appearance. The sensor ring 2304 contains any of a wide variety of sensors, including infrared sensors, visible-light sensors, and acoustic sensors. The glass or plastic that covers the sensor ring 2304 may be smoked or mirrored such that the sensors themselves are not visible to the user. An air venting functionality may be provided, via the peripheral gap 2310, which allows the ambient air to be sensed by the internal sensors without the need for gills or grill-like vents.

FIGS. 23B-23C illustrate the intelligent thermostat being controlled by a user. The intelligent thermostat 2300 is controlled by two types of user input: (1) a rotation of the outer ring 2306 (FIG. 23B); and (2) an inward push on the outer ring 2306 (FIG. 23C) until an audible and/or tactile "click" occurs. The inward push may cause the outer ring 2306 to move forward, while in another implementation, the entire cap-like structure, including both the outer ring 2306 and the glass covering of the sensor ring 2304 and circular display monitor 2302, move inwardly together when pushed. The sensor ring 2304, the circular display monitor 2302, and the common glass covering do not rotate with outer ring 2306 in one implementation.

By rotation of the outer ring 2306, or ring rotation, and inward pushing of the outer ring 2306, or inward click, the intelligent thermostat 2300 can receive all necessary information from the user for basic setup and operation. The outer ring 2306 is mechanically mounted in a manner that provides a smooth yet viscous feel to the user, for further promoting an overall feeling of elegance while also reducing spurious or unwanted rotational inputs. The intelligent thermostat 2300 recognizes three fundamental user inputs: (1) ring rotate left, (2) ring rotate right, and (3) inward click. In other implementations, more complex fundamental user inputs can be recognized, such as double-click or triple-click inward presses and speed-sensitive or acceleration-sensitive rotational inputs.

Figure 24:
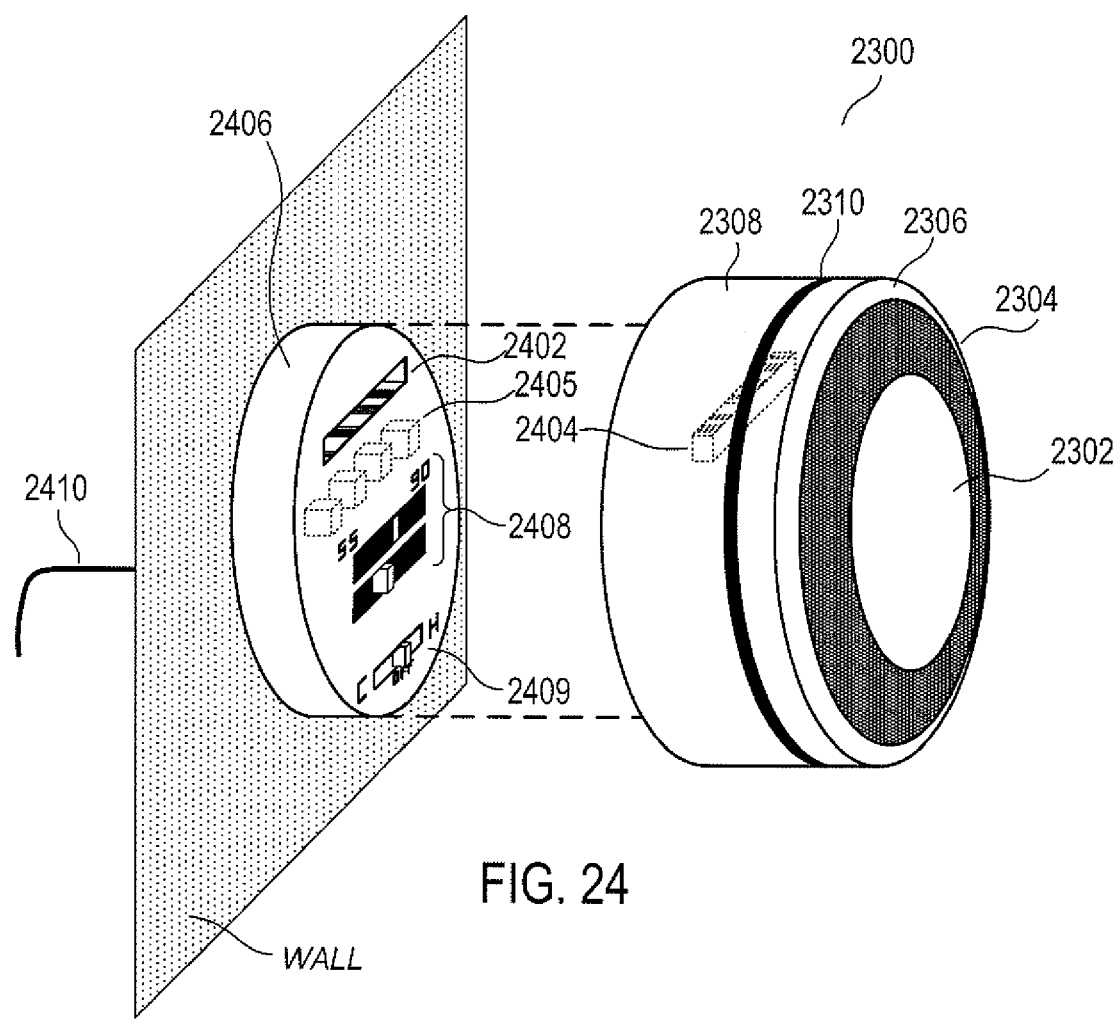
FIG. 24 illustrates an exploded perspective view of the intelligent thermostat and an HVAC-coupling wall dock.

FIG. 24 illustrates an exploded perspective view of the intelligent thermostat and an HVAC-coupling wall dock. The HVAC-coupling wall dock 2406 has the functionality as a very simple, elemental, standalone thermostat when the intelligent thermostat 2300 is removed, the elemental thermostat including a standard temperature readout/setting dial 2408 and a simple COOL-OFF-HEAT switch 2409. This can prove useful for a variety of situations, such as when the intelligent thermostat 2300 needs to be removed for service or repair for an extended period of time. In one implementation, the elemental thermostat components 2408 and 2409 are entirely mechanical in nature, so that no electrical power is needed to trip the control relays. In other implementations, simple electronic controls, such as electrical up/down buttons and/or an LCD readout, are provided. In other implementations, a subset of the advanced functionalities of the intelligent thermostat 2300 can be provided, such as elemental network access to allow remote control that provides a brain-stem functionality while the intelligent thermostat is temporarily removed.

Figure 25A:
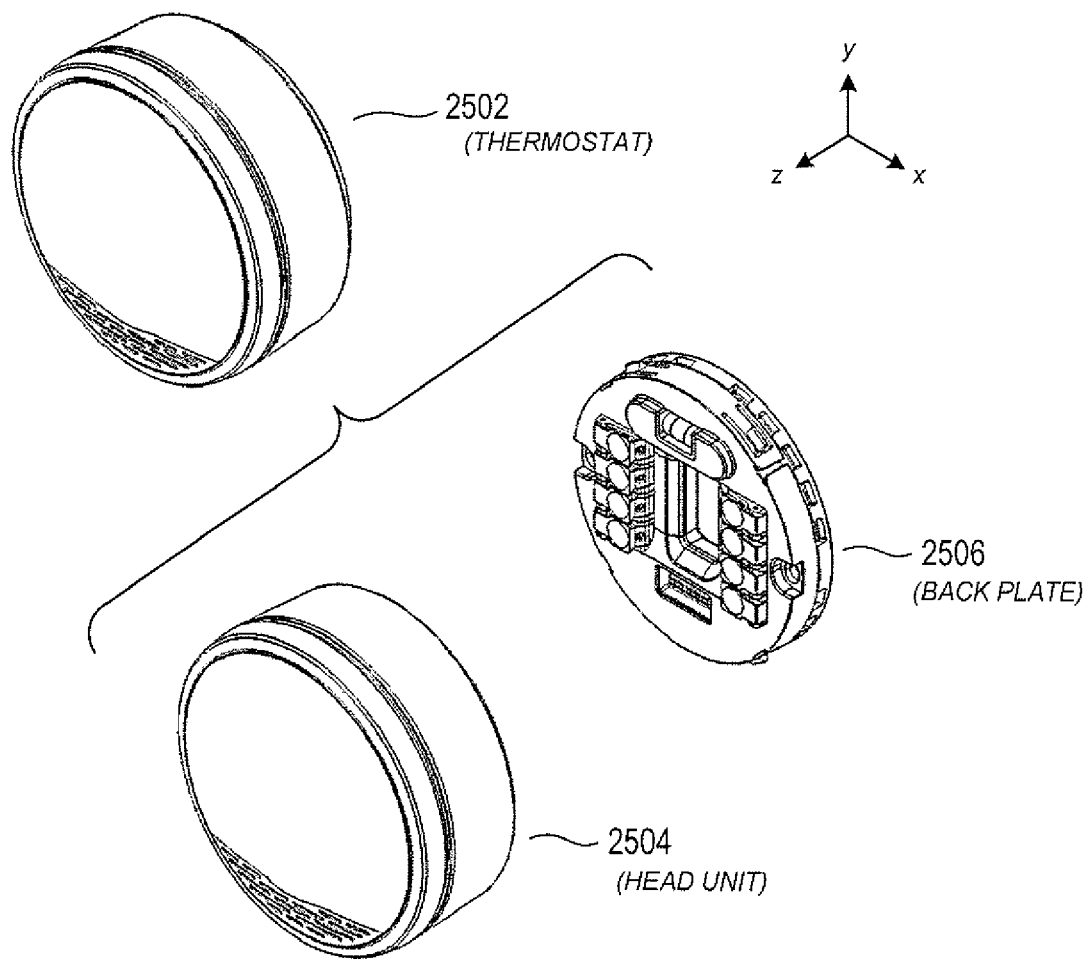
FIGS. 25A-B illustrate exploded front and rear perspective views of the intelligent thermostat.
Figure 25B:
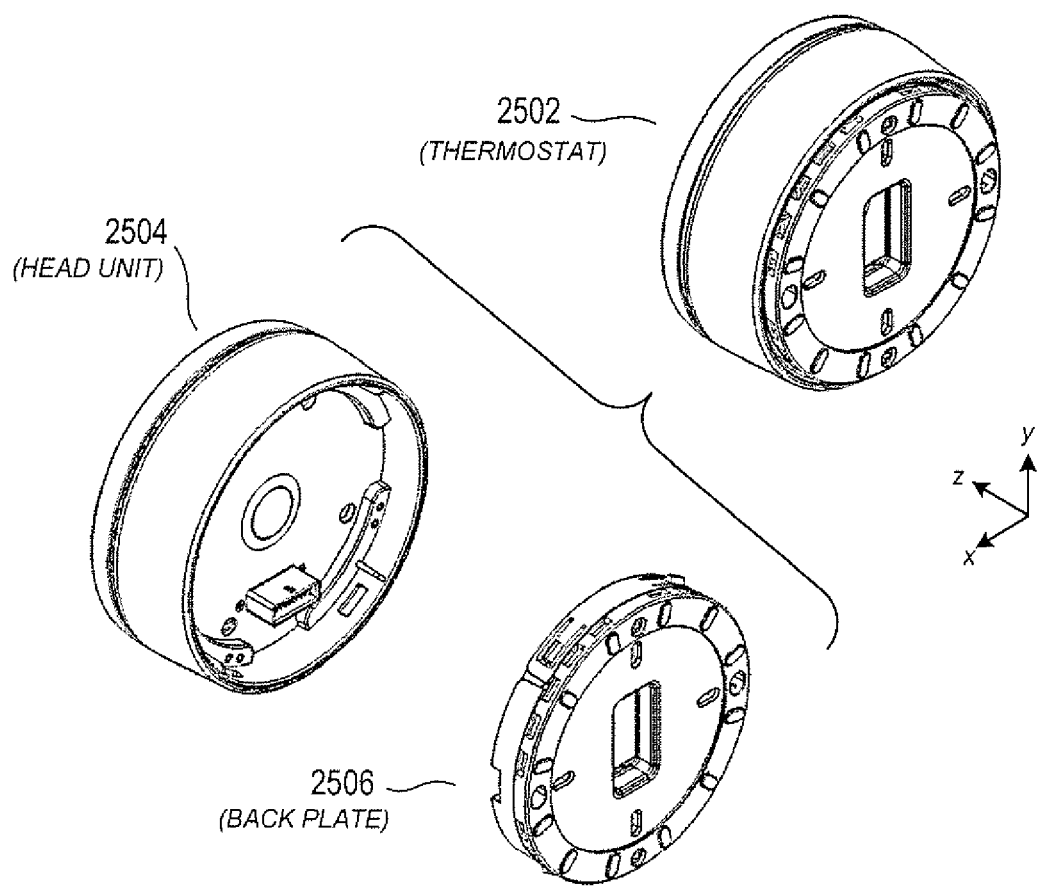

FIGS. 25A-25B illustrate exploded front and rear perspective views of the intelligent thermostat. FIGS. 25A-25B show the intelligent thermostat 2502 with respect to its two main components: (1) the head unit 2404; and (2) the back plate 2506. In the drawings shown, the z direction is outward from the wall, the y direction is the head-to-toe direction relative to a walk-up user, and the x direction is the user's left-to-right direction.

Figure 26A:
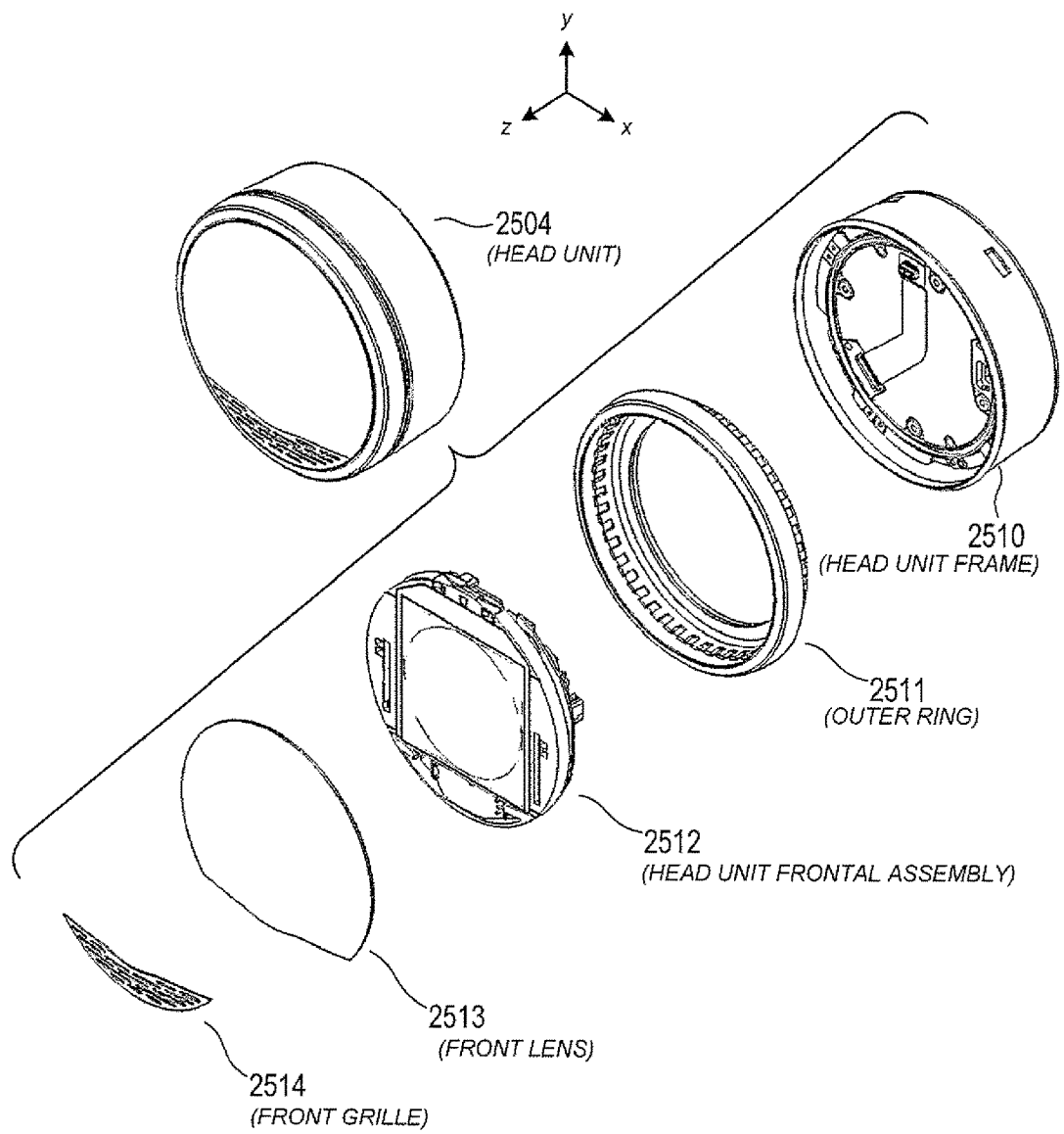
FIGS. 26A-B illustrate exploded front and rear perspective views, respectively, of the head unit.
Figure 26B:
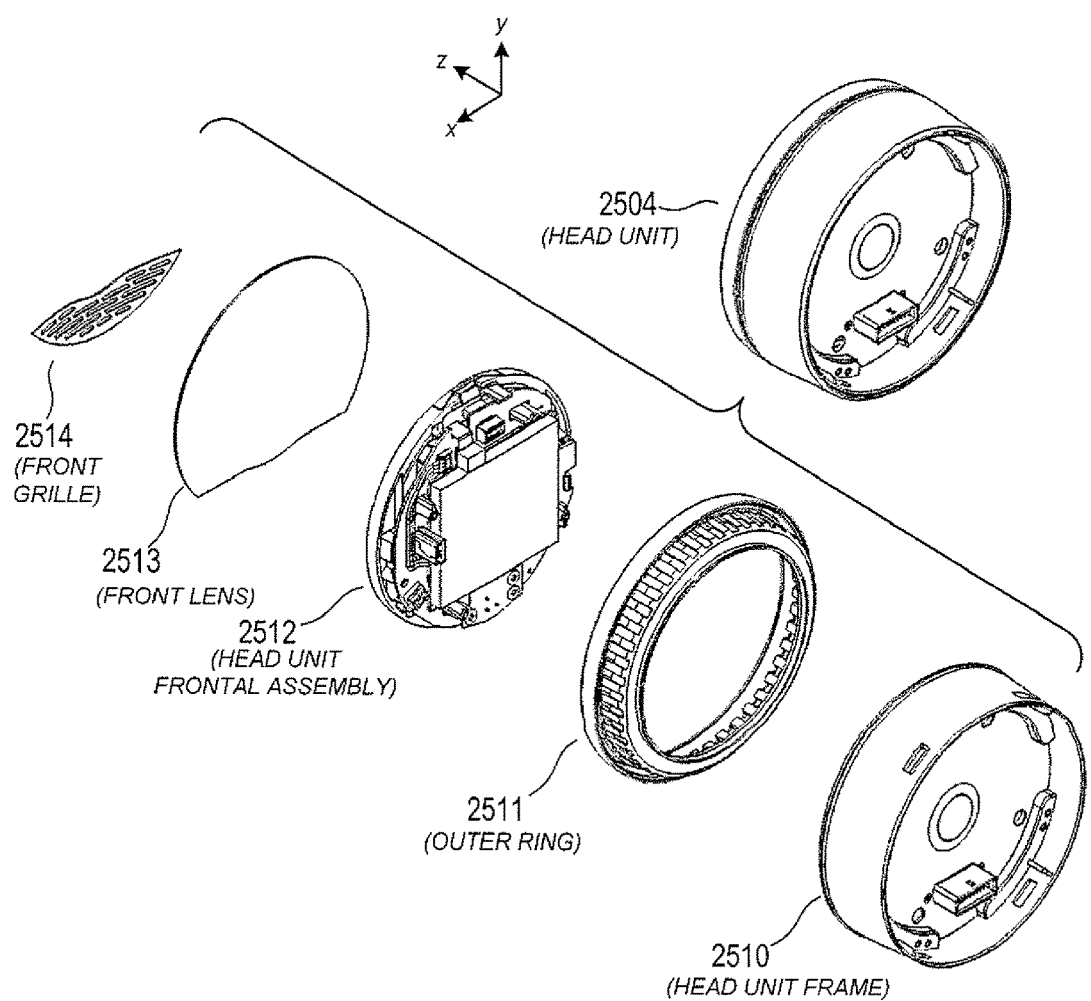

FIGS. 26A-26B illustrate exploded front and rear perspective views, respectively, of the head unit. Head unit 2404 includes a head unit frame 2510, the outer ring 2511, a head unit frontal assembly 2512, a front lens 2513, and a front grille 2514. Electrical components on the head unit frontal assembly 2512 can connect to electrical components on the backplate 2506 via ribbon cables and/or other plug type electrical connectors.

Figure 27A:
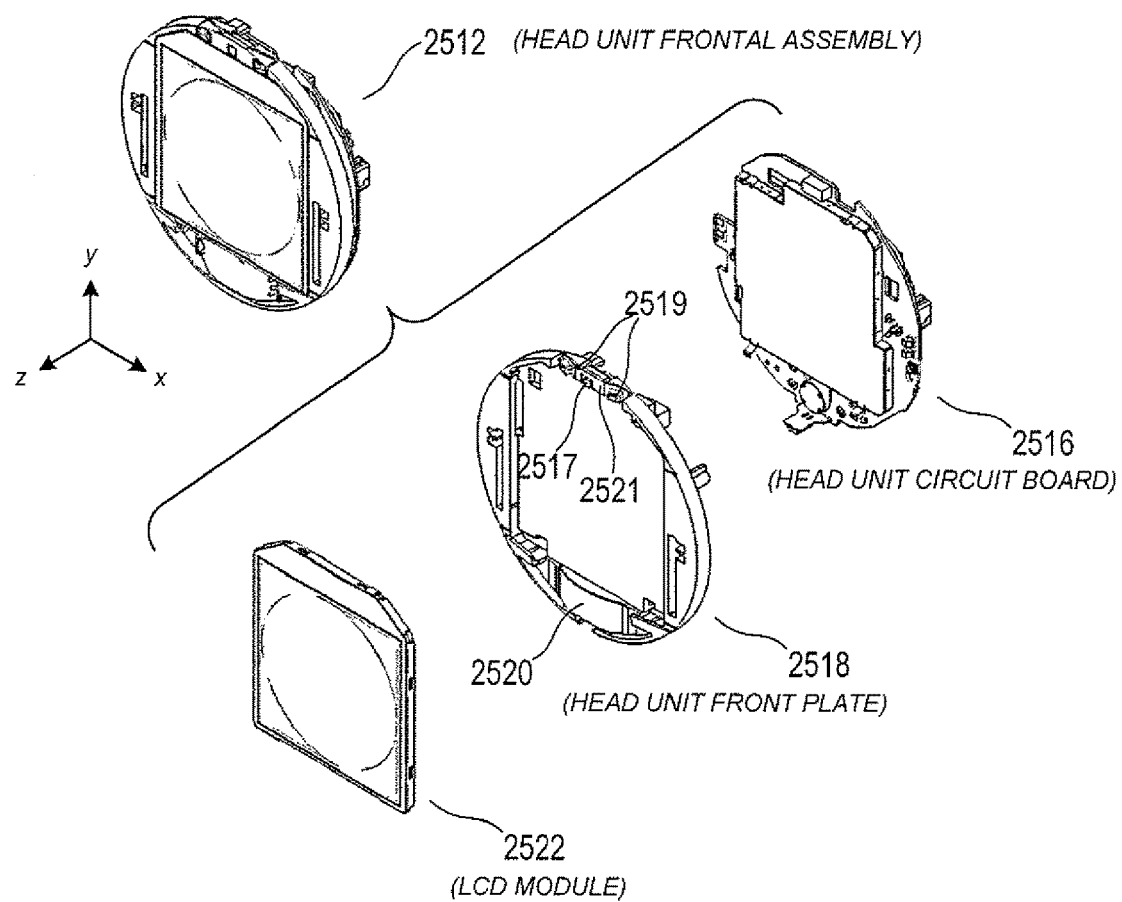
FIGS. 27A-B illustrate exploded front and rear perspective views, respectively, of the head unit frontal assembly.
Figure 27B:
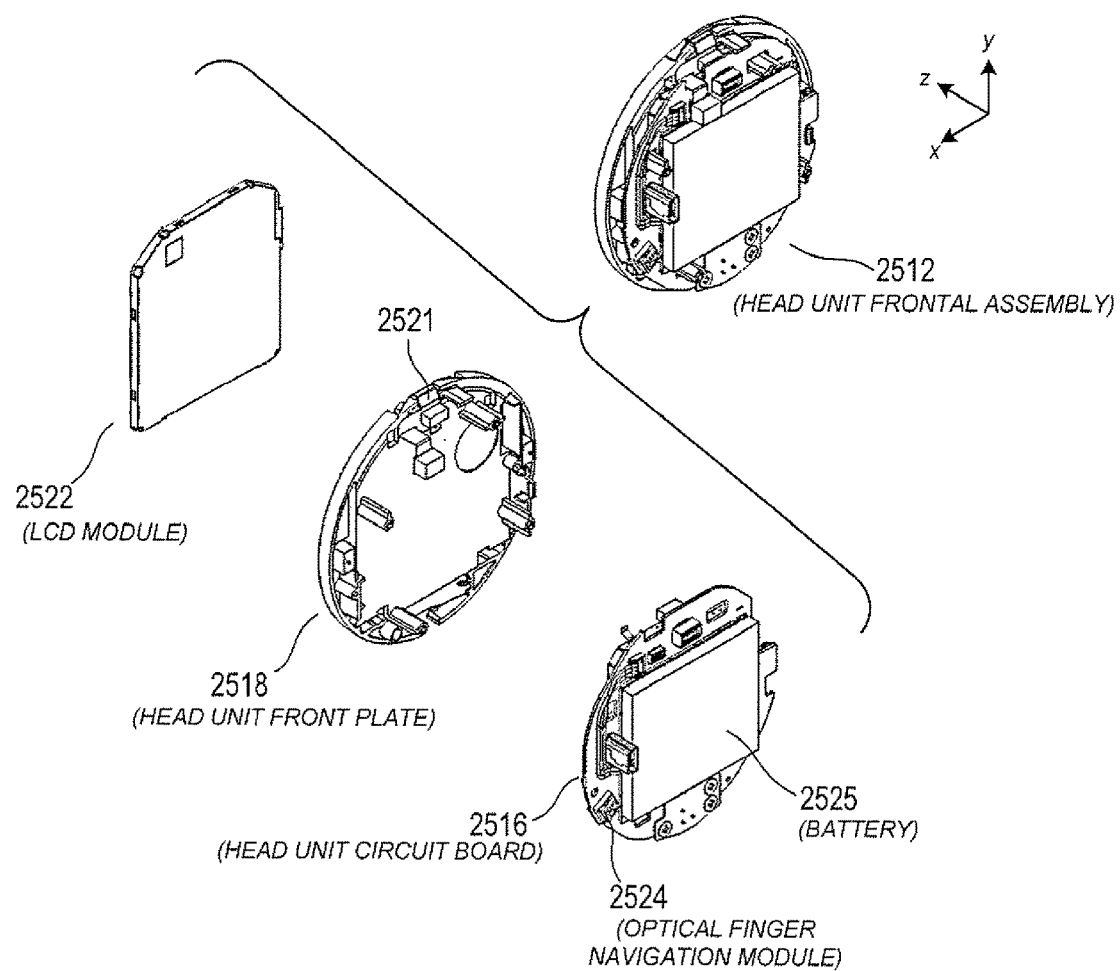

FIGS. 27A-27B illustrate exploded front and rear perspective views, respectively, of the head unit frontal assembly. Head unit frontal assembly 2512 comprises a head unit circuit board 2516, a head unit front plate 2518, and an LCD module 3242. The components of the front side of head unit circuit board 2516 are hidden behind an RF shield in FIG. 27A. A rechargeable Lithium-Ion battery 2525 is located on the back of the head unit circuit board 2516, which, in one implementation, has a nominal voltage of 3.7 volts and a nominal capacity of 560 mAh. To extend battery life, the battery 2525 is normally not charged beyond 450 mAh by the thermostat battery charging circuitry. Moreover, although the battery 2525 is rated to be capable of being charged to 4.2 volts, the intelligent thermostat battery-charging circuitry normally does not charge the intelligent thermostat beyond 3.95 volts. Also shown in FIG. 27B is an optical finger navigation module 2524 that is configured and positioned to sense rotation of the outer ring 2511. The module 2524 uses methods analogous to the operation of optical computer mice to sense the movement of a texturable surface on a facing periphery of the outer ring 2511. Notably, the module 2524 is one of the very few sensors that are controlled by the relatively power-intensive head unit microprocessor rather than the relatively low-power backplate microprocessor. This is achievable without excessive power drain because the head unit microprocessor is already awake when a user is manually turning the dial, avoiding excessive wake-up power drain. Advantageously, very fast response can also be provided by the head unit microprocessor. Also shown in FIG. 27A is a Fresnel lens 2520 that operates in conjunction with a PIR motion sensor disposes thereunderneath.

Figure 28A:
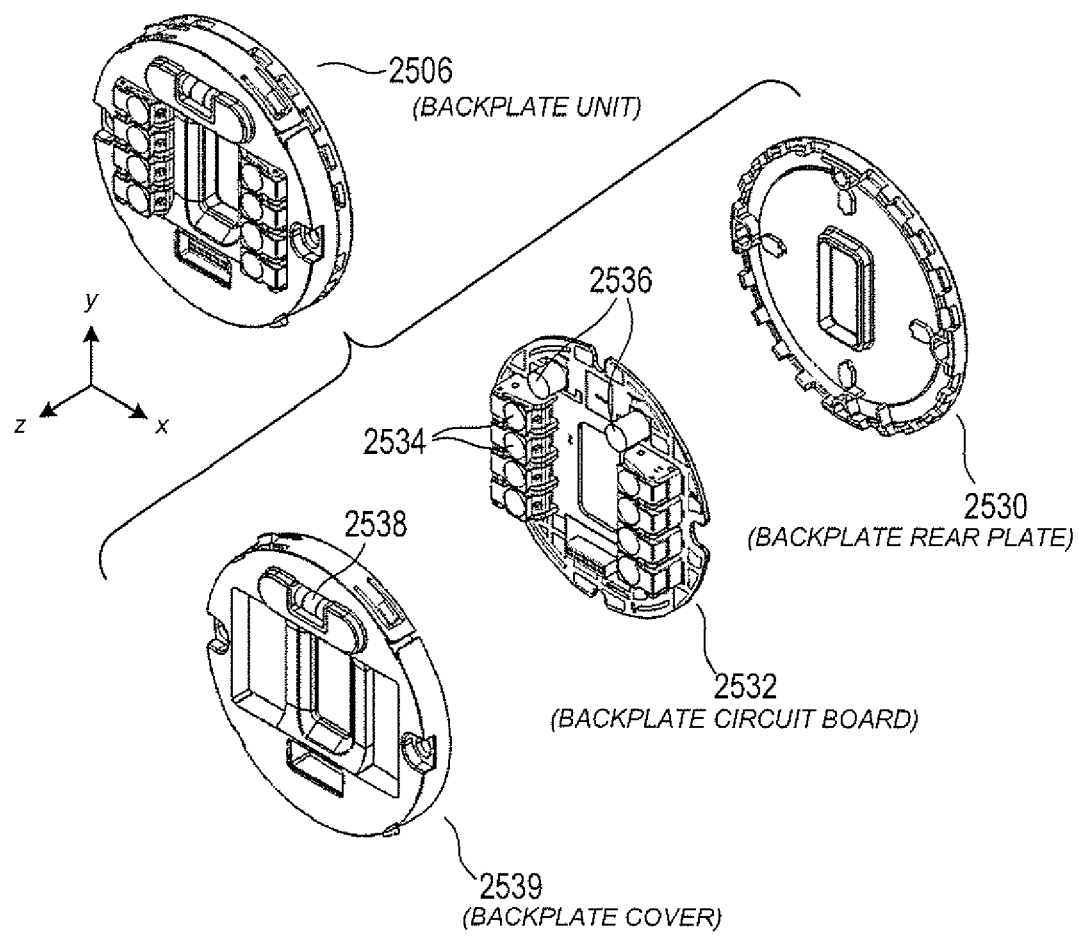
FIGS. 28A-B illustrate exploded front and rear perspective views, respectively, of the backplate unit.
Figure 28B:
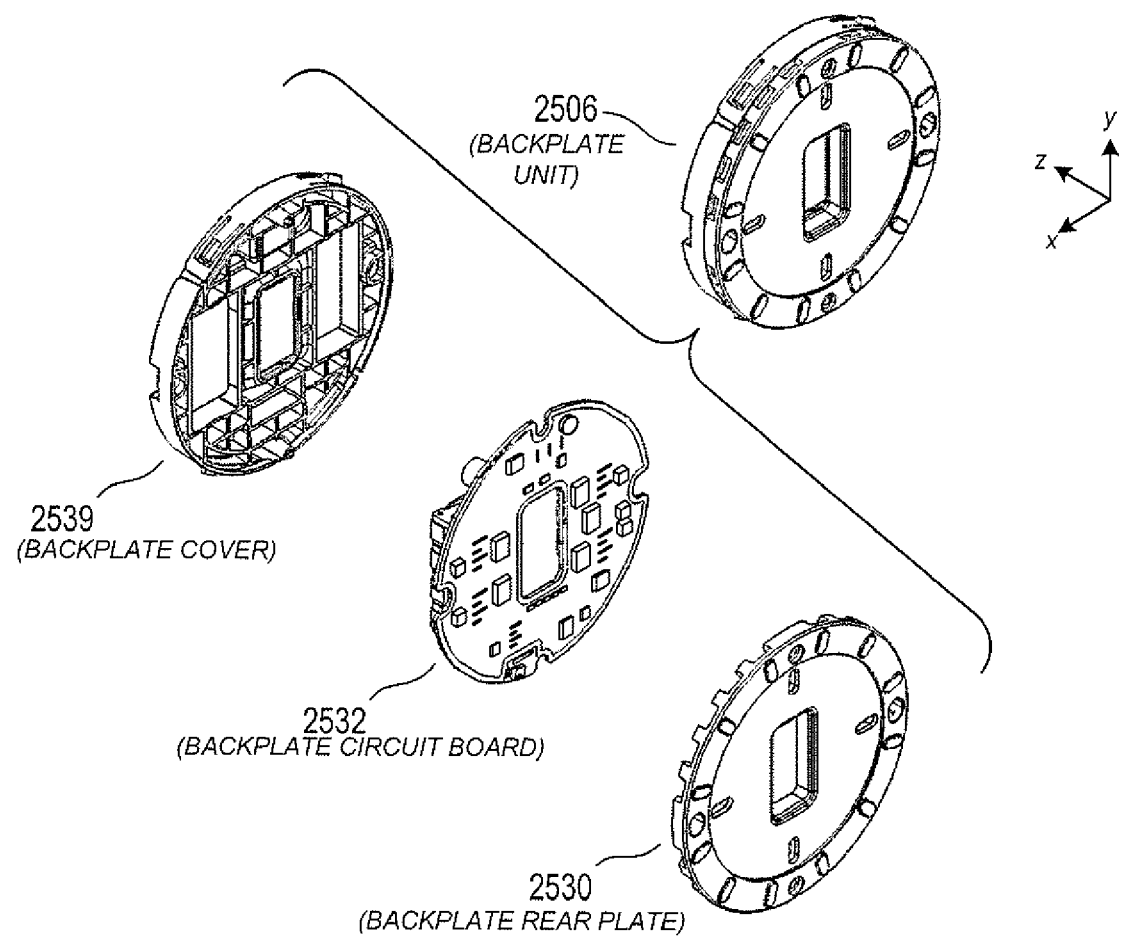

FIGS. 28A-28B illustrate exploded front and rear perspective views, respectively, of the backplate unit. Backplate unit 2506 comprises a backplate rear plate 2530, a backplate circuit board 2532, and a backplate cover 2539. FIG. 28A shows the HVAC wire connectors 2534 that include integrated wire-insertion-sensing circuitry and two relatively large capacitors 2536 that are used by the power stealing circuitry that is mounted on the back side of the backplate circuit board 2532.

Figure 29:
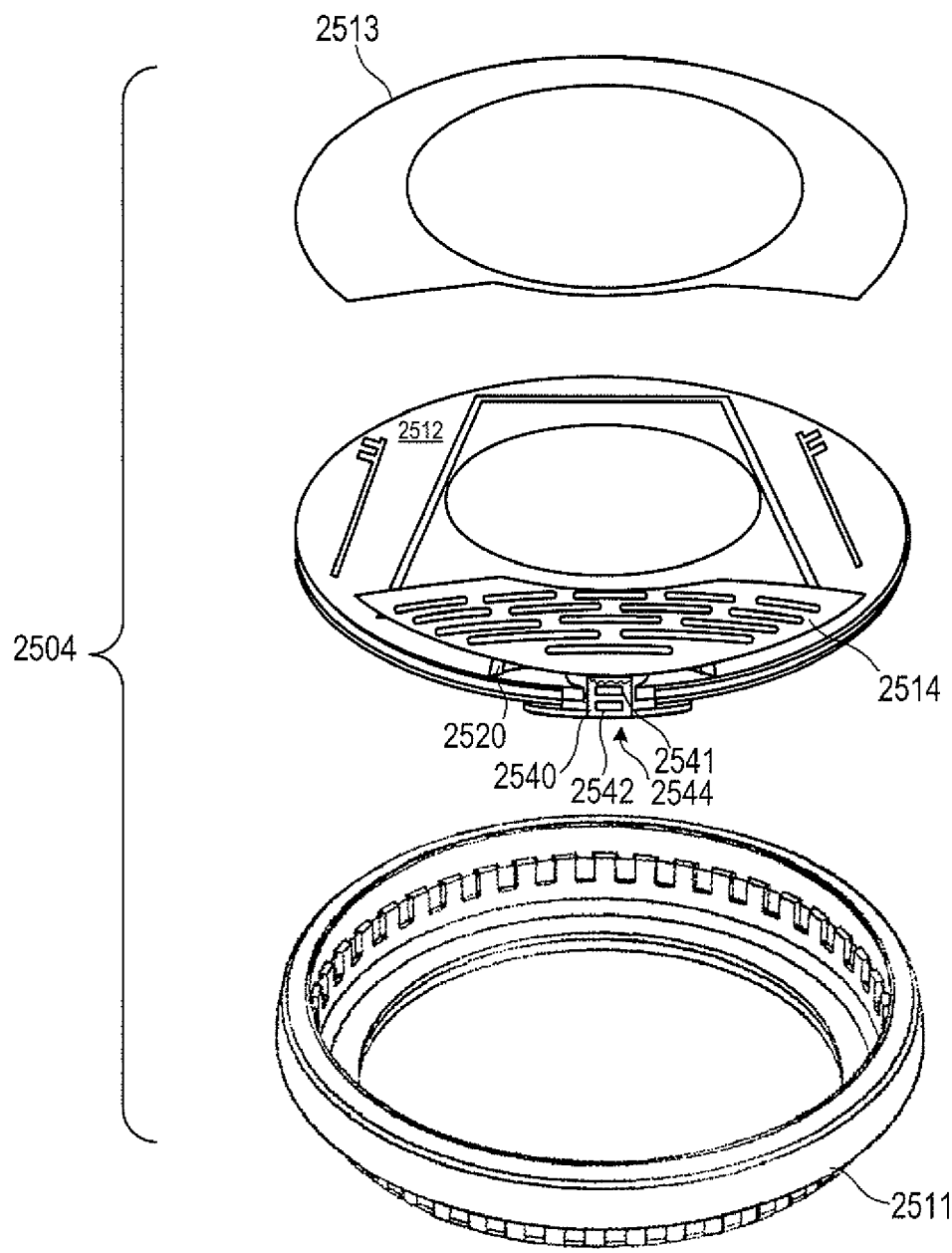
FIG. 29 shows a perspective view of a partially assembled head unit.

FIG. 29 shows a perspective view of a partially assembled head unit. In certain implementations, placement of grille member 2514 over the Fresnel lens 2520 and an associated PIR motion sensor 254 conceals and protects these PIR sensing elements, while horizontal slots in the grille member 2514 allow the PIR motion sensing hardware, despite being concealed, to detect the lateral motion of occupants in a room or area. A temperature sensor 2540 uses a pair of thermal sensors to more accurately measure ambient temperature. A first or upper thermal sensor 2541 associated with temperature sensor 2540 gathers temperature data closer to the area outside or on the exterior of the thermostat while a second or lower thermal sensor 2542 collects temperature data more closely associated with the interior of the housing. In one implementation, each of the temperature sensors 2541 and 2542 comprises a Texas Instruments TMP112 digital temperature sensor chip, while the PIR motion sensor 2544 comprises PerkinElmer DigiPyro PYD 1998 dual-element pyrodetector.

To more accurately determine the ambient temperature, the temperature taken from the lower thermal sensor 2542 is considered in conjunction with the temperatures measured by the upper thermal sensor 2541 and when determining the effective ambient temperature. This configuration can be used to compensate for the effects of internal heat produced in the thermostat by the microprocessor(s) and/or other electronic components, obviating or minimizing temperature measurement errors that might otherwise be suffered. In some implementations, the accuracy of the ambient temperature measurement may be further enhanced by thermally coupling upper thermal sensor 2541 of temperature sensor 2540 to grille member 2514 as the upper thermal sensor 2541 better reflects the ambient temperature than lower thermal sensor 2542.

Figure 30:
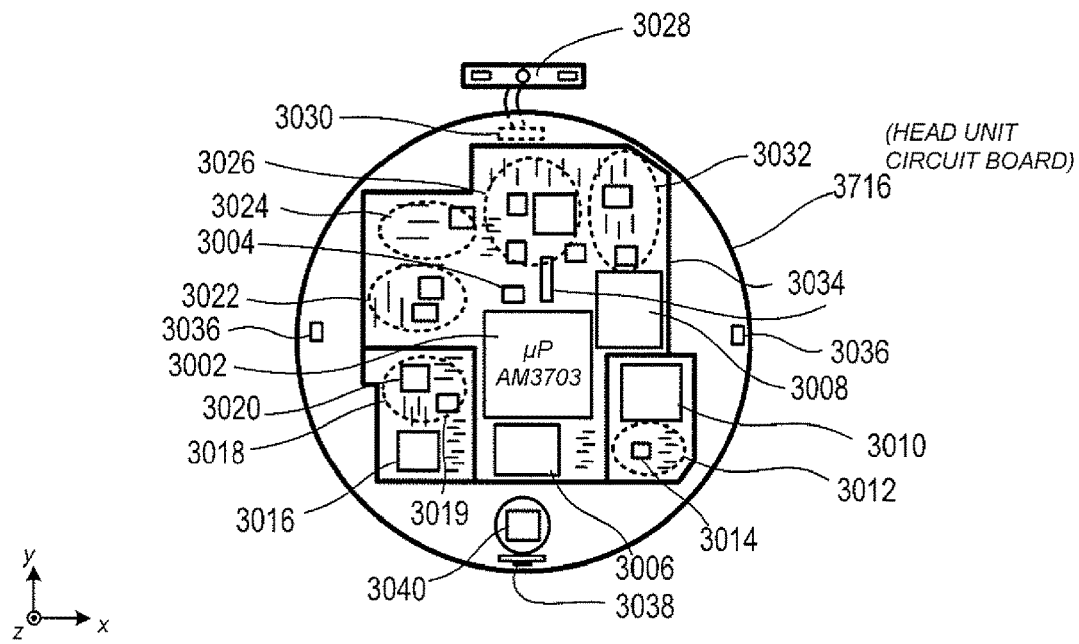
FIG. 30 illustrates the head unit circuit board.

FIG. 30 illustrates the head unit circuit board. The head unit circuit board 2516 comprises a head unit microprocessor 3002 (such as a Texas Instruments AM3703 chip) and an associated oscillator 3004, along with DDR SDRAM memory 3006, and mass NAND storage 3008. A Wi-Fi module 3010, such as a Murata Wireless Solutions LBWA19XSLZ module, which is based on the Texas Instruments WL1270 chipset supporting the 802.11 b/g/n WLAN standard, is provided in a separate compartment of RF shielding 3034 for Wi-Fi capability. Wi-Fi module 3010 is associated with supporting circuitry 3012 including an oscillator 3014. A ZigBee module 3016, which can be, for example, a C2530F256 module from Texas Instruments, is provided, also in a separately shielded RF compartment, for ZigBee capability. The ZigBee module 3016 is associated with supporting circuitry 3018, including an oscillator 3019 and a low-noise amplifier 3020. Display backlight voltage conversion circuitry 3022, piezoelectric driving circuitry 3024, and power management circuitry 3026 are additionally provided. A proximity sensor and an ambient light sensor (PROX/ALS), more particularly a Silicon Labs SI1142 Proximity/Ambient Light Sensor with an I2C Interface, is provided on a flex circuit 3028 that attaches to the back of the head unit circuit board by a flex circuit connector 3030. Battery-charging-supervision-disconnect circuitry 3032 and spring/RF antennas 3036 are additionally provided. A temperature sensor 3038 and a PIR motion sensor 3040 are additionally provided.

Figure 31:
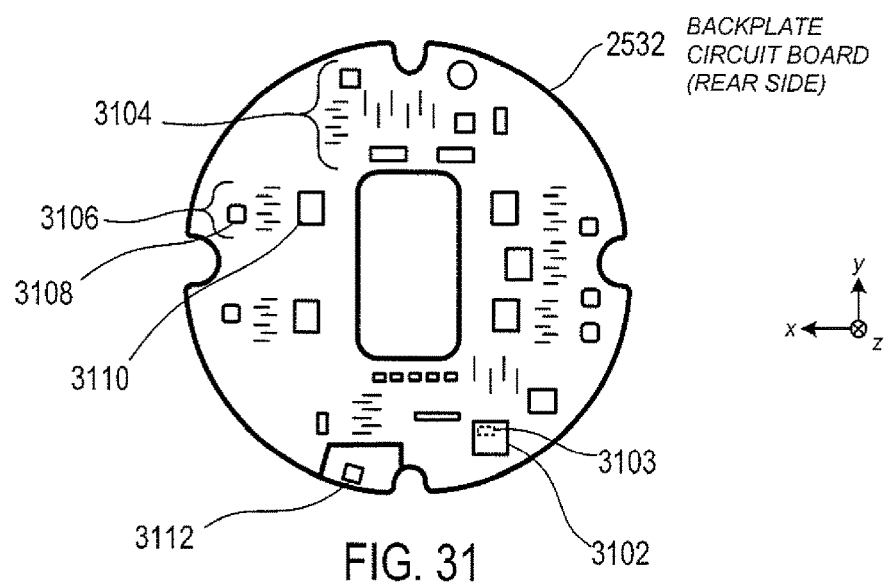
FIG. 31 illustrates a rear view of the backplate circuit board.

FIG. 31 illustrates a rear view of the backplate circuit board. The backplate circuit board 2532 comprises a backplate processor/microcontroller 3102, such as a Texas Instruments MSP430F System-on-Chip Microcontroller that includes an on-board memory 3103. The backplate circuit board 2532 further comprises power-supply circuitry 3104, which includes power-stealing circuitry, and switch circuitry 3106 for each HVAC respective HVAC function. For each such function, the switch circuitry 3106 includes an isolation transformer 3108 and a back-to-back NFET package 3110. The use of FETs in the switching circuitry allows for active power stealing, i.e., taking power during the HVAC ON cycle, by briefly diverting power from the HVAC relay circuit to the reservoir capacitors for a very small interval, such as 100 micro-seconds. This time is small enough not to trip the HVAC relay into the OFF state but is sufficient to charge up the reservoir capacitors. The use of FETs allows for this fast switching time (100 micro-seconds), which would be difficult to achieve using relays (which stay on for tens of milliseconds). Also, such relays would readily degrade with fast switching, and they would also make audible noise. In contrast, the FETS operate with essentially no audible noise. A combined temperature/humidity sensor module 3112, such as a Sensirion SHT21 module, is additionally provided. The backplate microcontroller 3102 performs polling of the various sensors, sensing for mechanical wire insertion at installation, alerting the head unit regarding current vs. setpoint temperature conditions and actuating the switches accordingly, and other functions such as looking for appropriate signal on the inserted wire at installation.

Next, various problem domains and application of the above discussed intelligent-controller monitoring and adjustment methods to those problem domains, in the context of an intelligent thermostat, are discussed. At the onset, it should be noted that control strategies, in these examples, are chosen by an intelligent thermostat to achieve a change in temperature corresponding to a setpoint change within a maximum response time in as energy efficient, least costly, or, commonly, both energy efficient and least costly manner as possible. In general, when the cost of operating a heat pump is a, where a is expressed in units of money per time or energy-usage per time, and when the cost of operating an AUX is b, where b is expressed in units of money per time or energy-usage per time, then the cost of carrying out a setpoint change is:

cost=a×(time during which heat pump is operational)+ b×(time during which AUX is operational)+

(a+b)×(time during which both heat pump and AUX are operational)

When the ratio a/b is low, or, in other words, when it is substantially less costly to operate the heat pump than the AUX, then it may often be the case that the total time of heat pump and/or AUX operation for a cost effective control strategy is greater than the total time of heat pump and/or AUX operation for a less cost effective control strategy. For example, when a/b is ¼, a first control strategy that operates the heat pump alone for 120 minutes has a cost significantly less than a second control strategy that operates the heat pump alone for 60 minutes and the heat pump and AUX together for 30 minutes:

$$\text{cost of strategy } 1 = a(120)$$

$$\text{time of stragety } 1 = 120$$

$$\text{cost of strategy } 2 = a(60) + (a+b)(30)$$

$$\text{time of strategy } 2 = 90$$

$$\frac{\text{cost of strategy } 1}{\text{cost of strategy } 2} =$$

$$\frac{a(120)}{a(60) + (a+b)(30)} = \frac{a(120)}{a(60) + (5a)(30)} = \frac{120a}{60a + 150a} = \frac{120a}{210a} < 1$$

Thus, it may be less costly to employ a control strategy that takes longer to carry out a setpoint change, and an intelligent controller can make a determination as to the relative cost efficiency of control strategies knowing only the ratios of costs of operation, even when the absolute costs of operation are unavailable.

Figure 32A:
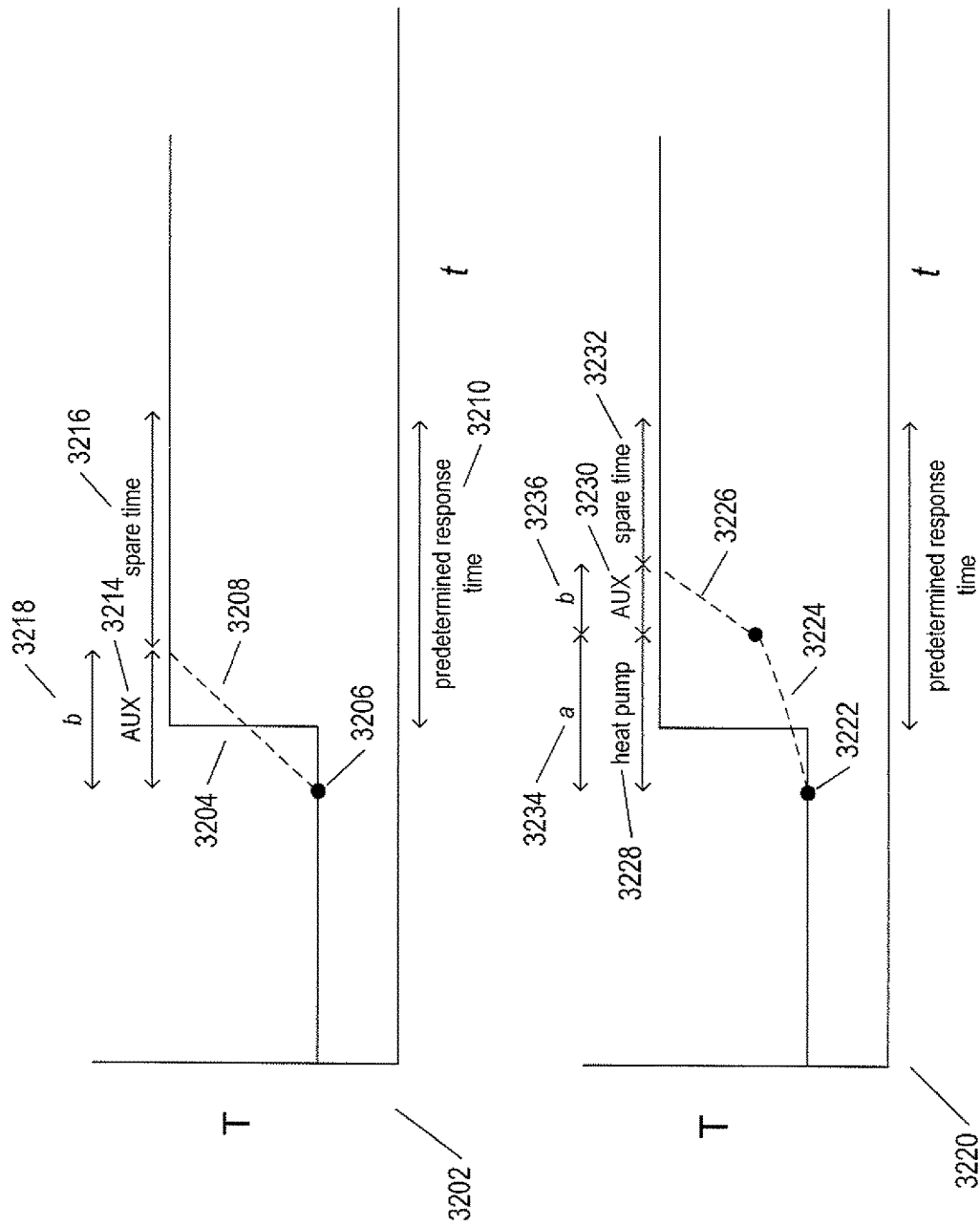
FIGS. 32A-B illustrate a problem domain related to intelligent-thermostat control of heat pumps and how the above discussed intelligent-controller monitoring and adjustment methods are applied to that problem domain in one intelligent-thermostat implementation.
Figure 32B:
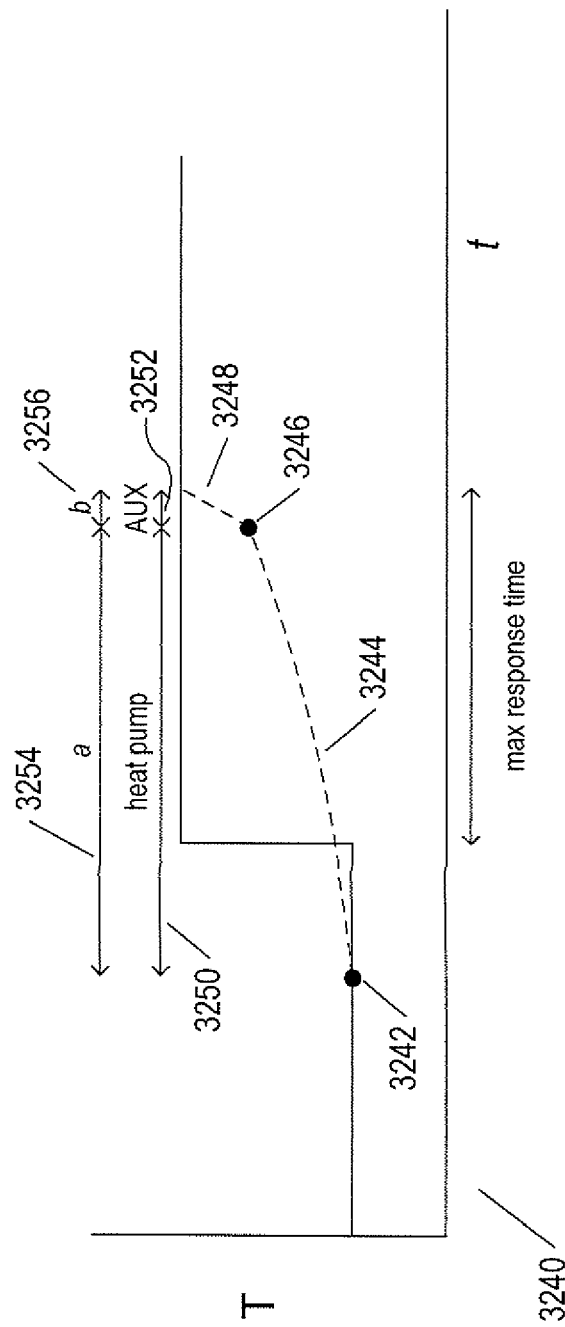

FIGS. 32A-B illustrate a problem domain related to intelligent-thermostat control of heat pumps and how the above discussed intelligent-controller monitoring and adjustment methods are applied to that problem domain in one intelligent-thermostat implementation. FIG. 32A shows a plot 3202 of a first setpoint change 3204 within a control schedule, using illustration conventions used previously in FIGS. 11A, 12A-G, and 18. In certain cases, when the outside temperate falls below $P_{lowLockout}$ for a heat pump, referred to as the "compressor lockout," a thermostat might immediately invoke the auxiliary heating unit ("AUX"), at decision point 3206, generating response 3208 which carries out the setpoint change within a predetermined response time 3210. In this example, and following examples, the heat pump represents a first system, often referred to as the "compressor," and the AUX represents a second system. The $P_{highLockout}$ for the AUX is often referred to as "AUX lockout." As a result of the initially deploying the AUX, the response time includes an initial period of AUX heating 3214 followed by spare time 3216 during which maintenance heating occurs. This spare time was available for carrying out the setpoint change, but is unused, resulting is use of costly AUX heating for the entire setpoint change. The period of time for costly operation 3218 is shown labeled b, using the cost notation discussed above. FIG. 32A also shows a plot 3220 of a second setpoint change within a control schedule. In this case, the AUX is not initially used, in the initial determination 3222, and a shallow-sloped initial response results 3224. However, after a period of time, when progress towards the setpoint temperature is determined to be inadequate, the thermostat switches to AUX heating, resulting in a steep, final response 3226. In this case, the response time includes an initial heat-pump interval 3228, an AUX interval 3230, and a spare-time interval 3232. Again, the spare time interval represents time that was available for slower, more energy-efficient heating. The costs 3224 and 3236 are illustrated as in plot 3202.

FIG. 32B shows a plot 3240 of a third setpoint change within a control schedule. In this example, the intelligent-controller monitoring and adjustment methods have been incorporated into an intelligent thermostat. In this case, the intelligent thermostat carefully considers information, such as that described with reference to FIGS. 19A-D, and initially determines 3242 that the heat pump can be initially employed alone, resulting in initial response 3244. Much later, the intelligent thermostat determines 3246 that AUX heating is needed, and deploys the AUX, resulting in a final steep response 3228. OF course, in many cases, the AUX may not be needed at all. However, even when needed, the intelligent controller, aimed with the information discussed above with reference to FIGS. 19A-D and able to closely monitor progress towards the setpoint temperature, employs a control strategy that results in a long initial heat-pump interval 3230, a very short AUX interval, and no spare time, as in the examples shown in FIG. 32A. As discussed above, when a/b is a relative low value, well below 1, the longer response time of the control strategy shown in FIG. 32B may represent the least costly of the three strategies shown in FIGS. 32A and 32B. Particularly in cases in which use of the AUX can be avoided altogether, the above-described intelligent-controller monitoring and adjustment methods can be used to make use of the available maximum response time in order to employ control strategies that take more time, but end up costing less than control strategies that fail to employ all of the maximum response time available.

The above-described intelligent-controller monitoring and adjustment techniques can be extended to control-schedule adjustments, as well. One example is a night-time-temperature economization feature that adjusts a control schedule for nighttime hours so that, in the morning, at a first scheduled setpoint change, the estimated response time will not be of sufficient length to result in use of the auxiliary heating system. This feature is deployed only when access to weather forecasts or other types of weather information are available. FIG. 33 illustrates night-time-temperature economization. In the setpoint diagram 3202, the setpoint represents a first, early morning setpoint. When outside temperature is below a certain threshold, the intelligent controller may end up using an initial heat-pump interval 3304 followed by an AUX-heating period 3306. However, as shown in the lower setpoint diagram 3308, by adjusting the night-time control schedule to a somewhat higher temperature 3307, the intelligent controller can use only heat-pump heating 3310 to carry out the setpoint change within a maximum response time.

Figure 34:
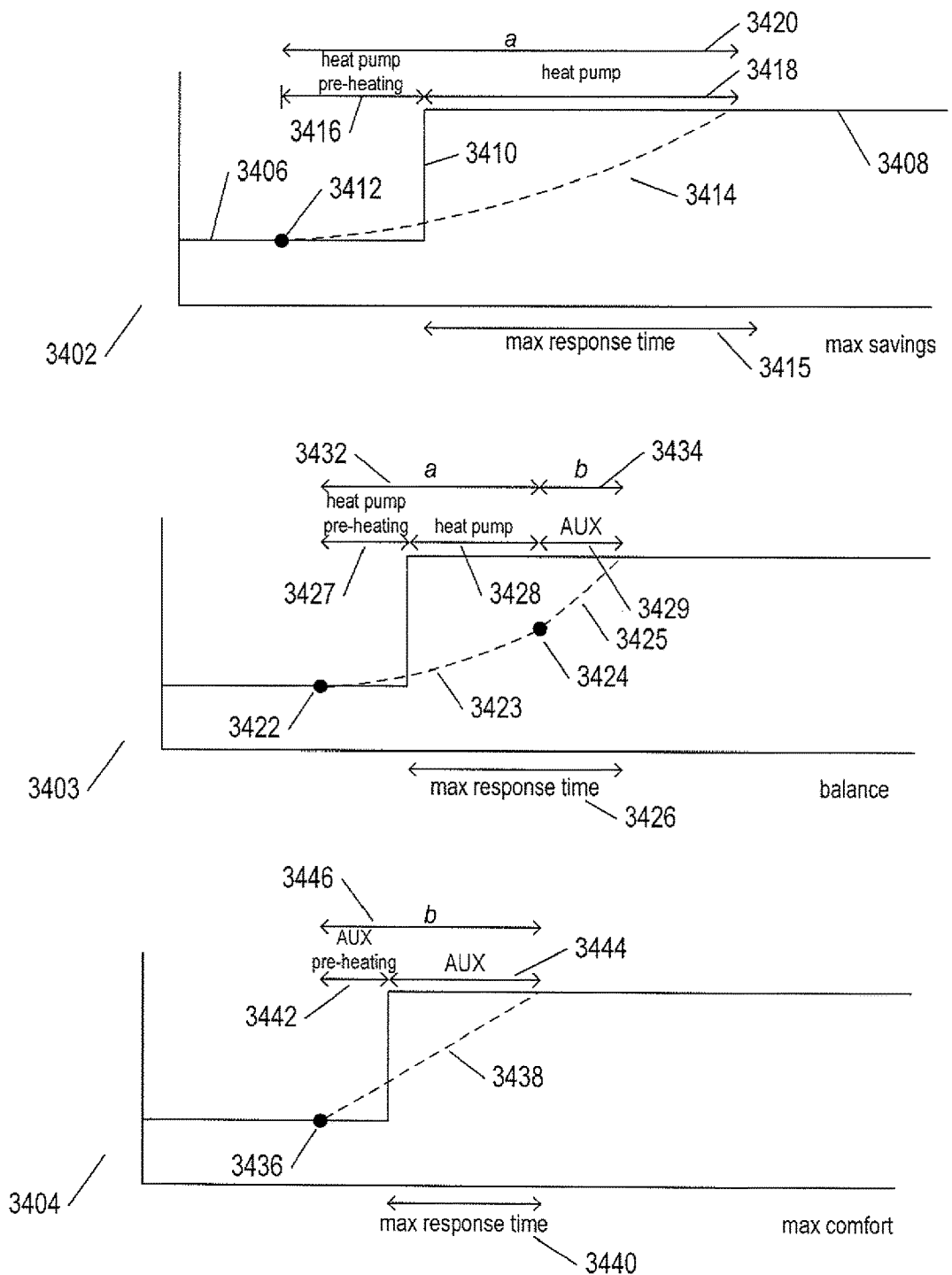
FIG. 34 illustrates example responses for setpoint changes obtained by an intelligent controller for different auto-component-configuration levels.

FIG. 34 illustrates example responses for setpoint changes obtained by an intelligent controller for different auto-component-configuration levels. In these examples, either the heat pump is operated alone or the AUX is operated alone. In other cases, both the heat pump and AUX may be operated together, and therefore the costs labeled b in the figures would be replaced by a cost labeled a+b. FIG. 34 shows three setpoint diagrams 3402-3404 for responses following a setpoint with auto-component-configuration levels max savings, balance, and max comfort, respectively. A temperature change from initial temperature 3406 to final temperature 3408 is specified by setpoint change 3410. The intelligent controller initially determines 3412 to use only the heat pump, resulting in response 3414, since, for the max-savings auto-component-configuration level, the maximum response time 3415 and pre-heating 3416 intervals are relatively long, as a result of which the heat pump can be used, without any AUX heating, to carry out the setpoint change. Whether or not AUX heating is needed depends on the outside temperature and other factors, but the maximum response time is sufficiently long to minimize AUX usage. Thus, in the max-savings mode, the heat-pump is used in both a pre-heating mode 3412 and the remaining response time 3418, resulting in a heat-pump-only operational cost 3420.

In the case of the balance auto-component-configuration level, the intelligent controller initially determines 3422 to use only the heat pump, resulting in response 3423, but then decides 3424 that AUX is needed, and deploys AUX to produce a steeper response curve 3425. This is necessary due to shorter max response 3426 and pre-heating 3427 intervals. The remaining response time is divided between heat-pump heating 3428 and AUX heating 3429, with operational costs 3432 and 3434. Again, under certain conditions, no AUX heating would be used, and, under other conditions, only AUX heating might be used. The examples of FIG. 34 are provided in the context of an outside temperature and other condition when the need for AUX heating depends on the maximum response time. In the case of the max-comfort auto-component-configuration level, the intelligent controller initially determines 3436 to use only AUX, resulting in response 3438, because of the much shorter max-response-time 3440 and pre-heating 3443 intervals. The remaining response time is entirely AUX heating 3429, with operational cost 3446.

When a/b<1, the cost associated with the setpoint strategies follow in the descending order max savings, off, balance, and max comfort, while the time to the specified temperature associated with the setpoint strategies follow in the descending order max comfort, balance, off, and max savings. These orderings may differ under different conditions, of course, but the present examples illustrate the effects of auto-component-configuration levels on responses to setpoint changes. It should be noted that an intelligent thermostat may choose more complex strategies, with multiple heat-pump and/or AUX intervals in various orders, depending on environmental conditions and other considerations.

Figure 35:
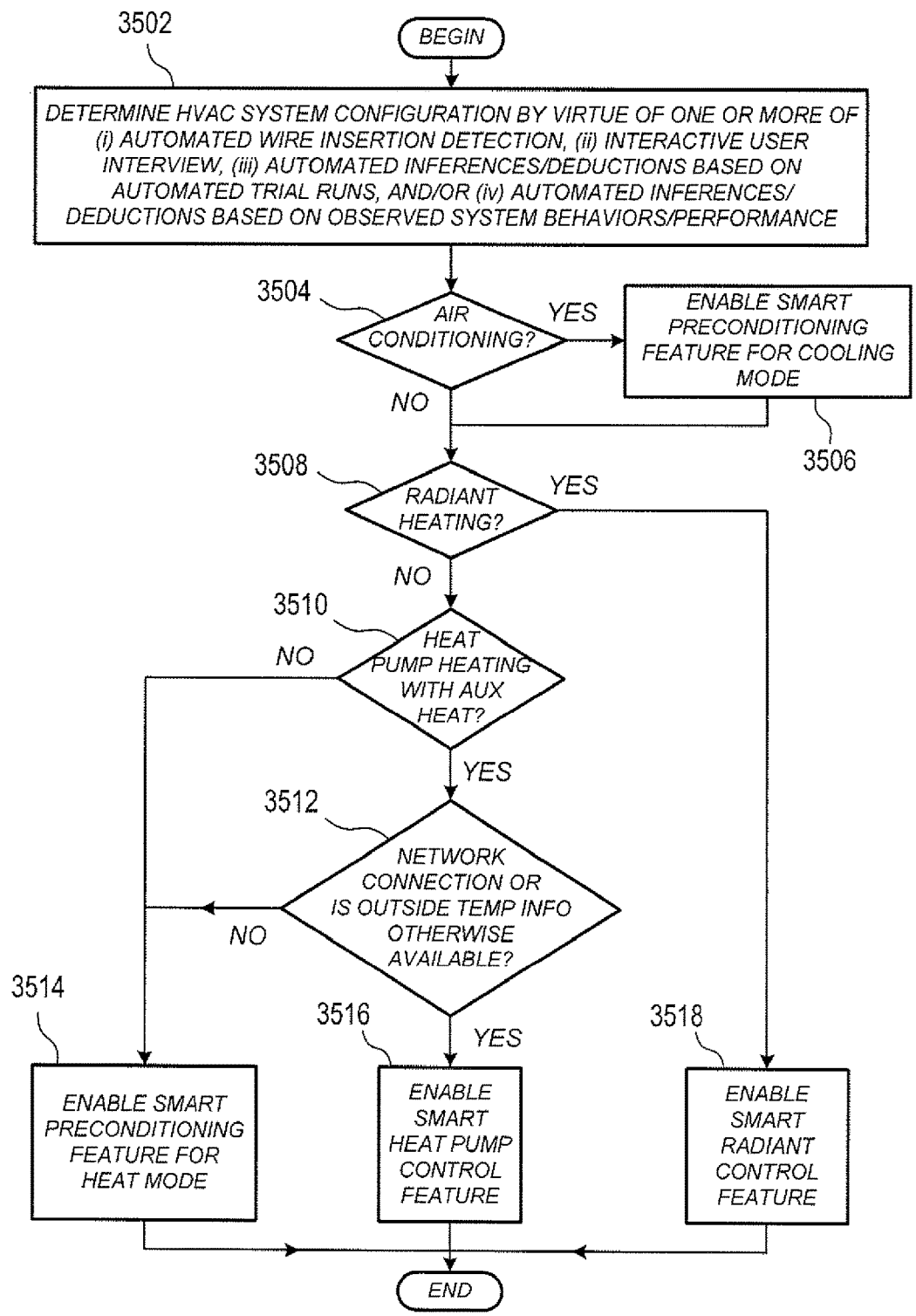
FIG. 35 illustrates steps for automated system matching that are carried out by an intelligent thermostat.

FIG. 35 illustrates steps for automated system matching that are carried out by an intelligent thermostat. It has been found particularly desirable to make thermostat setup and governance as user-friendly as possible by judiciously automating the selection of which among a variety of available energy-saving and comfort-promoting control algorithms are appropriate for the particular HVAC configuration of the home in which the thermostat is installed. At step 3502, the HVAC system features available for control by the thermostat are determined by virtue of at least one of (i) automated wire insertion detection, (ii) interactive user interview, (iii) automated inferences or deductions based on automated trial runs of the HVAC system at or near the time of thermostat installation, and (iv) automated inferences or deductions based on observed system behaviors or performance. Examples of such methods are described in one or more of the commonly assigned US20120130679A1 and US20120203379A1, as well as the commonly assigned U.S. Ser. No. 13/632,148 filed even date herewith and entitled, "HVAC Controller With User-Friendly Installation Features Facilitating Both Do-It-Yourself and Professional Installation Scenarios", each of which are incorporated by reference herein.

In relation to cooling mode operation, if it is determined that the HVAC system includes air conditioning (step 3504), as a result of a dedicated air conditioning system and/or a heat pump operating in the cooling direction, then, at step 3506, a smart preconditioning feature for cooling mode operation is enabled. One example of a smart preconditioning feature is described in the commonly assigned U.S. Ser. No. 13/632,150 filed even date herewith and entitled, "Preconditioning Controls and Methods for an Environmental Control System", which is incorporated by reference herein. For some implementations, the smart preconditioning method is configured to: constantly learn how fast the home heats up or cools down by monitoring the recent heating and cooling history of the home, optionally incorporating external environmental information such as outside temperatures, sun heating effects, etc.; predict how long the HVAC system will need to actively heat or cool in order to reach a particular scheduled setpoint; and begin preconditioning toward the particular scheduled setpoint at just the right time such that the scheduled setpoint temperature will be reached at the scheduled setpoint time. User comfort is promoted by virtue of not reaching the scheduled setpoint temperature too late, while energy savings is promoted by virtue of not reaching the scheduled setpoint temperature too early.

In relation to heating mode operation, if it is determined that the HVAC system includes radiant heating (step 3508), then, at step 3518, a smart radiant control feature for heating mode operation is enabled. One example of a smart radiant control feature is described in the commonly assigned U.S. Ser. No. 13/632,152 filed even date herewith and entitled, "Radiant Heating Controls and Methods for an Environmental Control System", which is incorporated by reference herein. in certain implementations, the smart radiant control feature is configured to monitor radiant heating cycles on an ongoing basis, compute an estimated thermal model of the home as heated by the radiant system, and predictively control the radiant system in a manner that takes into account the thermal model of the house, the time of day, and the previous heat cycle information. The smart radiant control feature is configured to achieve comfortable maintenance band temperatures while also minimizing frequent changes in HVAC on/off states and minimizing HVAC energy consumption. Among other advantages, uncomfortable and energy-wasting target temperature overshoots are avoided.

When it is determined that the HVAC system includes a heat pump including auxiliary resistive electrical heating (i.e., so-called auxiliary or AUX heat) (step 3510), and when it is further determined (step 3512) that the thermostat is network-connected (such that it can receive outside temperature information based on location data and an internet-based temperature information source) or otherwise has access to outside temperature information (such as by wired or wireless connection to an outside temperature sensor), then, at step 3516, a smart heat pump control feature is enabled. When, at step 3510, there is not a heat pump with AUX heat (which will most commonly be because there is a conventional gas furnace instead of a heat pump, or else because there is a heat pump in a so-called dual-fuel system that does not include AUX heat), then, at step 9814, a smart preconditioning feature for heat mode is enabled, which can be a similar or identical opposing counterpart to the preconditioning feature for cooling mode discussed above with respect to step 9806. Similarly, when, at step 3512, there is no network connectivity or other access to outside temperature information, then the smart heat pump control feature of step 3516 is not enabled and instead the smart preconditioning feature of step 3514 is enabled.

Although the AUX heat function allows for faster heating of the home, which can be particularly useful at lower outside temperatures at which heat pump compressors alone are of lesser efficacy, the energy costs of using AUX heat can often be two to five times as high as the energy costs of using the heat pump alone. For some embodiments, the smart heat pump control feature is configured to monitor heat pump heating cycles on an ongoing basis, tracking how fast the home is heated (for example, in units of degrees F. per hour) by the heat pump compressor alone in view of the associated outside air temperatures. Based on computed correlations between effective heating rates and outside air temperatures, and further including a user preference setting in a range from "Max Comfort" to "Max Savings" (including a "Balanced" selection in between these end points), the smart heat pump control feature judiciously activates the AUX heating function in a manner that achieves an appropriate balance between user comfort and AUX heating costs. For some embodiments, the factors affecting the judicious invocation of AUX heat include (i) a predicted amount of time needed for the heat pump alone to achieve the current temperature setpoint, (ii) whether the current temperature setpoint resulted from an immediate user control input versus whether it was a scheduled temperature setpoint, and (iii) the particular selected user preference within the "Max Comfort" to "Max Savings" range. Generally speaking, the AUX function determination will be more favorable to invoking AUX heat as the compressor-alone time estimate increases, more favorable to invoking AUX heat for immediate user control inputs versus scheduled setpoints, and more favorable to invoking AUX heat for "Max Comfort" directed preferences than for "Max Savings" directed preferences.

In some implementations, the smart heat pump control feature further provides for automated adjustment of a so-called AUX lockout temperature, which corresponds to an outside air temperature above which the AUX heat will never be turned on, based on the monitored heat pump heating cycle information and the user preference between "Max Comfort" and "Max Savings." Generally speaking, the AUX lockout temperatures will be lower (leading to less AUX usage) for better-performing heat pumps, and will also be lower (leading to less AUX usage) as the user preference tends toward "Max Savings". For some embodiments in which there is network connectivity available such that overnight temperature forecasts can be provided, the smart heat pump control feature further provides for night time temperature economization in which an overnight setpoint temperature may be raised higher than a normally scheduled overnight setpoint if, based on the overnight temperature forecast, the AUX function would be required to reach a morning setpoint temperature from the normal overnight setpoint temperature when morning comes. In such situations, even though the overnight temperature inside the home is made higher it would otherwise be, the user actually saves energy and money by avoiding the use of the AUX function when morning comes.

According to some embodiments, the determinations made at one or more of steps 3508 and 3510 can be based on automatically observed HVAC system performance information rather than specific system identification information. For example, it may be the case that a particular heating functionality of an HVAC system is not physically a radiant system, but nevertheless tends to exhibit signs of a high thermal mass combined with substantial control lag, making it similar in nature to a radiant heating system. For such cases, the smart radiant control feature may be enabled to improve performance. Likewise, it may not be the case that the HVAC system has a heat pump with AUX functionality, but it may have a two-stage heating functionality in which the first stage (which type was likely chosen as a first stage because it was more cost-effective) tends to be very slow or "fall behind" at lower outside temperatures, and in which the second stage (which type was likely chosen as a second stage because it was less cost-effective) tends to be very time-effective in heating up the home, thus making the system act very much like a heat pump system with AUX functionality. For such cases, the smart heat pump control feature may be enabled to improve performance.

Figure 36A:
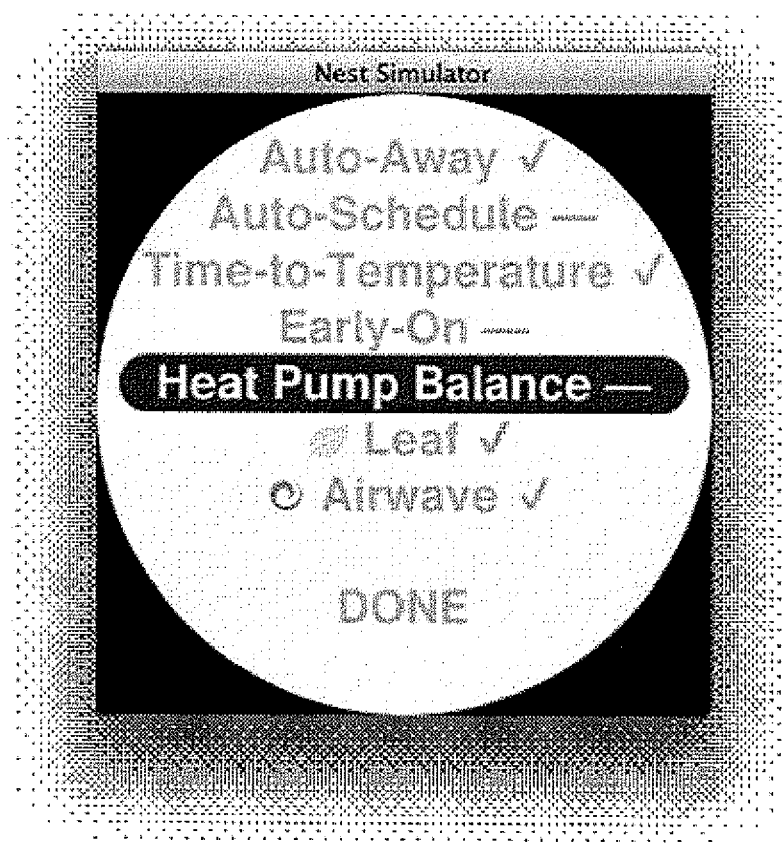
FIGS. 36A-C illustrate an example auto-component-configuration-level-selection interface for an intelligent thermostat.
Figure 36B:
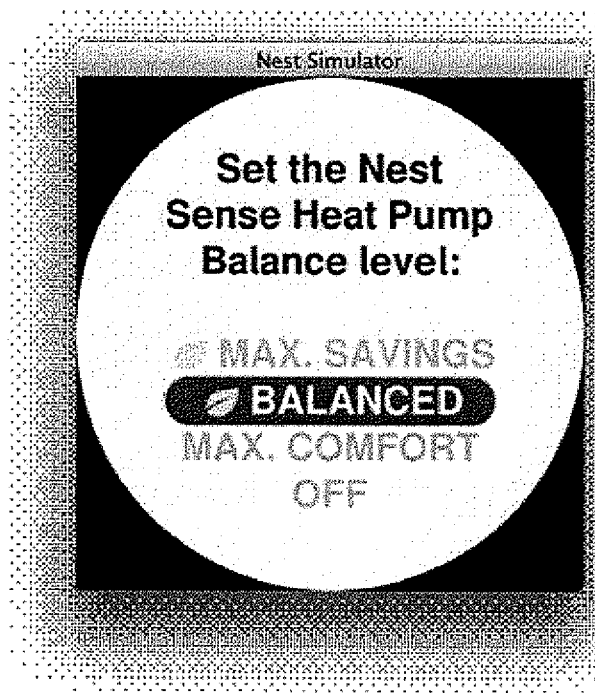
Figure 36C:
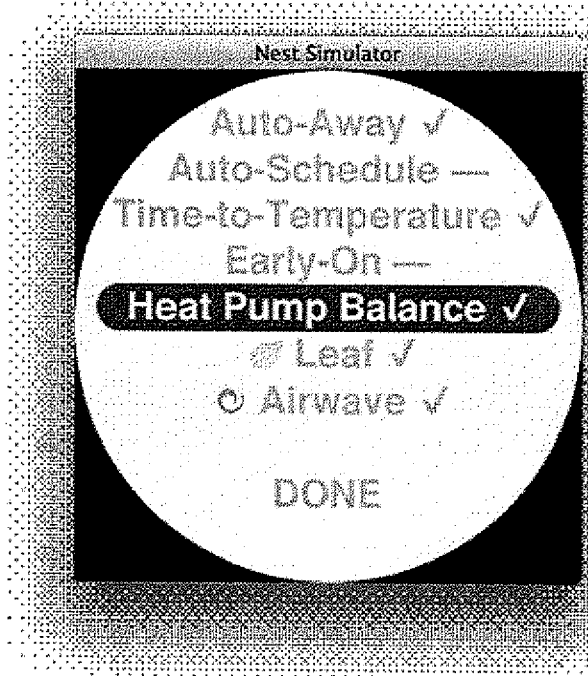

FIGS. 36A-C illustrate an example auto-component-configuration-level-selection interface for an intelligent thermostat. In FIG. 36A, the heat pump balance feature is not check marked in a feature-selection display. A user can invoke selection, via input to the intelligent-thermostat input interface, resulting in display of a heat-pump-balance-selection, or auto-component-configuration-level-selection interface, shown in FIG. 36B. Selection of an auto-component-configuration-level then returns to the feature-selection display, with the heat-pump balance feature now checked.

Figure 37:
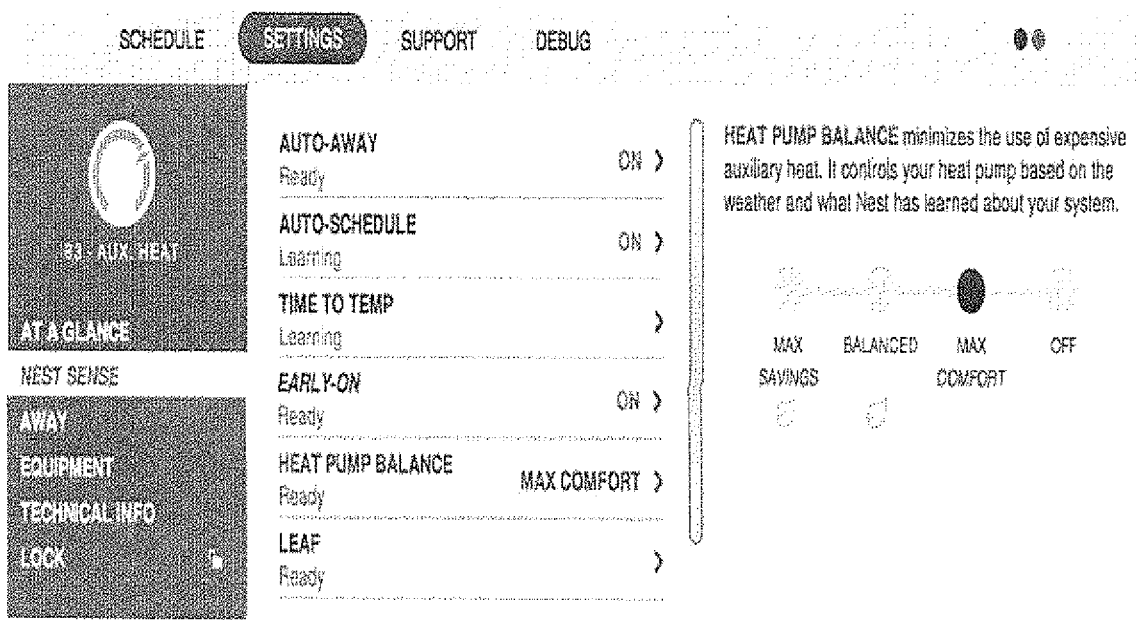
FIG. 37 shows a settings display for an intelligent thermostat. Indications are provided, in the display, for whether or not various features are activated.

FIG. 37 shows a settings display for an intelligent thermostat. Indications are provided, in the display, for whether or not various features are activated.

Figure 38A:
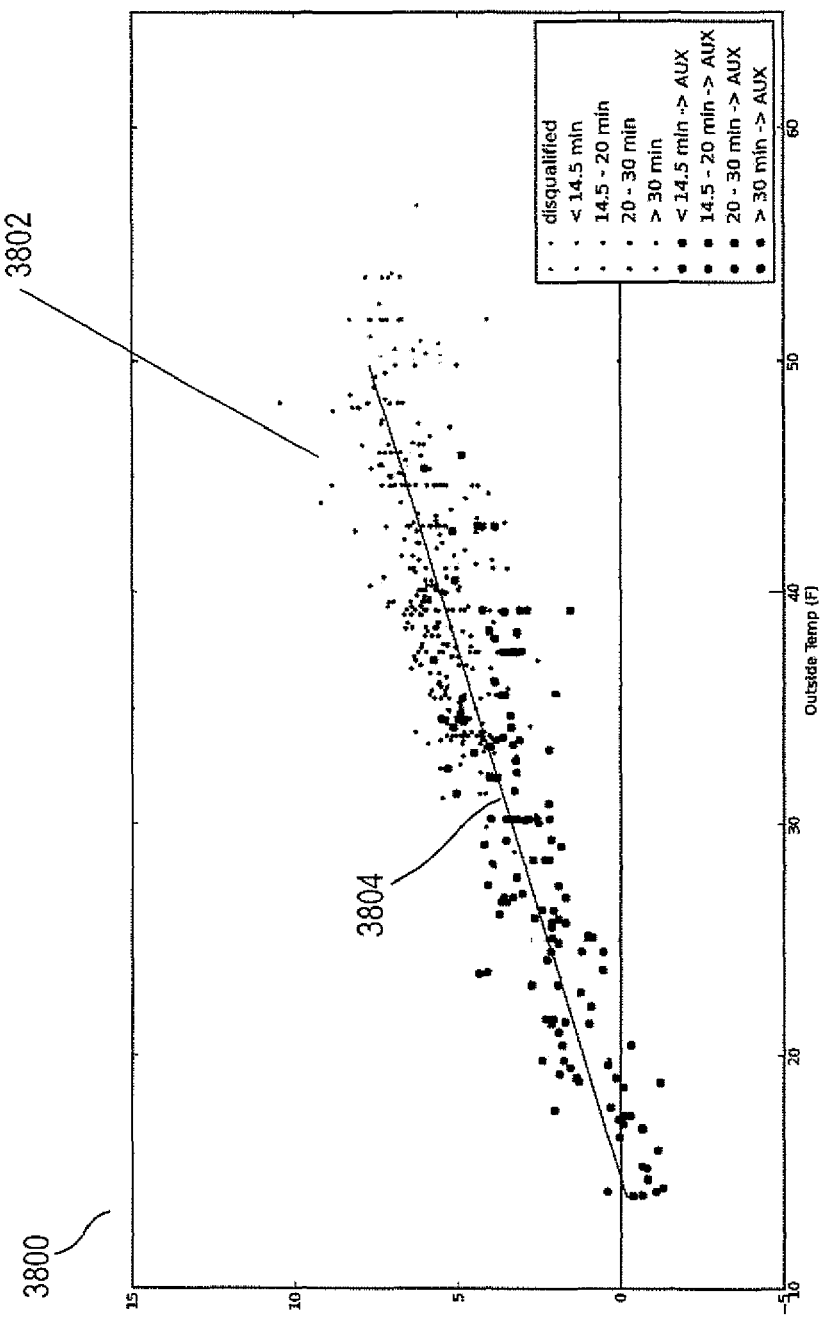
FIGS. 38A-C illustrate additional types of information that an intelligent thermostat can obtain, and provide to users or employ during control operations.
Figure 38B:
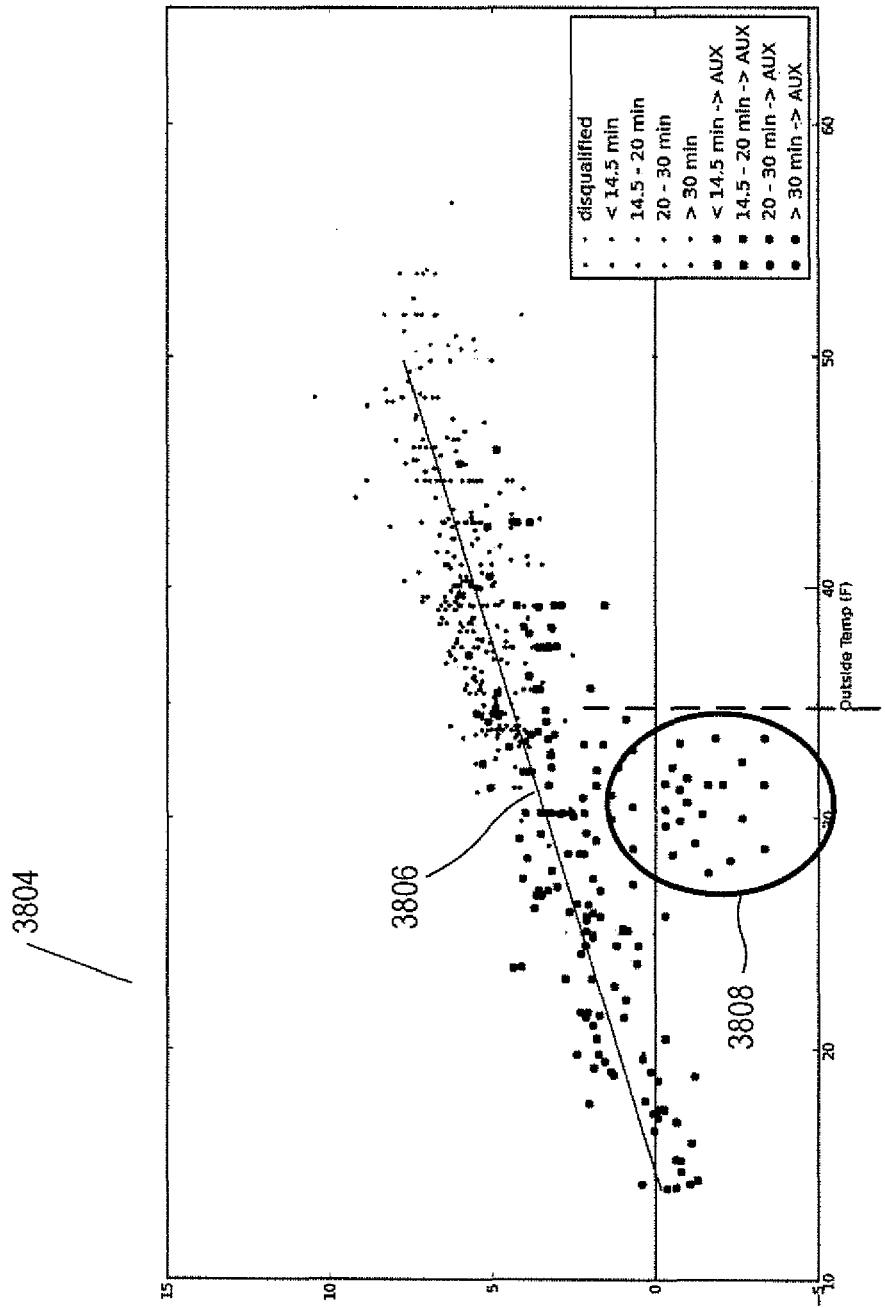
Figure 38C:
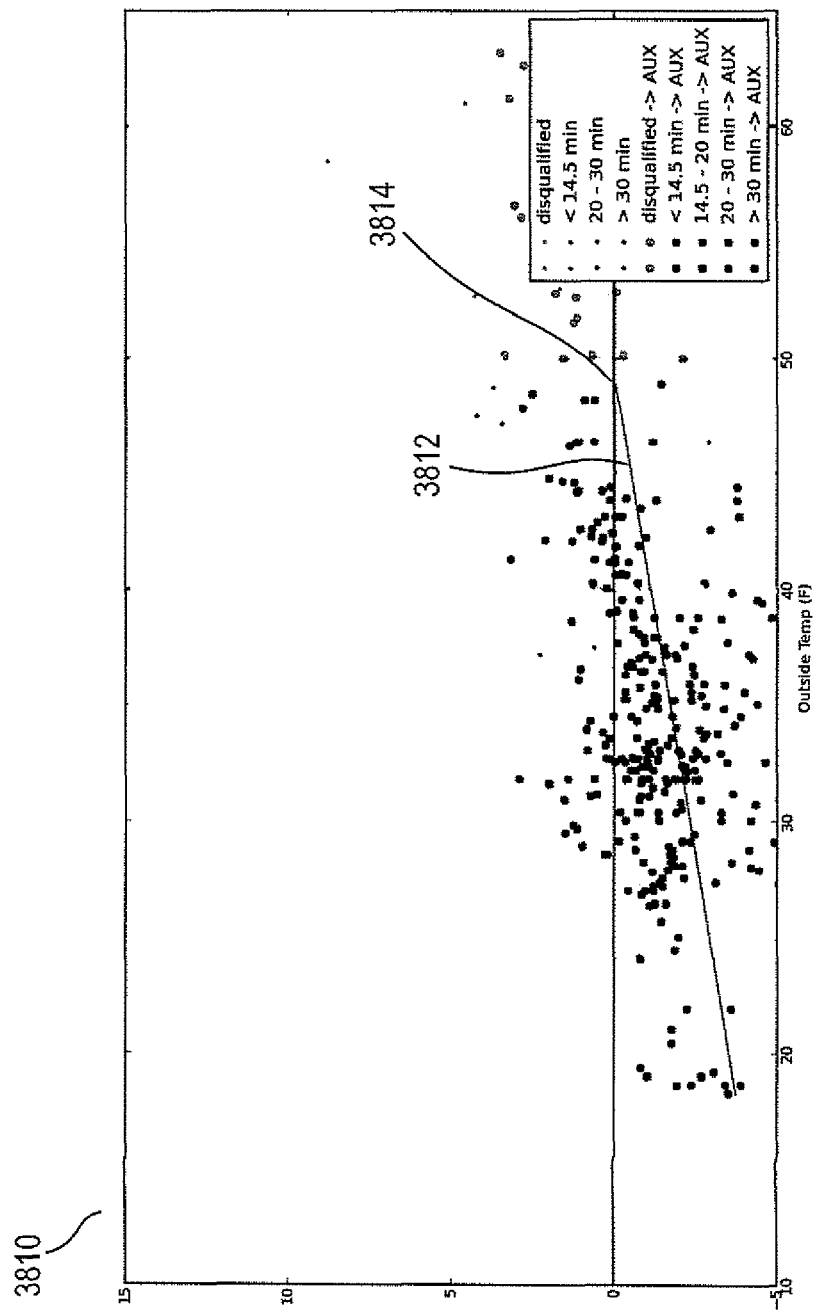

FIGS. 38A-C illustrate additional types of information that an intelligent thermostat can obtain, and provide to users or employ during control operations. FIG. 38A shows an actual plot 3800 of heat-pump data points 3802 and a best-fit $\Delta T/\Delta t$ versus T curve 3804 for a heat pump, referred to as a heat-pump-rate curve ("HPR"). The data points are collected, as discussed above, over time by an intelligent thermostat during heat-pump operation when AUX is not operational. FIG. 38B shows a plot 3804 of heat-pump data points and a best-fit HPR, collected by an intelligent thermostat during heat-pump operation when AUX is not operational, for a heat pump that exhibits outlier data points 3808 near the freezing point that indicate inefficient heat-pump operation due to accumulation of precipitation, such as frost, on internal heat-pump components. Certain heat pumps include logic for detection of the accumulation of precipitation, and take remedial actions to remove the precipitation. For example, the heat-pump logic may reverse heat-pump operation, temporarily, extracting heat from a residence in order to heat the heat-pump components with accumulated precipitation and remove the precipitation, followed by again reversing operation to continue heating the residence. During this period, AUX heating may be invoked by heat-pump logic in order to prevent cooling the residence. Currently, the detection and amelioration of the accumulation of precipitation is carried out internally, within the heat pump. Because an intelligent thermostat continuously, intermittently, or periodically monitors heat-pump operation and collects $\Delta T/\Delta t$ versus T data, an intelligent controller is able to analyze the collected $\Delta T/\Delta t$ versus T data and detect outlier data points near the freezing point, and thus determine the precipitation accumulation characteristics of the heat pump. The intelligent thermostat can often consider many more factors than the internal heat-pump precipitation-accumulation logic, and therefore far better characterize the precipitation accumulation characteristics of the heat pump. Moreover, the intelligent controller can combine this information with many additional types of information to create sophisticated control strategies for ameliorating precipitation accumulation.

FIG. 38C illustrates another plot 3810 of a set of HPR heat-pump data points and a best-fit $\Delta T/\Delta t$ versus T curve 3812 for a heat pump. In this case, the critical temperature 3814, discussed above with reference to FIG. 16, at which the $\Delta T/\Delta t$ for the heat pump becomes negative, is nearly 50° F. This critical temperature is much higher than would be expected for a properly functioning heat pump, and is indicative of a poorly operating or essentially inoperable heat pump. Often, residents fail to notice inoperable or poorly operating heat pumps, because the AUX is generally routinely activated when the heat pump fails to heat residential environments. An intelligent thermostat that continuously, intermittently, or periodically monitors heat-pump operation and collects $\Delta T/\Delta t$ versus T data can easily detect such problems and report them to users, utility companies, and other entities so that the heat pump can be repaired and the residence or other controlled environment can be then heated efficiently.

FIG. 39 provides an example configuration of the response-time monitoring methods used in one implementation of an intelligent thermostat. This figure is provided simply as an example of certain parameters used in one example implementation, but does not apply generally to all implementations. In FIG. 32, each column 3902-3905 represents the control logic that transpires for each of four different auto-component-activation levels, including max savings, balanced, max conform, and off. Many of the parameters are derived from a $\Delta P/\Delta t$ versus P data, described above with reference to FIG. 16, for the heat pump controlled by the intelligent controller. The HPR curve is, for heat pumps, a definitive system characteristic that allows for determination of the various parameters for the response-time-monitoring techniques used by one type of intelligent thermostat. In FIG. 39, each row of the table, below the top row, describes the operational parameters for various functionalities related to response-time monitoring. For example, row 3910 discusses how the auxiliary-heating-system $P_{highLockout}$ is determined for the various auto-component-activation levels. As indicated in the figure, there is a default $P_{highLockout}$ that is overridden when an HPR is available, with the $P_{highLockout}$ set to a temperature at which the $\Delta T/\Delta t$ is above a threshold value, such as 1° F./hour. Different thresholds are used for different auto-component-configuration levels. Row 3912 discusses whether night-time temperature economizing is deployed for each of the auto-component-activation levels. Night-time temperature economization refers to adjusting a control schedule for nighttime hours so that, in the morning, at a first scheduled setpoint change, the estimated response time will not be of sufficient length to result in use of the auxiliary heating system. This feature is deployed only when access to weather forecasts or other types of weather information are available, and thus is turned off when, for example, WiFi is unavailable to an intelligent thermostat which relies on WiFi to access such information. Thus, use of the HPR and response-monitoring techniques, discussed above with reference to FIGS. 20-22E, can inform the intelligent controller of potential control-schedule adjustments that can result in more economical overall environmental control. Rows 3914 and 3916 describe a heuristic according to which the auxiliary heating unit is activated when estimated response times exceed threshold values. Row 3914 discusses activation of the auxiliary heating unit for response times following immediate-control inputs and row 3916 shows heuristics for response times following scheduled setpoint changes. The thresholds for activating AUX are lower for immediate-control inputs than for scheduled setpoint changes, since users generally expect faster response for manually input setpoint changes. Thus, when the time-to-temperature ("t2T") estimated for a manually input setpoint change is greater than 60 minutes in the max-savings mode, the AUX is activated, while, for scheduled setpoint changes, the threshold is twice as long, or 120 minutes. Row 3918 indicates whether a pre-heating feature is deployed by various auto-component-activation levels. Pre-heating is activation of the heat pump prior to a scheduled setpoint change. When pre-heating is deployed, it may be the case that a more efficient heat pump can be used for larger $\Delta t$ changes because the total response time distributed over an initial pre-heating period prior to the scheduled setpoint change as well as a period of time following the scheduled setpoint change. Thus, assuming that the scheduled setpoint change indicates a point in time that a user desires the temperature to rise, pre-heating allows for use of the heat pump, with a shallower P-response curve, rather than employing auxiliary heating at the time corresponding to the scheduled setpoint change.

Although the present invention has been described in terms of particular examples, it is not intended that the invention be limited to these examples. Modifications within the spirit of the invention will be apparent to those skilled in the art. For example, the response-time monitoring and system-rescheduling techniques employed by intelligent controllers may be implemented in many different ways by changing any of many different design and implementation parameters, including programming language, hardware platforms, logic types, control structures, data structures, modular organization, operating systems, and other such parameters. As discussed above, many different types of information may be used by an intelligent controller to estimate response times, both initially, at the time of an immediate-control setpoint or scheduled setpoint change, prior to a scheduled setpoint change, or during the response time, when failures to make sufficient progress towards a target environmental parameter value may require selecting a new system or combination of systems to activate. Other considerations include information about the environment, information about system performance and system health, information about the controlled environment, and many additional types of information. For example, were the intelligent controller to know that the windows of a controlled environment are open and that the heating efficiency of the systems used to the controlled environment are therefore necessarily significantly less, under these circumstances, the intelligent controller may select a different system or combination of systems to activate in order to achieve a desired temperature change.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

The invention claimed is:

1. A system for controlling a heating, ventilation, and air conditioning (HVAC) system, the HVAC system including an external unit located in an outside environment that facilitates heating or cooling based on thermal exchange with the outside environment, the system comprising:
    one or more memory devices that store:
        a setting indicating a user preference for comfort versus cost savings; and
        historical data;
    one or more processors that are programmed to perform operations comprising:
        determining whether the system can receive outside temperature information;
        based on a determination that the system can receive outside temperature information, controlling the external unit based at least in part on (i) one or more first parameters derived from a history of outside temperature values versus a rate of indoor temperature change from the historical data, and (ii) the setting indicating the user preference for comfort versus cost savings; and
        based on a determination that the system cannot receive outside temperature information, controlling the external unit based at least in part on (i) one or more second parameters derived without regard to the history of outside temperature values, and (ii) the setting indicating the user preference for comfort versus cost savings.

2. The system of claim 1, wherein the setting indicating a user preference for comfort versus cost savings comprises a user selection of comfort over cost savings.

3. The system of claim 1, wherein the setting indicating a user preference for comfort versus cost savings comprises a user selection of cost savings over comfort.

4. The system of claim 1, wherein the external unit comprises a heat pump with auxiliary resistive electrical heating.

5. The system of claim 1, wherein it is determined whether the system can receive outside temperature information by determining whether a portion of the system located inside an enclosure is network-connected.

6. The system of claim 1, wherein the system further comprises a connection to an outside temperature sensor.

7. The system of claim 1, wherein the one or more first parameters indicate a length of time a primary HVAC function should operate alone before activating a secondary HVAC function.

8. The system of claim 7, wherein the length of time the primary HVAC function should operate alone before activating the secondary HVAC function is (i) longer when the setting indicating the user preference for comfort versus cost savings indicates that cost savings is preferred, and (ii) shorter when the setting indicating the user preference for comfort versus cost savings indicates that comfort is preferred.

9. The system of claim 1, wherein the one or more processors and the one or more memory devices are part of a controller located within an enclosure.

10. The system of claim 1, wherein the one or more processors and the one or more memory devices are distributed across: (i) a cloud server, and (ii) a controller located within an enclosure.

11. A method for using a system to control a heating, ventilation, and air conditioning (HVAC) system, the HVAC system including an external unit located in an outside environment that facilitates heating or cooling based on thermal exchange with the outside environment, the method comprising:
    storing a setting indicating a user preference for comfort versus cost savings;
    storing historical data;
    determining whether the system can receive outside temperature information;
    based on a determination that the system can receive outside temperature information, controlling the external unit based at least in part on (i) one or more first parameters derived from a history of outside temperature values versus a rate of indoor temperature change from the historical data, and (ii) the setting indicating the user preference for comfort versus cost savings; and
    based on a determination that the system cannot receive outside temperature information, controlling the external unit based at least in part on (i) one or more second parameters derived without regard to the history of outside temperature values, and (ii) the setting indicating the user preference for comfort versus cost savings.

12. The method of claim 11, wherein the setting indicating a user preference for comfort versus cost savings comprises a user selection of comfort over cost savings.

13. The method of claim 11, wherein the setting indicating a user preference for comfort versus cost savings comprises a user selection of cost savings over comfort.

14. The method of claim 11, wherein the external unit comprises a heat pump with auxiliary resistive electrical heating.

15. The method of claim 11, wherein determining whether the system can receive outside temperature information comprises determining whether a portion of the system located inside an enclosure is network-connected.

16. The method of claim 11, wherein the system comprises a connection to an outside temperature sensor.

17. The method of claim 11, wherein the one or more first parameters indicate a length of time a primary HVAC function should operate alone before activating a secondary HVAC function.

18. The method of claim 17, wherein the length of time the primary HVAC function should operate alone before activating the secondary HVAC function is (i) longer when the setting indicating the user preference for comfort versus cost savings indicates that cost savings is preferred, and (ii) shorter when the setting indicating the user preference for comfort versus cost savings indicates that comfort is preferred.

19. The method of claim 11, wherein the system comprises one or more processors and one or more memory devices, and the one or more processors and the one or more memory devices are part of a thermostat located within an enclosure.

20. The method of claim 11, wherein the system comprises one or more processors and one or more memory devices, and the one or more processors and the one or more memory devices are distributed across: (i) a cloud server, and (ii) a thermostat located within an enclosure.

* * * * *